United States Patent [19]

Ohta et al.

[11] Patent Number: 4,977,595

[45] Date of Patent: Dec. 11, 1990

[54] METHOD AND APPARATUS FOR IMPLEMENTING ELECTRONIC CASH

[75] Inventors: Kazuo Ohta, Zushi; Tatsuaki Okamoto, Yokosuka, both of Japan

[73] Assignee: Nippon Telegraph and Telephone Corporation, Tokyo, Japan

[21] Appl. No.: 500,555

[22] Filed: Mar. 28, 1990

[51] Int. Cl.$^5$ .............................................. H04L 9/30
[52] U.S. Cl. ........................................ 380/24; 380/30; 340/825.31; 340/825.34; 235/379; 235/381
[58] Field of Search ...................... 340/825.31, 825.34; 235/379, 381

[56] References Cited

U.S. PATENT DOCUMENTS

| | | | |
|---|---|---|---|
| 4,759,063 | 7/1988 | Chaum | 380/30 |
| 4,759,064 | 7/1988 | Chaum | 380/30 |
| 4,914,698 | 4/1990 | Chaum | 380/30 |
| 4,926,480 | 5/1990 | Chaum | 380/23 |

Primary Examiner—Stephen C. Buczinski
Assistant Examiner—Bernarr Earl Gregory
Attorney, Agent, or Firm—Pollock, Vande Sande & Priddy

[57] ABSTRACT

In an electronic cash implementing method, a user makes a bank apply a blind signature to user information $V_i$ produced, by a one-way function, from secret information $S_i$ containing identification information, thereby obtaining signed user information. Further, the user makes the bank apply a blind signature to information containing authentication information $X_i$ produced, by a one-way function, from random information $R_i$, thereby obtaining signed authentication information. The user uses an information group containing the signed user information, the signed authentication information, the user information and the authentication information, as electronic cash for payment to a shop. The shop verifies the validity of the signed user information and the signed authentication information, and produces and sends to the user an inquiry. In response to the inquiry the user produces a response $Y_i$ by using secret information and random information and sends it to the shop. Having verified the validity of the response the shop accepts the electronic cash.

54 Claims, 27 Drawing Sheets

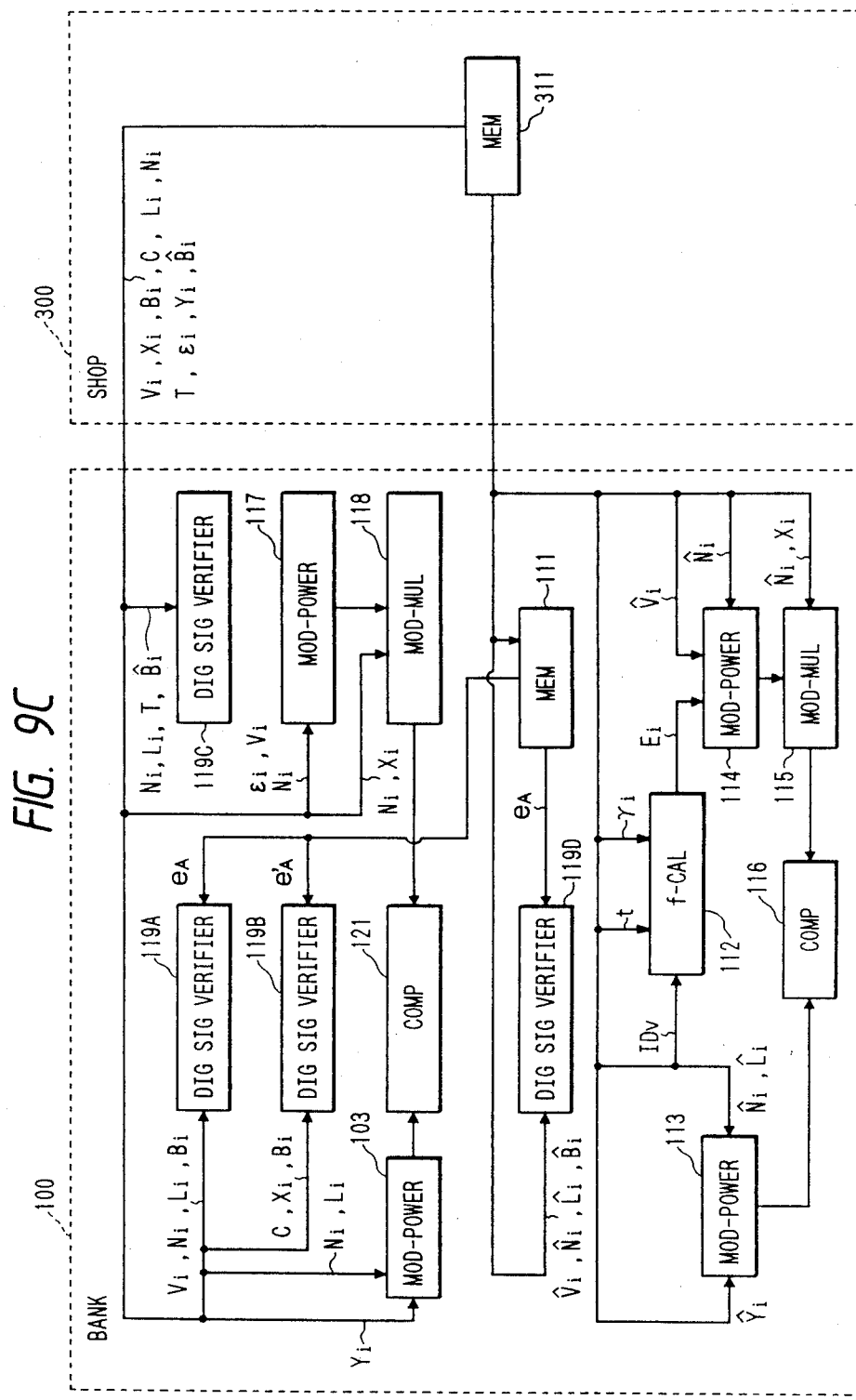

METHOD AND APPARATUS FOR IMPLEMENTING ELECTRONIC CASH

BACKGROUND OF THE INVENTION

The present invention relates to a method and apparatus for implementing electronic cash through utilization of a telecommunication system.

An electronic funds transfer employing a telecommunication system is now coming into common use. In general, a certificate which is convertible into money at a financial institution (hereinafter referred to simply as a bank), such as a draft or check, has a symbolic function of its own (which guarantees its holder to the rights stated thereon). When handled in the telecommunication system, the certificate is digitized data, which can easily be copied and converted into money many times. This problem is encountered as well in the implementation of electronic cash such as a prepaid card, because the prepaid card can also be copied for illicit use to convert into money or purchase articles again and again.

As a solution to this problem, there has been proposed a scheme which employs a card having a computation facility and checks its double usage by suitably adapting data exchange between a card reader and the card during cashing procedure (Chaum, Fiat and Naor, "Untraceable Electronic Cash", Proc. of CRYPTO, '88, for example).

The above-mentioned Chaum, et al. scheme may be briefly summarized in the following outline. Incidentally, user's identification information (such as his account number, etc.) will hereinafter be represented by ID.

A description will be given first of the procedure for a user to have a bank issue electronic cash of a certain face value.

Step 1: The user creates k random numbers $a_i$ (where $i=1, \ldots, k$) and uses a public one-way function g to obtain $x_i$ and $y_i$ from the following equations:

$$x_i = g(a_i)$$

$$y_i = g(a_i \oplus ID)$$

where $i=1, \ldots, k$.

In the above, $\oplus$ represents an Exclusive OR logic operation.

Step 2: The user computes, by the following equation, the product $B_i$ of a valve $f(x_i, y_i)$ computed using a public one-way function f and the e-th power of a random number $r_i$, and then presents the value $B_i$ to the bank.

$$B_i = r_i^e \times f(x_i, y_i) \bmod n,$$

where $i=1, \ldots, k$

The calculation of $B_i$ is preprocessing for obtaining a signature of the bank to $f(x_i, y_i)$ without allowing the bank to know its contents, and will hereinafter be called blind signature preprocessing. Here, a mod b generally represents the remainder of the division of an integer a by an integer b.

Step 3: The bank makes the user open his ID and k/2 random numbers $a_i$ and $r_i$ to confirm that the user has correctly executed Steps 1 and 2. The following description will be given on the assumption that the random numbers $a_i$ and $r_i$ are not opened for those $i=1, \ldots, k/2$.

Step 4: The bank obtains the product of unopened k/2 values $B_i$ and raises it to the d-th power to compute a signature D as indicated by the following equation. At the same time, the bank withdraws the corresponding amount of money from the user's account.

$$D = \pi_{i=1}^{k/2} B_i^d \bmod n$$

Step 5: The user computes, by the following equation, electronic cash C with the influence of the random number $r_i$ removed from the signature D.

$$C = \pi_{i=1}^{k/2} r_i \bmod n$$

At this time, the following equation holds:

$$C = \pi_{i=1}^{k/2} f(x_i, y_i)^d \bmod n,$$

The electronic cash obtained by this processing is equivalent to the value $f(x_i, y_i)$ directly applied with the signature of the bank. Here, e, d and n are created by the band and satisfy the following equations.

$n = P \times Q$ $1 = \text{LCM}\{(P-1), (Q-1)\}$, and $e \times d = 1 \pmod{l}$ where P and Q are prime numbers and LCM{a, b} generally represents the least common multiple of a and b. The bank publishes the information e corresponding to the face value of the electronic cash C and the key n and keeps the key d strictly confidential.

The procedure for the user to pay with the electronic cash C at a shop is as follows:

Step 6: The user presents the electronic cash C to the shop.

Step 7: The shop creates and transmits a random bit string $E_1, \ldots, k_{k/2}$ to the user.

Step 8: For an unopened item i in $1 \leq i \leq k/2$, the user presents, to the shop, $a_i$ and $y_i$ when $E_i = 1$, and $x_i$ and $(a_i \oplus ID)$ when $E_i = 0$.

Step 9: The shop checks the validity of the electronic cash C by the following equation, using the user's response and the public information e and n.

$$C^e = \pi_{i=1}^{k/2} f(x_i, y_i) \pmod{n}.$$

The method of settlement between the shop and the bank is as follows:

Step 10: The shop later presents the electronic cash C, the bit string $E_1, \ldots, E_{k/2}$ and the user's response ($a_i$ and $y_i$, or $x_i$ and $(a_i \oplus ID)$) and receives payment of the amount of money concerned.

Step 11: The bank stores the electronic cash C, the bit string $E_1, \ldots, E_{k/2}$ and $a_i$ (when $E_i = 1$), or $(a_i \oplus ID)$ (when $E_i = 0$).

The scheme described above has its features in that it maintains user privacy and permits checking double usage of the electronic cash.

Now, a description will be given first of the security for user privacy. Since the information B is obtained by randomizing the value $f(x_i, y_i)$ with random numbers, the bank and a third party cannot assume the value $f(x_i, y_i)$ from the information B. Further, even if the bank and the shop should conspire, they could not associate the electronic cash C with the signature D. In other words, it is impossible to know who issued the electronic cash C. Thus, the method proposed by Chaum, et al. does not allow the originator (i.e. the user) to be traced back, and hence ensures the privacy of the user, such as his propensity to consume. The signature scheme used here will hereinafter be referred to as the "blind signature" scheme.

As the blind signature scheme, for instance, Chaum proposes in U.S. Pat. No. 4,759,063 the following blind signature scheme utilizing the RSA encryption scheme.

A user randomizes a message M with a one-way function $Fe_A$ expressed by the following equation (1) using a random number r:

$$W = Fe_A(M) = r^{e_A} \times M \bmod n \quad (1)$$

and sends the resulting randomized message W to a bank. This processing by the one-way function $Fe_A$ is the blind signature preprocessing.

The bank signs the randomized message W with a signature function $De_A$ expressed by the following equation (2) to obtain a signed randomized message $\Omega$, which is sent to the user.

$$\Omega = De_A(W) = W^{d_A} \bmod n \quad (2)$$

The user processes the signed randomized message $\Omega$ with a blind signature postprocessing function $He_A$ expressed by the following equation (3):

$$He_A(\Omega) = \Omega/r \bmod n \quad (3)$$

In the above, $e_A$, $d_A$ and n in Eqs. (1), (2) and (3) are to satisfy the following conditions:
$e_A \times d_A \equiv 1 \pmod{l}$,
$l = LCM\{(P-1), (Q-1)\}$, and
$n = P \times Q$,
where P and Q are prime numbers, $LCM\{a, b\}$ is the least common multiple of a and b, $d_A$ is a secret key, and $e_A$ and n are public keys.

Eq. (3) can be modified as follows:

$$He_A(\Omega) = He_A\{De_A(Fe_A(M))\} = (r^{e_A} \times M)^{d_A}/r = r^{e_A \times d_A} \times M^{d_A}/r = M^{d_A} \pmod{n} \quad (4)$$

The right side of Eq. (4) is evidently the replacement of W in Eq. (2) with M. Accordingly, the following equation holds:

$$He_A(\Omega) = De_A(M) \quad (5)$$

These equations (1), (2) and (3) are representative of the blind signature procedure, and Eq. (4) proves that the blind signature is possible. That is to say, the influence of the random number r can be removed from the signed randomized message $\Omega$ by processing it with the blind signature postprocessing function $He_A$. Hence, it is possible to obtain the same signed message $De_A(M)$ as the message M directly signed by the bank using the signature function $De_A$.

Next, a description will be given of the detection of double usage of the electronic cash C. The bank compares the electronic cash C sent from the shop with all electronic cash already stored in a memory to check whether the same electronic cash C has been used twice. Suppose that the user has invalidly used the electronic cash twice. Then, since $a_i$ for $E_i = 1$ or $(a_i \oplus ID)$ for $E_i = 0$ has been stored in the memory of the bank corresponding to the first electronic cash C, the identification information ID can be obtained by computing $a_i \oplus (a_i \oplus ID)$ if $E_i$ for the first use of the electronic cash C and $E_i$ for the second use differ. Since the bank makes an inquiry of k/2 bits, the probability of coincidence through all bits (i = 1 to k/2) between the two $E_i$'s, that is, the possibility that the user's ID cannot be computed from the electronic cash C used twice invalidly, is $2^{-k/2}$.

In addition to the requirement for the one-way property of the functions f and g, the above-described Chaum, et al. scheme requires the collision-free property of two arguments, that is, difficulty in finding $(x, y)$ and $(x', y')$ which satisfy $Z = f(x, y) = f(x', y')$ for securing safety against double usage of electronic cash. However, no method has been proposed so far which constructs the one-way functions which satisfy the collision-free property of the two arguments.

SUMMARY OF THE INVENTION

Accordingly, it is an object of the present invention to provide an electronic cash implementing method and apparatus therefor which permit checking of double usage of electronic cash without necessitating the use of the function f involving a specific requirement and which ensure user privacy.

The electronic cash implementing method according to the present invention is a method for use in electronic cash processing in which a user uses electronic cash issued from a bank, and a shop receives and settles it with the bank.

The user generates user information (Vi) from secret information (Si) containing his identification information (IDp) in a raw form, creates randomized user information (Wi) by randomizing the user information (Vi) or information (Mi) containing it through use of a blind signature preprocessor, and sends the randomized user information (Wi) to the bank.

The bank signs the randomized user information (Wi) by the use of signing equipment and then transmits the signed-randomized user information ($\Omega i$) to the user.

The user removes, by a blind signature postprocessor, the influence of the randomization from the signed-randomized user information received from the bank, thereby obtaining signed user information (Bvi, Bi, or B) signed by the bank.

The user generates authentication information (Xi) from random number information (Ri) through use of a first message calculator and randomizes the authentication information or information m containing it by the blind signature preprocessor to obtain randomized authentication information (Zi or Z), which is sent to the bank.

The bank signs the randomized authentication information (Zi or Z) by the signing equipment and then sends the signed-randomized authentication information ($\Theta i$ or $\Theta$) to the user.

The user removes the influence of randomization from the signed-randomized authentication information by the blind signature postprocessor to obtain signed authentication information (Bxi or C).

When purchasing an article at a shop, the user presents, as electronic cash, the user information, the authentication information, the signed user information and the signed authentication information.

The shop verifies the validity of the signed user information and the signed authentication information by use of verification equipment. Further, the shop sends to the user an inquiry (qi) prepared based on information of the shop itself. In response to the inquiry from the shop the user presents thereto a response (Yi) prepared through utilization of the secret information (Si), the random number information (Ri) and the inquiry.

The shop checks the response to verify that the user information and the authentication information are the user's information, and hence the electronic cash is valid. Then the shop sends the user's presented information, the inquiry and the response thereto to the bank for settlement of accounts.

The bank verifies the validity of the signed user information and the signed authentication information by means of verification equipment. Having confirmed the validity of the both information, the bank makes a check on its memory for the presence of the same pair of information as the pair of received user information and authentication information. If the same pair of information is found, the bank computes the secret information of the user from the two pairs of user information and authentication information to identify the user. If the same pair of information is not found, the bank stores the received information in the memory.

As described above, according to the present invention, since the blind signature is applied to each of the user information prepared from the secret information containing the identification information and the authentication information based on the random number information, functions for producing the user information and the authentication information do not encounter the problem of the two-argument collision-free property. Hence, desired functions can be constructed.

Moreover, if the signed user information once obtained is used as a license (Bi or B) issued by the bank, and if the afore-mentioned signed authentication information obtained by having the bank sign information which has the authentication information (Xi) and the license (Bi or B) concatenated as required, is used as an electronic coin issued by the bank, then the procedure for issuing the electronic coin can be simplified, besides the electronic coin can be transferred and/or used more than once.

BRIEF DESCRIPTION OF THE DRAWINGS

FIG. 9C shows functional block diagrams of the bank 100 and the shop 300 in FIG. 8C;

DESCRIPTION OF THE PREFERRED EMBODIMENTS

Figure 1:
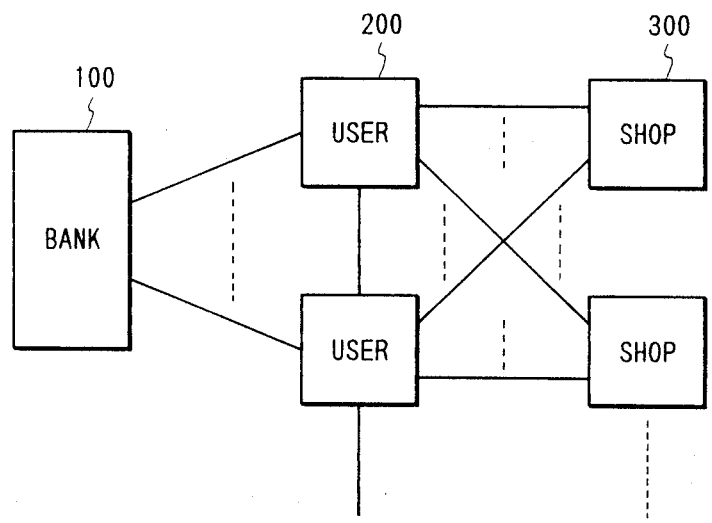
FIG. 1 is a diagram showing the relationships among a bank 100, users 200 and shops 300 to which the present invention is applied.

FIG. 1 illustrates in block form the relationships among a bank, a user and a shop to which the electronic cash implementing method of the present invention is applied. In FIG. 1 the bank 100, the users 200 and the shops 300 are interconnected via telecommunication lines, for instance, but they may also be connected, for example, via a smart card on which information can be recorded.

First Embodiment

When receiving from the user 200 a request to issue electronic cash, the bank checks the identity of the user 200 and then withdraws from his account an amount of money corresponding to the requested electronic cash, or after receiving cash from the user 200 the bank 100 issues a proof of the receipt (signed user information and signed authentication information which form part of information constituting the electronic cash as described later) to the user 200 through use of the blind signature scheme.

When making payment to the shop 300, the user 200 presents the proof to the shop 300 and in response to its inquiry presents a response prepared from secret information and random number information used for generating user information and authentication information, respectively.

Next, a detailed description will be given of the case where the user 200 using IDp as user identification information has the bank 100 issue electronic cash.

In order that the RSA cryptosystem is employed as an example in the blind signature scheme which is used in the electronic cash issuance procedure, the bank first determines various required parameters so that they satisfy the following conditions:

n = P × Q
e × d ≡ 1 (mod l)

where $l = \text{LCM}\{P-1, Q-1\}$. The bank computes e, d and n, publishes the keys e and n but keeps the key d in secret. The face value of the electronic cash which the bank issues is fixed, and the public key e corresponds to the fixed amount of money.

In the above LCM(a, b) represents the least common multiple of integers a and b, and P and Q are two large different prime numbers. Further, a ≡ b (mod l) represents that a − b is an integral multiple of l. The way of determining such various parameters is described in R. L. Rivest, et al., "A Method for Obtaining Digital Signatures and Public-Key Cryptosystems", Communications of the ACM, Vol. 21, No. 2, pp 120–126, 1978, for example.

Next, the user 200 generates user information Vi from secret information Si containing his identification information IDp intact, by the use of a predetermined first one-way function, and generates authentication information Xi from random number information Ri, by the use of a second one-way function. The user 200 has the bank 100 sign the user information Vi and the authentication information Xi through use of the blind signature scheme. The reason for using the blind signature scheme is to protect the privacy of the user from a conspiracy of the shop 300 and the bank 100. In the present invention it is significant that the secret information Si contains the raw identification information IDp.

The blind signature scheme in the processing between the bank and the user in the following description utilizes the RSA cryptosystem (see the aforementioned Rivest, et al. article) as is the case with the blind signature scheme disclosed in U.S. Pat. No. 4,759,063 to Chaum, but a blind signature scheme employing authentication with interactive property (see U.S. Pat. No. 367,650 filed June 19, 1989, for example) may also be used.

Figure 2A:
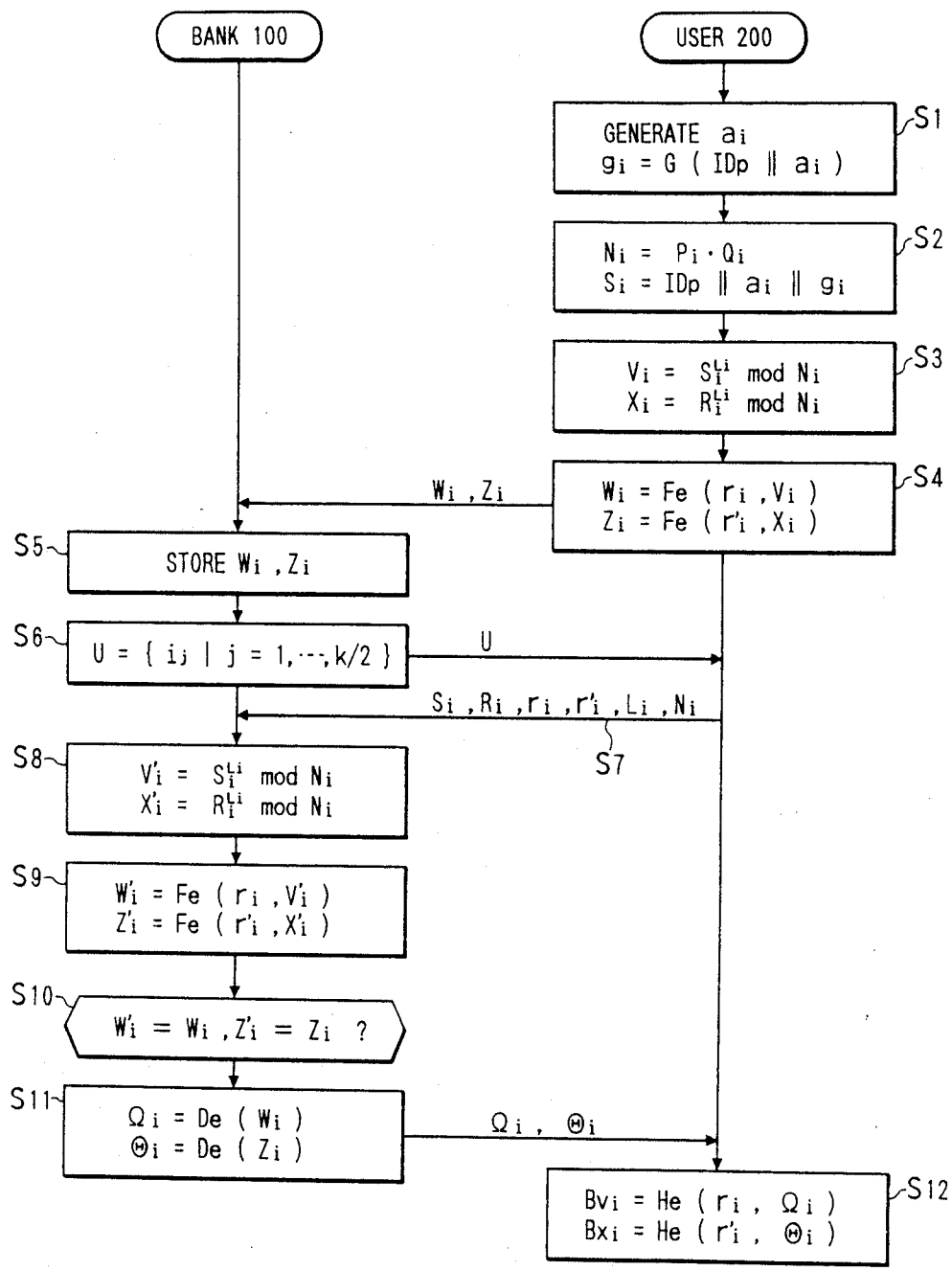
FIG. 2A is a flowchart showing the procedure for the issuance of an electronic cash between the bank 100 and the user 200 in a first embodiment of the present invention.
Figure 3:
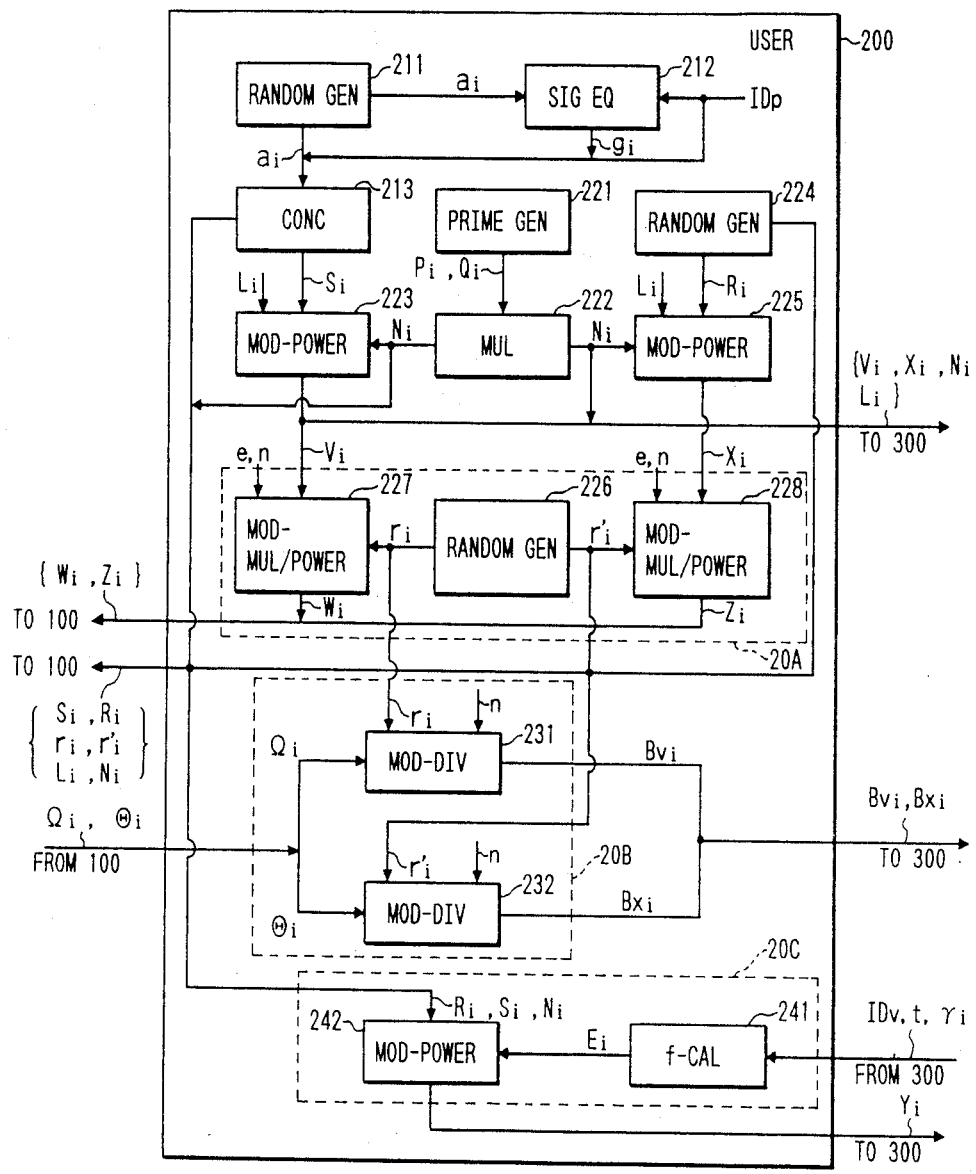
FIG. 3 is a functional block diagram of the user 200 in the first embodiment of the invention.
Figure 4:
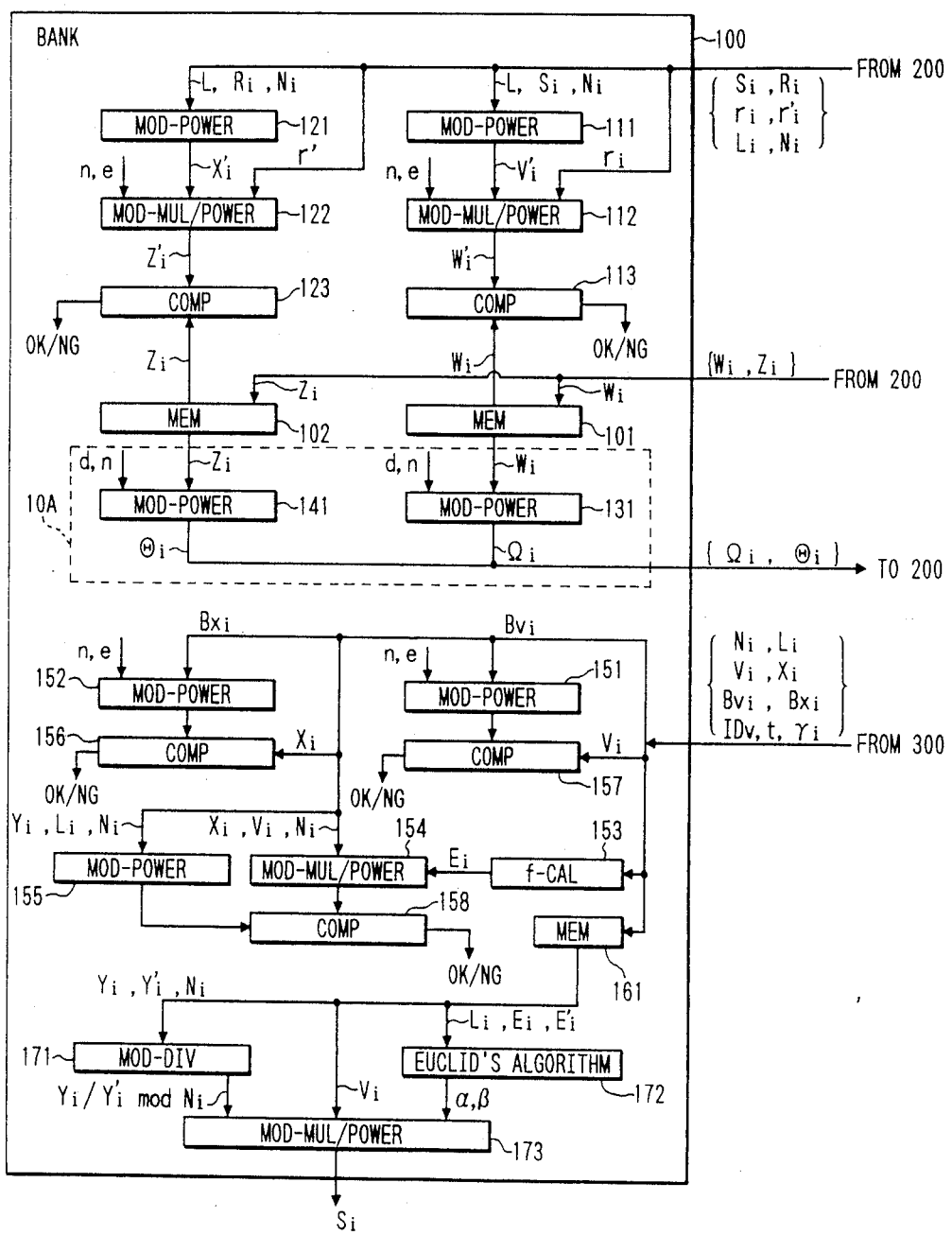
FIG. 4 is a functional block diagram of the bank 100 in the first embodiment of the invention.

FIG. 2A shows the procedure for the user to have the bank issue electronic cash, and FIGS. 3 and 4 show the arrangements of the user 200 and the bank 100, respectively. In the following description, i = 1, ..., k.

Step $S_1$: The user generates a random number $a_i$ by use of a random generator 211 and supplies it to signing equipment 212, along with the identification information IDp. The signing equipment 212 is to apply a user's signature to the concatenation of the random number $a_i$ and the identification information IDp, and its signed output $g_i$ is represented by $g_i = G(a_i \| \text{IDp})$, where G is a signature function. The symbol $\|$ indicates the concatenation; for example, $01110 \| 110 = 01110110$.

Step $S_2$: The output $a_i$ of the random generator 211 and the output $g_i$ of the signing equipment 212 are input into a concatenator 213 to create the secret information Si. The secret information Si is a concatenation of the information IDp, the random number $a_i$ and the signature $g_i$ as expressed by the following equation, and hence contains the identification information IDp intact.

$$S_i = \text{IDp} \| a_i \| g_i \qquad (6)$$

Further, two prime numbers Pi and Qi are generated by means of a prime generator 221 and their product Ni is obtained by a multiplier 222.

Step $S_3$: User information given by the following equation, which is a first one-way function, is computed by a modulo power calculator 223 from a prime number Li, the output Si of the concatenator 213 and the output Ni of the multiplier 222.

$$V_i = s_i^{L_i} \bmod N_i \qquad (7)$$

On the other hand, authentication information given by the following equation, which is a second one-way function, is computed by a modulo power calculator 225 from secret random information Ri produced by a random generator 224, the output Ni and the prime number Li.

$$X_i = R_i^{L_i} \bmod N_i \qquad (8)$$

Since Li and Ni are used as parameters forming the one-way functions expressed by Eqs. (7) and (8), they will hereinafter be referred to as parameter information.

Step $S_4$: Preprocessing functions for randomizing the user information Vi and the authentication information Xi with randomizing random numbers $r_i$ and $r_i'$ in blind signature preprocessing are one-way functions, which are generally expressed by Fe as shown below but need not always be of the same form.

$$W_i = Fe\{r_i, V_i\} \qquad (9)$$

$$Z_i = Fe\{r_i, X_i\} \qquad (10)$$

In the embodiment illustrated in FIGS. 2A and 3, this preprocessing takes place in the following manner. Randomized user information expressed by the following equation is computed by a modulo multiplication/power calculator 227 from the randomizing random number $r_i$ from a random generator 226, the user information Vi from the modulo power calculator 223 and the public keys e and n.

$$W_i = Fe\{r_i, V_i\} = r_i^e \times V_i \bmod n \qquad (11)$$

On the other hand, randomized authentication information expressed by the following equation is calculated by a modulo multiplication/power calculator 228 from the randomizing random number $r_1'$ generated by the random generator 226, the authentication information Xi generated by the modulo power calculator 225 and the public keys e and n.

$$Zi = Fe\{r_i', Xi\} = r_i'^e \times Xi \bmod n \tag{12}$$

The user sends the randomized user information Wi and the randomized authentication information Zi to the bank.

The random generator 226 and the modulo multiplication/power calculators 227 and 228 constitute a blind signature preprocessor 20A.

Step $S_5$: Upon receipt of the randomized user information Wi and the randomized authentication information Zi from the user 200, the bank 100 stores them in memories 101 and 102, respectively (see FIG. 4).

Next, the bank 100 makes the user 100 open k/2 sets of information $(Si, Ri, r_i, r_i', Li, Ni)$ to check that the user 100 has correctly inserted his identification information IDp in each secret information Si, and then verifies, by the following procedure, that the user 100 has correctly performed Steps $S_1$ through $S_4$.

Step $S_6$: The bank 100 decides items $i_j$ (where j=1, ..., k/2) for specifying the k/2 sets of information $(Si, Ri, r_i, r_i', Li, Ni)$ which the bank 100 demands the user 200 to open, and sends the item group $U = \{i_j | j=1, \ldots, k/2\}$ to the user 200. The following description will be given on the assumption tht i=1, ..., k/2 are items for unopened information.

Step $S_7$: Upon receipt of the demand from the bank 100, the user 200 sends k/2 sets of information $\{Si, Ri, r_i, r_i', Li, Ni\}$ corresponding to the respective items i specified by the bank 100.

When an i is the item to be opened, the bank 100 performs procedures of the following Steps $S_8$ through $S_{10}$.

Step $S_8$: When the i is the item to be opened, it is checked whether the IDp has been inserted at a predetermined position in Si, and if yes, the following calculations are performed by modulo power calculators 111 and 121 from the information $\{Si, Ri, Li, Ni\}$ received from the user 200.

$Vi' = Si^{Li} \bmod Ni$ $Xi' = Ri^{Li} \bmod Ni$

Step $S_9$: The following calculations are performed by modulo power calculators 112 and 122 from the outputs Vi' and Xi' of the modulo multiplication/power calculators 112 and 121, the received information $r_i$ and $r_i'$ and the public keys e and n.

$Wi' = r_i^e \times Vi' \bmod n$ $Zi' = r_i^e \times Xi' \bmod n$

Step $S_{10}$: The value Wi stored in the memory 101 and the output Wi' of the modulo power calculator 112 are compared by a comparator 113. The value Zi stored in the memory 102 and the output Zi' of the modulo power calculator 122 are also compared by a comparator 123.

In this way, the bank 100 conducts the above checks for all of the k/2 items i, and if any one of them shows disagreement, then no further processing will be done. When agreements are obtained for all the i's, then the bank 100 withdraws the amount of money concerned from the user's account, or after receiving the amount of money concerned from the user the bank performs the following procedure for the i which is not the item to be opened.

Step $S_{11}$: Based on the public key n, the secret key d and the values Wi and Zi stored in the memories 101 and 102, signed-randomized user information $\Omega i$ and signed-randomized authentication information $\Theta i$ expressed by the following equations, respectively, are calculated by modulo power calculators 131 and 141, and the both pieces of information $\Omega i$ and $\Theta i$ are sent to the user 200.

$$\Omega i = De(Wi) = Wi^d \bmod n \tag{13}$$

$$\Theta i = De(Zi) = Zi^d \bmod n \tag{14}$$

The processing expressed by Eqs. (13) and (14) is the signature applied by the bank 100 to the randomized user information Wi and the randomized authentication information Zi, and De is called a signature function. The modulo power calculators 131 and 141 constitute signing equipment 10A.

Step $S_{12}$: Having received the signed-randomized user information $\Omega i$ and the signed-randomized authentication information $\Theta i$ from the bank 100, the user 200 performs the following calculations by modulo dividers 231 and 232 on the basis of the above-mentioned information $\Omega i$ and $\Theta i$ received from the bank 100, the randomizing random numbers $r_i$ and $r_i'$ generated by the random generator 226 and the public key n, thereby obtaining signed user information Bvi and signed authentication information Bxi which are free from the influence of the randomizing random numbers $r_i$ and $r_i'$ and equivalent to those obtained by having the bank 100 sign directly on the user information Vi and the authentication information Xi.

$$BVi = He\{r_i, \Omega i\} = \Omega i / r_i \bmod n \tag{15}$$

$$BXi = He\{ri', \Theta i\} = \Theta i / r_i' \bmod n \tag{16}$$

Substituting Eqs. (11) and (13) into Eq. (15) and Eqs. (12) and (14) into Eq. (16), the following equations hold.

$BVi = He\{r_i, \Omega i\} = r_i^{e \times d} \times Vi^d / r_1 \equiv Vi^d \bmod n = De(Vi)$ $BXi = He\{r_i', \Theta i\} = r_i'^{e \times d} \times Xi^d / r_1' \equiv Xi^d \bmod n = De(Xi)$ These two equations show that the processing by the user 200 on the signed-randomized user information $\Omega i$ and the signed-randomized authentication information $\Theta i$ by use of the function He provides the results De(Vi) and De(Xi) of direct processing by the bank 100 on the user information Vi and the authentication information Xi by use of the signature function De. In other words, the function He removes the influence of the randomizing random numbers $r_i$ and $r_i'$ from the signed-randomized user information and authentication information $\Omega i$ and $\Theta i$. The processing for removing the influence of the randomizing random numbers $r_i$ and $r_i'$ will hereinafter be referred to as the blind signature postprocessing and the function He as the postprocessing function. The modulo dividers 231 and 232 constitute a blind postprocessor 20B. The user 200 uses the set of information $\{Vi, Bvi, Xi, Bxi\}$ as electronic cash.

Figure 2B:
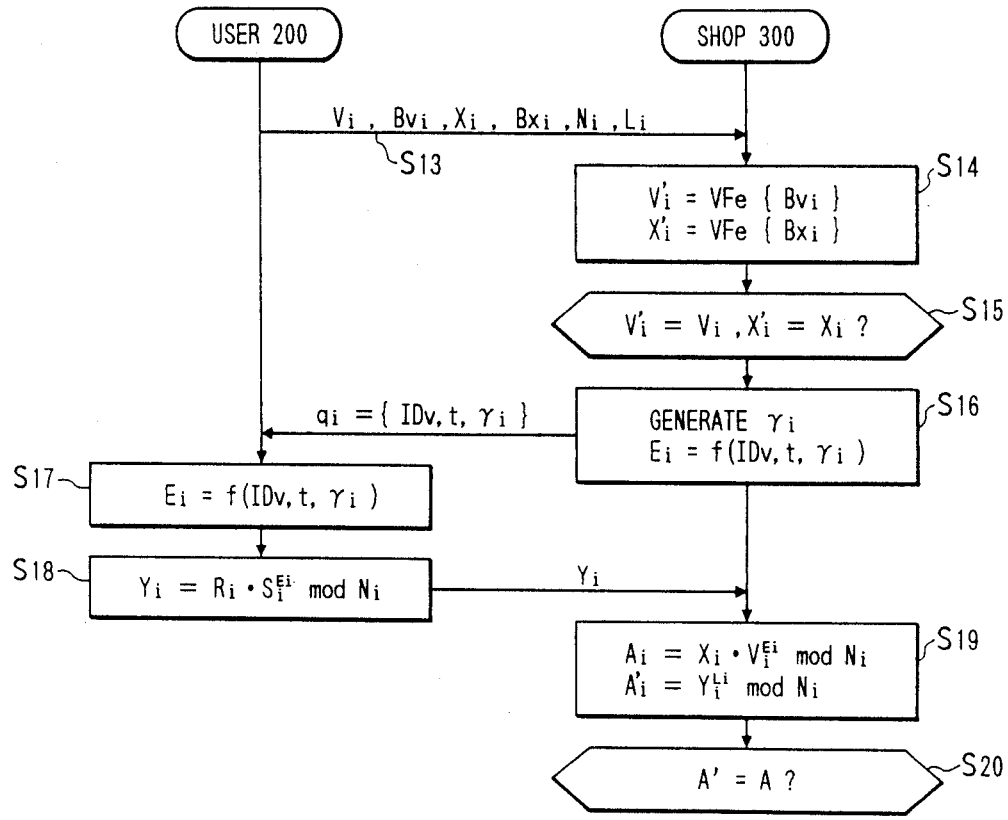
FIG. 2B is a flowchart showing the procedure for the use of the electronic cash between the user 200 and the shop 300 in the first embodiment of the invention.
Figure 5:
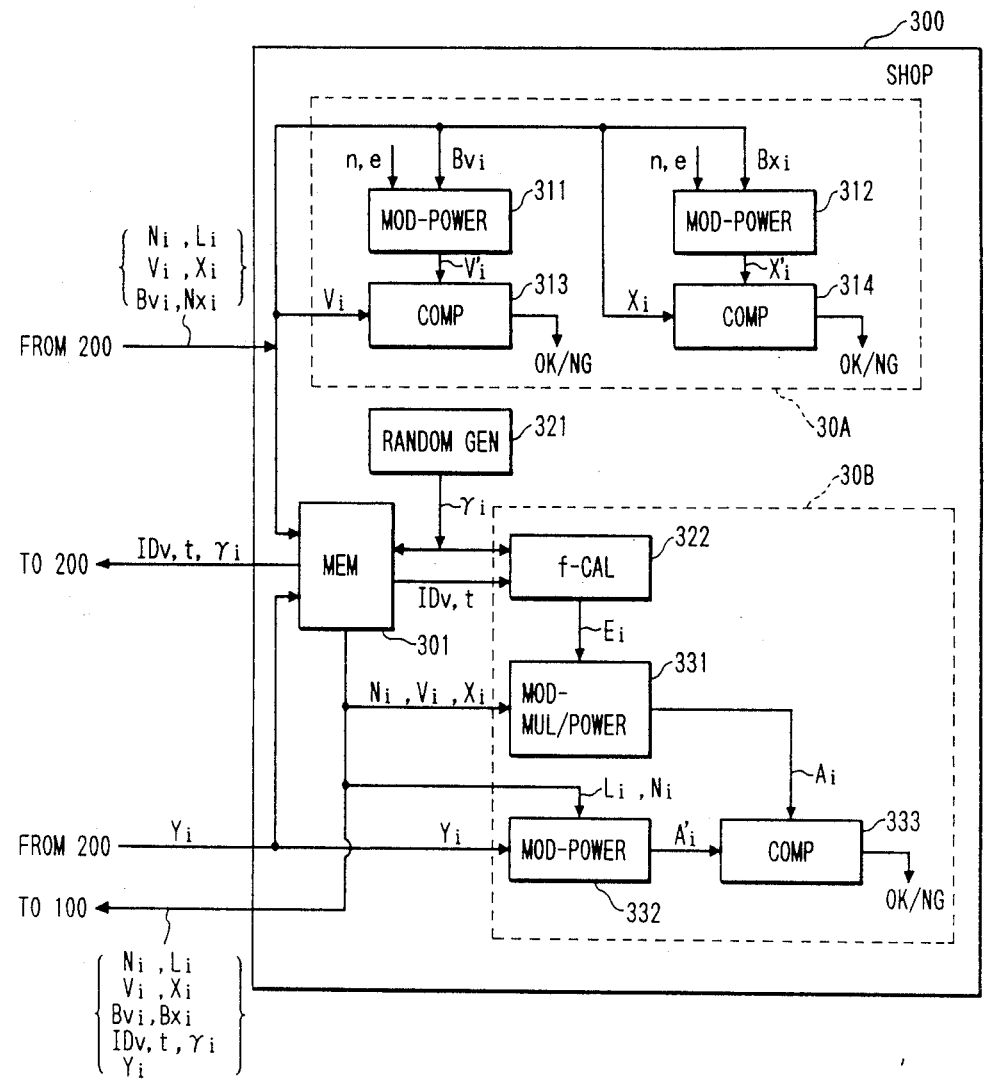
FIG. 5 is a functional block diagram of the shop 300 in the first embodiment of the invention.

Next, a description will be given of the case where the user 200 pays with electronic cash at the shop 300. FIG. 2B shows an example of the procedure between the user 200 and the shop 300, and FIG. 5 shows the block form the configuration of the shop 300.

Step $S_{13}$: The user 200 sends electronic cash {Vi, Bvi, Xi, Bxi} and parameter information {Ni, Li} to the shop 300.

Step $S_{14}$: Having received the electronic cash {Vi, Bvi, Xi, Bxi} and the information {Ni, Li}, the shop 300 stores them in a memory 301 and at the same time calculates the following verification functions VFe by modulo power calculators 311 and 312.

$Vi' = VFe\{Bvi\} = Bvi^e \bmod n$ $Xi' = VFe\{Bxi\} = Bxi^e \bmod n$

Step $S_{15}$: The shop 300 checks, by comparators 313 and 312, as to whether k/2 calculated results $Vi'$ and $Xi'$ and the corresponding information Vi and Xi received from the user 100 are equal to each other ($i=1, \ldots, k/2$). By this, it can be determined whether the signature applied to each of the signed user information Bvi and the signed authentication information Bxi is true or not.

Step $S_{16}$: When the k/2 calculated results are found good, the shop 300 generates k/2 random numbers $\gamma_i$ by a random generator 321, stores them in the memory 301 and then transmits an inquiry qi including shop identification information IDv, time t and the random number $\gamma_i$ to the user 200. At the same time the shop 300 calculates $Ei = f(qi) = f(IDv, t, \gamma_i)$ by an f-calculator 322 which calculates a public one-way function f. Hereinafter, it is assumed that an inequation $0 < Ei < Li$ holds.

Step $S_{17}$: Upon receipt of the inquiry $qi = \{IDv, t, \gamma_i\}$ from the shop 300, the user 200 calculates $Ei = f(IDv, t, \gamma_i)$ by a public f-calculator 241.

Step $S_{18}$: The user 200 inputs the output Si of the concatenator 213, the output Ni of the multiplier 222, the output Ri of the random generator 224 and the output Ei of the f-calculator 241 into a modulo multiplication/power calculator 242 to calculate a response Yi by the following equation which is a one-way function:

$$Yi = Ri \times Si^{Ei} \bmod Ni \qquad (17)$$

Then the user 200 transmits the response Yi to the shop 300 ($i=1, \ldots, k/2$).

Step $S_{19}$: The shop 300 verifies the validity of the response Yi from the user 200 by calculating $$Ai = Xi \times Vi^{Ei} \bmod Ni \qquad (18)$$

with a modulo multiplication/power calculator 331 and $$Ai' = Yi^{Li} \bmod Ni \qquad (19)$$

with a modulo power calculator 332.

Step $S_{20}$: It is checked by a comparator 333 whether Ai and $Ai'$ coincide with each other ($i=1, \ldots, k/2$).

The modulo power calculators 311 and 312 and the comparators 313 and 314 constitute verifying equipment 30A for verifying the validity of the user information Vi and the authentication information Xi. The f-calculator 322, the modulo multiplication/power calculator 331, the modulo power calculator 332 and the comparator 333 constitute verifying equipment 30B for verifying the validity of the response Yi. Although in the above, processing for all of the i's ($i=1, \ldots, k/2$) is performed in each of Steps $S_{16}$ through $S_{20}$, it is also possible to repeat Steps $S_{16}$ through $S_{20}$ for every i.

Figure 2C:
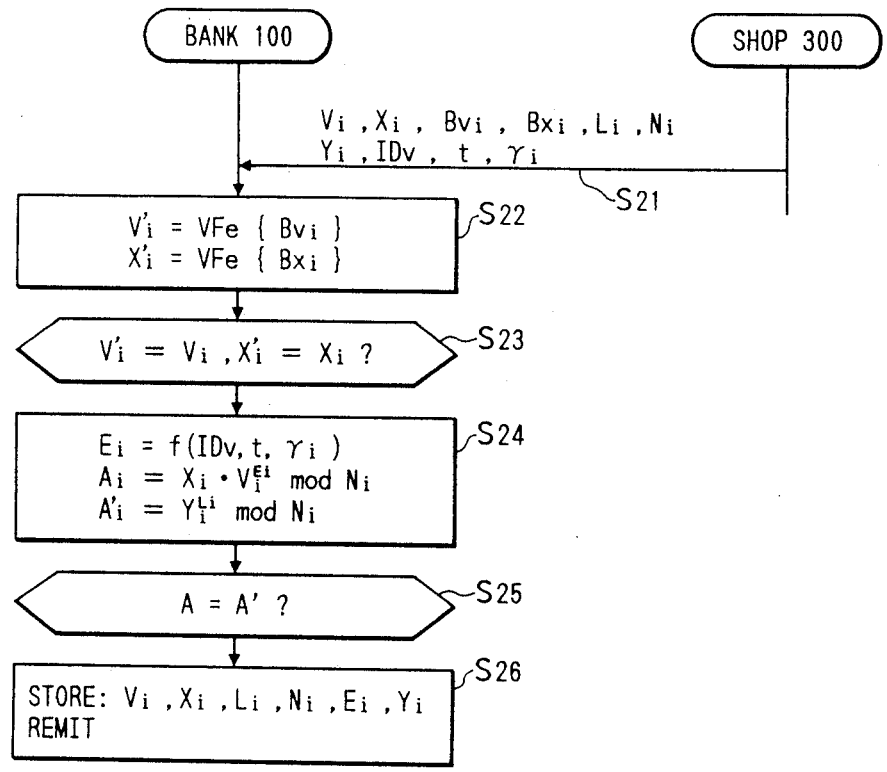
FIG. 2C is a flowchart showing the procedure for the settlement of accounts between the bank 100 and the shop 300 in the first embodiment of the invention.

Next, a description will be given of the settlement of accounts between the shop 300 and the bank 100. FIG. 2C shows an example of the procedure therefor between the shop 300 and the bank 100.

Step $S_{21}$: The shop 300 presents the electronic cash information {Vi, Xi, Bvi, Bxi}, the parameter information {Ni, Li}, the inquiry {IDv, t, $\gamma_i$} and the response Yi to the bank 100 ($i=1, \ldots, k/2$).

Step $S_{22}$: Having received the above information {Ni, Li, Vi, Xi, Bxi, Bvi, IDv, t, $\gamma_i$, Yi} from the shop 300, the bank 100 inputs the public keys e and n into modulo power calculators 151 and 152 to calculate the following verification functions VFe:

$Vi' = VFe\{Bvi\} = Bvi^e \bmod n$ $Xi' = VFe\{Bxi\} = Bxi^e \bmod n$

Step $S_{23}$: It is checked by comparators 156 and 157 whether the values $Vi'$ and $Xi'$ are equal to the received information Vi and Xi ($i=1, \ldots, k/2$). When they are equal, it is determined that the signature applied to the information Bvi and Bxi is true. Hence, it is determined that the information Vi and Xi bearing the signature are also valid.

Step $S_{24}$: When all of such calculated values are found good, the bank 100 calculates $Ei = f(qi) = f(IDv, t, \gamma_i)$ by an f-calculator 153, $Ai = Xi \times Vi^{Ei} \bmod Ni$ by a modulo multiplication/power calculator 154 and $Ai' = Yi^{Li} \bmod Ni$ by a modulo power calculator 155.

Step $S_{25}$: The bank 100 checks by a comparator 158 whether the values Ai and $Ai'$ coincide with each other ($i=1, \ldots, k/2$). By this, it can be determined that both Di and Yi are valid.

Step $S_{26}$: The bank 100 stores in a memory 161 the information {Ni, Li, Vi, Xi, Ei, Yi} ($i=1, \ldots, k/2$) presented from the shop 300 and pays the amount of money concerned into the account of the shop identification IDv.

While the above embodiment utilizes the authentication scheme with interactive proof system based on the difficulty of the calculation of higher degree roots, a similar system can also be implemented by such authentication scheme with interactive proof system as disclosed in M. Tompa and H. Woll, "Random Self-Reducibility and Zero Knowledge Interactive Proofs of Possession of Information", The Proc. of FOCS, 1987, pp. 472-482.

Incidentally, since the authentication scheme with interactive proof system generally satisfies the requirement of soundness property, the identification information IDp of the user will be revealed, if he uses the same pair of user information Vi and authentication information Xi twice or more.

Next, a description will be given of the detection of invalid double usage of the electronic cash.

As described above, when the user 200 uses the electronic cash as a payment to the shop 300, the latter sends the inquiry $qi = \{IDv, t, \gamma_i\}$ to the former. Since the inquiry contains the identification information IDv, time t and the random number $\gamma_i$, the identification information IDv differs with shops and the information t also differs with time even at the same shop. Accordingly, if the user 200 fraudulently uses the same electronic cash twice, any one of the contents of the inquiry {IDv, t, $\gamma_i$} provided by the shop in response to the second use will naturally differ from the corresponding piece of information in the first inquiry; hence, it can be expected that Ei=f(IDv, t, $\gamma_i$) will also differ. Thus, the corresponding response Yi will also differ as seen from Eq. (17). Consequently, if the electronic cash should be used twice, the bank would have two different pairs of information (Ei and Yi) for the same pair of information (Vi and Xi). Now, let these pairs of information be represented by (Ei, Yi) and (Ei', Yi'), respectively. Since these pairs of information both satisfy Eqs. (18) and (19) in Steps $S_{19}$ and $S_{20}$, the following equations hold:

$$Yi^{Li} \equiv Xi \cdot Vi^{Ei} \pmod{Ni} \quad (20)$$

$$Yi'^{Li} \equiv Xi \cdot Vi^{Ei'} \pmod{Ni} \quad (21)$$

From this, the following equation is obtained:

$$(Yi/Yi')^{Li} \equiv Vi^{Ei-Ei'} \pmod{Ni} \quad (22)$$

Further, since $Si^{Li} \equiv Vi \pmod{Ni}$ holds, the following equation is obtained:

$$(Yi/Yi') \equiv Vi^{Ei-Ei'} \pmod{Ni} \quad (23)$$

Here, since Li is a prime number, Li and Ei−Ei' are mutually prime, and integers $\alpha$ and $\beta$ which satisfy the following equation can be calculated by an Euclid's algorithm:

$$\alpha \times L + \beta \times (Ei - Ei') = 1 \quad (24)$$

Accordingly, it follows that $$Vi^{\alpha} \times (Yi/Yi')^{\beta} \equiv Si^{\alpha \times L + \beta \times (Ei-Ei')} \equiv Si \pmod{Ni} \quad (25)$$

Thus, the secret information Si can be calculated. Since the secret information Si contains the user identification information IDp in the raw form, it is possible to specify the user who used the electronic cash fraudulently.

The above-described double usage detecting procedure is inserted between Steps $S_{25}$ and $S_{26}$ in FIG. 2C, for instance. This procedure will be described below with reference to FIGS. 2D and 4.

Step $S_{C1}$: The bank 100 searches the memory 161 for the presence of the same information as the received one (Vi, Xi). If the same information is not found, the bank 100 proceeds to Step $S_{26}$ in FIG. 2C, and if the same information is found, the bank 100 proceeds to the next step.

Step $S_{C2}$: The information (Ei', Yi') corresponding to the received information (Vi, Xi) is read out of the memory 161.

Step $S_{C3}$: The integers $\alpha$ and $\beta$ which satisfy Eq. (24) are obtained by a Euclid's algorithm calculator 172.

Step $S_{C4}$: Yi, Yi' and Ni are input into a modulo divider 171 to calculate Yi/Yi' mod Ni, and the calculated result, $\alpha$, $\beta$ and Ni are input into a modulo multiplication/power calculator 173, wherein the aforementioned equation (25) is calculated, thus obtaining the secret information Si.

Step $S_{C5}$: The user identification information IDp is extracted from the secret information Si.

As described above, according to the present invention, the information Xi based on the secret information Si containing the user identification information IDp in the raw form and the information Xi based on the random number information Ri are individual subjected to the blind signature preprocessing (Step $S_4$ in FIG. 2A). This precludes the problem of such two-argument collision-free property of the one-way function $f(x_i, y_i)$ as is needed in the Chaum, et al. scheme. Conversely speaking, the Chaum, et al. electronic cash scheme calls for the two-argument collision-free property partly because the same one-way function f contains as parameters both of the information $x_i$ based on the random number and the information $y_i$ based on the identification information ID and partly because the information $y_i$ is correlcated by the random number with the identification information ID, that is, the information $y_i$ is correlated with the information $x_i$.

Incidentally, as mentioned just above, the pieces of information {Vi, Wi} and {Xi, Zi} according to the present invention are processed independently of each other, and the pieces of information $\Omega i$ and $\Theta i$ obtained after the blind signature processing by Eqs. (13) and (14) are also processed independenttly of each other. Moreover, the pieces of signed information Bvi and Bxi obtained after the postprocessing of the above pieces of information by Eqs. (15) and (16) are also processed independently of each other. In other words, the information sequences {Vi, Wi, $\Omega i$, Bvi} and {Xi, Zi, $\Theta i$, Bxi} are processed independently of each other until the user obtains the electronic cash after demanding the bank to issue it. In the process in which the user uses the electronic cash as shown in FIG. 2B, the secret information Si and the random information Ri are correlated by one function for the first time at the stage of generating the response Yi to the inquiry from the shop in Step $S_{17}$. This means that the processing for the information sequence {Vi, Wi, $\Omega i$, Bvi} and the processing for the information sequence {Xi, Zi, $\Theta i$, Bxi} in the process shown in FIG. 2A may be executed at different times and under different situations. This is utilized in a second embodiment of the present invention, which will be described below with reference to FIGS. 6A through 6D and 7A through 7D.

Second Embodiment

In the second embodiment the bank 100 issues a license to the suer 200 once, and each time the user 200 wants the bank 100 to issue him electronic cash, he has the bank 100 only certify a piece of information containing both the license and the random information, thereby simplifying the procedure for the issuance of electronic cash. Eventually, in the procedure for issuing the license an information sequence corresponding to the afore-mentioned information sequence {Vi, Wi, $\Omega i$, Bvi} related to the secret information Si is successively processed, and in the procedure for issuing electronic cash based on the issued license an information sequence corresponding to the afore-mentioned information sequence {Xi, Zi, $\Theta i$, Bxi} related to the random information Ri is successively processed. In this example the electronic cash which is issued in a simplified form by the simplified procedure will be referred to as an electronic coin C.

Figure 6A:
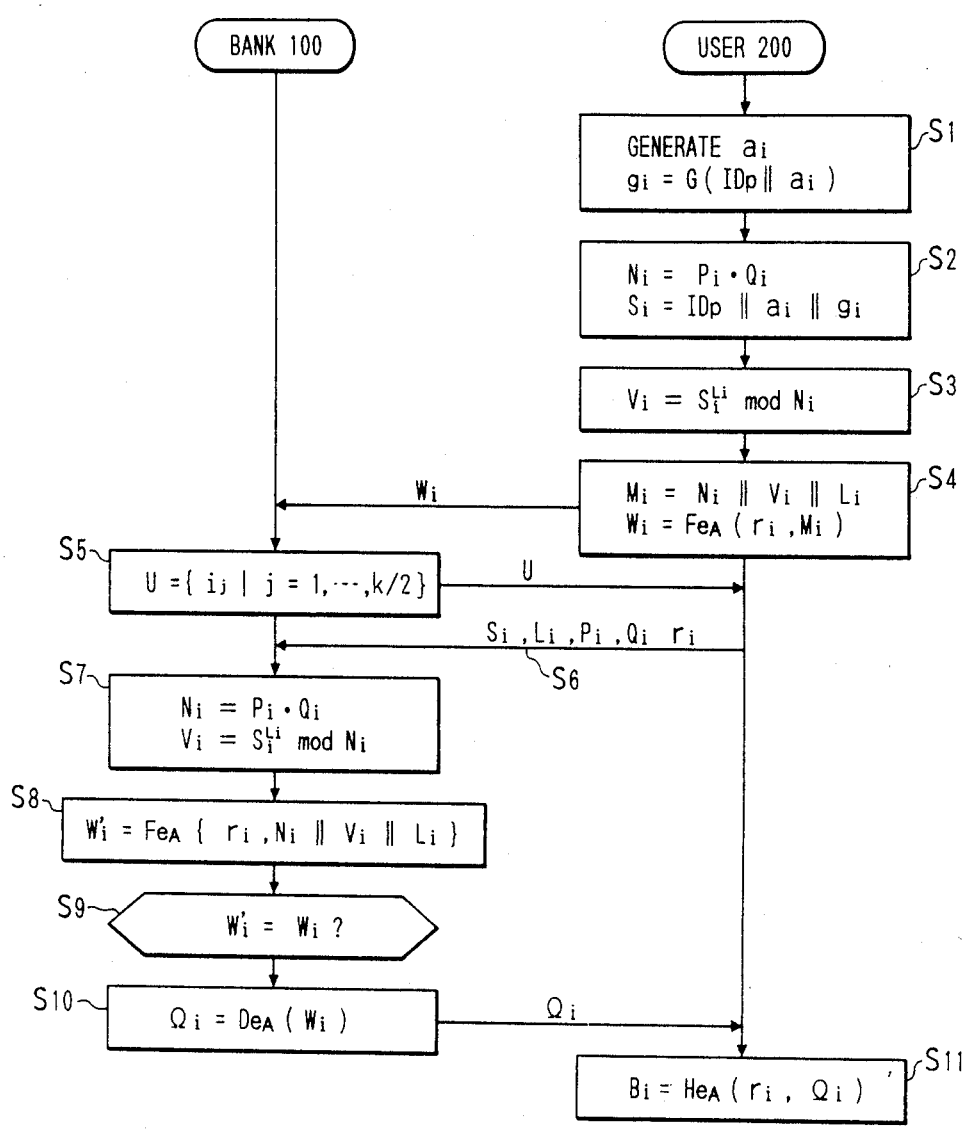
FIG. 6A is a flowchart showing the procedure for the issuance of a license between the bank 100 and the user 200 in a second embodiment of the present invention.
Figure 7A:
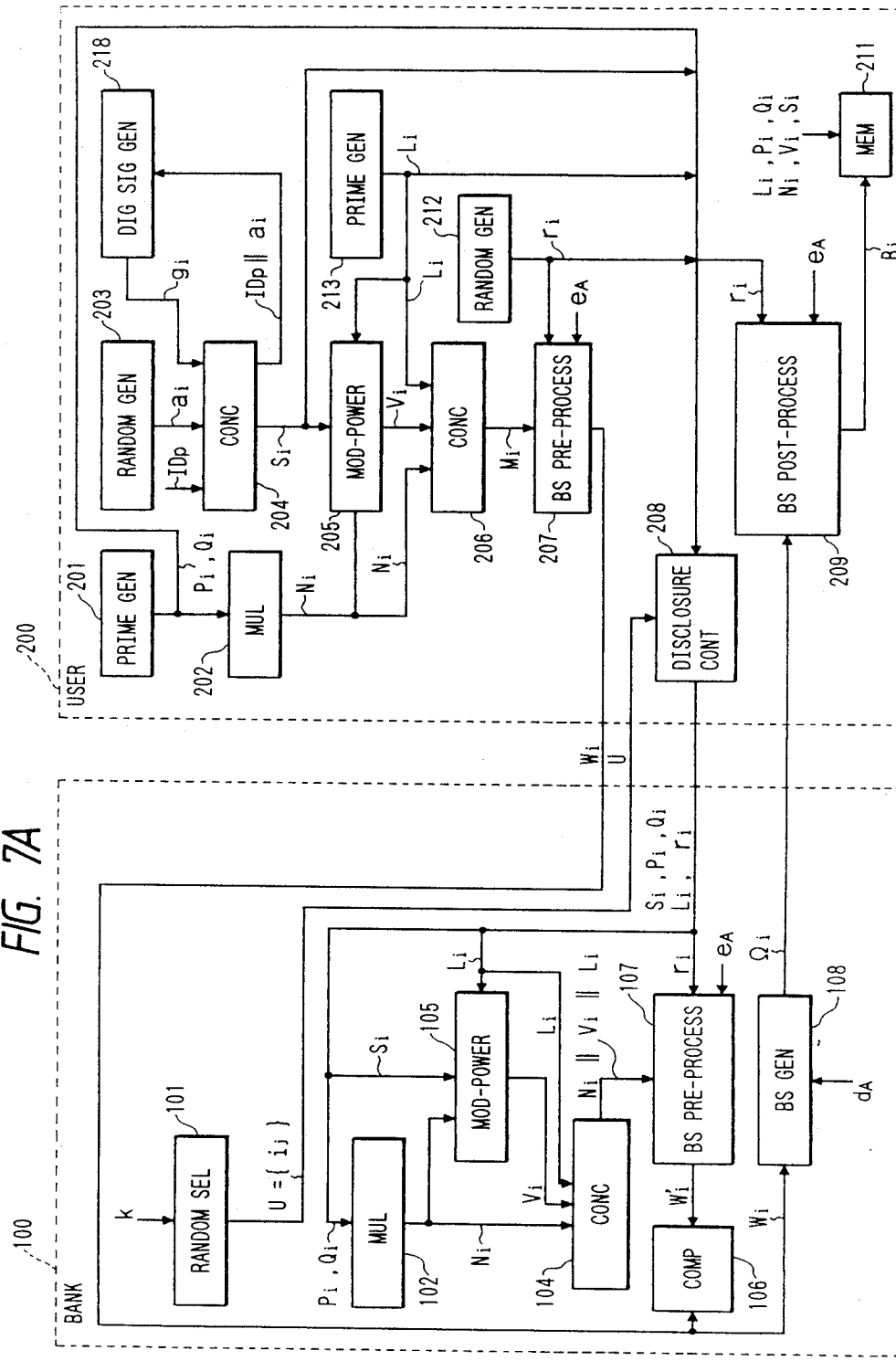
FIG. 7A shows functional block diagrams of the bank 100 and the user 200 in FIG. 6A.

A description will be given first, with reference to FIGS. 6A and 7A, of the case where the user 200 who has opened an account with the bank 100 has the latter issue a license. Here, IDp represents identification information such as the account number or the like of the user 200.

The bank 100 creates, as information corresponding to the license, a pair of secret key $d_A$ and public key $e_A$ which are to be used for the blind signature processing, and makes the key $e_A$ public. In the blind signature scheme, as described previously, the user 200 who wishes the bank 200 to apply its blind signature to a certain message M, randomizes the message with the blind signature preprocessing function $W=Fe_A(r, M)$ using the public key $e_A$ and the randomizing random number r to obtain a randomized message W, which is sent to the bank 100. The bank 100 applies its signature to the randomized message W by a blind signature processing function $\Omega=De_A(W)$ using the secret key $d_A$ and then sends the signed randomized message $\Omega$ to the user 200. The user 200 removes the influence of the random number r from the signed randomized message $\Omega$ with a random number removing function $He_A(\Omega)$ using the random number r used for generating the randomized message W, by which the user 200 can obtain a signed message $De_A(M)$ bearing the signature of the bank 100 corresponding to the public key $e_A$. Here, $Fe_A$ for randomizing the message M is a blind signature preprocessing function which is a one-way function, $De_A$ is a blind signature processing function, and $He_A$ for removing the influence of the random number is a blind signature postprocessing function. This blind signature scheme can be implemented by employing either of the afore-mentioned Chaum's scheme utilizing the RSA cryptosystem and the schemes disclosed in our prior U.S. Patent Application No. 367,650 (filed June 19, 1989).

The user 200 generates information Vi, referred to as user information in this embodiment, from the secret information Si containing his identification information IDp as it is, and then he has the bank 100 sign the user information Vi through use of the blind signature scheme. The signed user information, i.e. $De_A(Vi)$, will be referred to as a license. The reason for using the blind signature scheme is to protect the privacy of the user 200 against the conspiracy of the shop 300 and the bank 100.

Now, the procedure for the user 200 to have the bank 100 issue the license, shown in FIG. 6A, will be described more specifically with reference to FIG. 7A which illustrates functional blocks of the user 200 and the bank 100. In the following description, $i=1, \ldots, k/2$.

Step $S_1$: The user 200 generates a random number $a_i$ by a random generator 203, which is input into a concatenator 204, along with the user identification information IDp. The concatenated output $IDp \| a_i$ is input into a signature generator 218 to obtain $$g_i = G(IDp \| a_i) \tag{26}$$

Step $S_2$: The output of the signature generator 218 is input into the concatenator 204 along with $(IDp \| a_i)$ to obtain the following secret information:

$$Si = IDp \| a_i \| g_i \tag{27}$$

The secret information Si is stored in a memory 211. Moreover, k pairs of prime numbers (Pi, Qi) are produced by a prime number generator 201 and the product Ni of the prime numbers Pi and Qi are obtained by a multiplier 202 and is stored in the memory 211.

Step $S_3$: A prime number Li (a prime number greater than 3, for example) is generated by a prime number generator 213 and the following user information $$Vi = Si^{Li} \bmod Ni \tag{28}$$

is calculated by a modulo power multiplier 205 from the prime number Li, the secret information Si and the product Ni. Then the prime number Li and the user information Vi are stored in the memory 211.

Step $S_4$: The product Ni, the user information Vi and the prime number Li are input into a concatenator 206, and its output $Mi=(Ni \| Vi \| Li)$ and the public key $e_A$ for the generation of the license are input into a blind signature preprocessor 207 to obtain the following randomized user information:

$$Wi = Fe_A(r_i, Mi) \tag{29}$$

The randomized user information Wi thus obtained is sent to the bank 100. The blind signature preprocessing function $Fe_A$ may be the same as that given by Eq. (1) of the Chaum's scheme utilizing the RSA cryptosystem or the function proposed in our prior U.S. Patent Application No. 367,650 (filed June 19, 1989).

Next, the bank 100 makes the user 200 disclose the k/2 sets of information {Si, Li, Pi, Qi, $r_i$}, after which the bank 100 follows the following procedure to verify that the user 200 has correctly inserted his identification information IDp in each secret information Si and has correctly executed Steps $S_1$ through $S_4$.

Step $S_5$: The bank 100 selects, by a random selector 101, k/2 different items $i_j$ at random from k items i, and sends to the user 200 the set of items $i_j$ as a disclosure demand $U=\{i_j | j=1, \ldots, k/2\}$. For the sake of brevity, let it be assumed that the bank 100 has selected $i=k/2+1, k/2+2, \ldots, k$ as the $i_j$. Accordingly, $i=1, \ldots, k/2$ are not the items of disclosure.

Step $S_6$: Upon receipt of the disclosure demand U from the bank 100, the user 200 discloses, by a disclosure control 208, the k/2 sets of information {Si, Li, Pi, Qi, $r_i$} specified by the bank 100. Here, $r_i$ is the random number used in the blind signature preprocessing function $Fe_A$ for the randomized user information Wi.

Step $S_7$: When i is the item of disclosure, that is, when $k/2+1 \leq i \leq k$, the bank 100 checks whether the IDp has been inserted at a predetermined position in Si, and if yes, obtains, by a multiplier 102, the product $Ni=Pi \times Qi$ from the information {Si, Li, Pi, Qi, $r_i$} and then calculates the following user information Vi by a modulo power calculator 105:

$$Vi = Si^{Li} \bmod Ni \tag{30}$$

Step $S_8$: The following value Wi' is calculated by a concatenator 104 and a blind signature preprocessor 107 from the output Vi' of the modulo power calculator 105, the received random number $r_i$ and the public key $e_A$.

$$Wi' = Fe_A \{r_i' (Ni \| Vi \| Li)\}$$

Step $S_9$: The value of the received randomized user information Wi and the value Wi' are compared by a comparator 106. If they coincide, the user's demand is accepted, and if not, the user's demand is not accepted and no further processing takes place.

In this way, the bank 100 makes the above comparison for all of the k/2 items i and, when any one of comparison results shows disagreementt, discontinue further processing. When all of the k/2 comparison results are found good, the bank 100 performs the following signing procedure for the items i which are not the objects of disclosure ($i=1, \ldots, k/2$).

Step $S_{10}$: The randomized user informattion Wi and the secret key $d_A$ for the blind signature of the bank 100 are input into a blind signature generator 108 to obtain signed-randomized user information $\Omega i$ defined by the following equation:

$$\Omega i = De_A (Wi) \tag{31}$$

The signed-randomized user information $\Omega i$ thus obtained is sent to the user 200. The function $De_A$ is a signature function of the bank 100 and may be the same as that given by Eq. (2) in the Chaum's scheme utilizing the RSA cryptosystem, for instance.

Step $S_{11}$: Having received the signed-randomized user information $\Omega i$ from the bank 100, the user 200 calculates the following equation (32) by a blind signature postprocessor 209 from the signed-randomized user information $\Omega i$, the random number $r_i$ used in the blind signature preprocessing (Step $S_4$) and the public key $e_A$, thereby removing the influence of the random number $r_i$ from the signed-randomized user information $\Omega i$.

$$Bi = He_A(r_i, \Omega i) \tag{32}$$

The function $He_A$ may be the same as that given by Eq. (3) of Chaum. The signed user information Bi thus obtained by Eq. (32) satisfies the following equation (33) as is the case with Eq. (5) of Chaum.

$$Bi = De_A (mi) \tag{33}$$

Accordingly, the signed user information Bi obtained by Eq. (32) is equivalent to information obtained in such a manner tthat the message $Mi = (Ni \,\|\, Vi \,\|\, Li)$ containing the user information Vi has been signed directly by the bank 100 using the secret key $d_A$ corresponding to the public key $e_A$. The user 200 can use the thus obtained signed user information Bi as a license of the electronic coin as many times as he wishes.

In the above, the blind signature $\Omega i$ is obtained for each of the k/2 pieces of randomized user information Wi in Step $S_{10}$ and k/2 pieces of signed user information Bi are obtained in Step $S_{11}$, but it is also possible to perform processing for signing messages $M_1, \ldots, M_{k/2}$ collectively as described below.

Step $S_{10}'$: For multiplex-randomized user information obtained by multiplexing all pieces of randomized user information Wi of k/2 items i which are not the objects of disclosure, the bank 100 calculates one blind signature, i.e. signed-randomized user information, $\Omega$ by the following equation (31') and sends it to the user 200.

$$\Omega = De_A (W_1, \ldots, W_{k/2}) \tag{31'}$$

Step $S_{11}'$: Based on the blind signature $\Omega$ received from the bank 100, the random number $r_i$ and the public key $e_A$, the user 200 calculates the following equation (32') by the blind postprocessor 209, obtaining a single piece of signed user information B.

$$B = He_A(r_1, \ldots, r_{k/2}, \Omega) \tag{32'}$$

The signed user information B thus obtained satisfies the following equation:

$$B = De_A(M_1, \ldots, M_{k/2}) \tag{33'}$$

The functions $De_A$ and $He_A$ by which Eqs. (31'), (32') and (33') hold can be implemented by, for instance, modifying the afore-mentioned Eqs. (1), (2) and (3) in the Chaum's blind signature scheme using the RSA cryptosystem, respectively, as follows:

$$Wi = Fe_A (Mi) = r_i^{e_A} \times Mi \bmod n \tag{1'}$$

$$Wi = Fe_A (Mi) = r_i^{e_A} \times Mi \bmod n \tag{1'}$$

$$\Omega = De_A (W_1, \ldots, W_{k/2}) = \left( \prod_{i=1}^{k/2} Wi \right)^{d_A} \bmod n \tag{2'}$$

$$He_A (r_1, \ldots, r_{k/2}, \Omega) = \Omega / \prod_{i=1}^{k/2} r_i \bmod n \tag{3'}$$

By determining the functions as mentioned above, the following equation holds:

$$\begin{aligned}
B &= He_A \{De_A (W_1, \ldots, W_{K/2}), r_1, \ldots, r_{k/2}\} \\
&= De_A (W_1, \ldots, W_{K/2}) / \prod_{i=1}^{k/2} r_i = \left( \prod_{i=1}^{k/2} Wi \right)^{d_A} / \prod_{i=1}^{k/2} r_i \\
&= \prod_{i=1}^{k/2} (Wi^{d_A}/r_i) = \prod_{i=1}^{k/2} (r_i^{e_A} \cdot Mi)^{d_A}/r_i = \prod_{i=1}^{k/2} \left( \frac{r_i^{e_A \cdot d_A}}{r_i} \times Mi^{d_A} \right) \\
&= \prod_{i=1}^{k/2} Mi^{d_A} \bmod n = De_A(M_1, \ldots, M_{K/2}).
\end{aligned}$$

In the following description, equations in the case where the license is composed of one piece of information B produced by the collective signature procedure as mentioned above, will each be referred to by a corresponding reference numeral added with a prime, but procedures and functional blocks are shown only in connection with the case of using a license composed of k/2 pieces of information Bi.

Figure 6B:
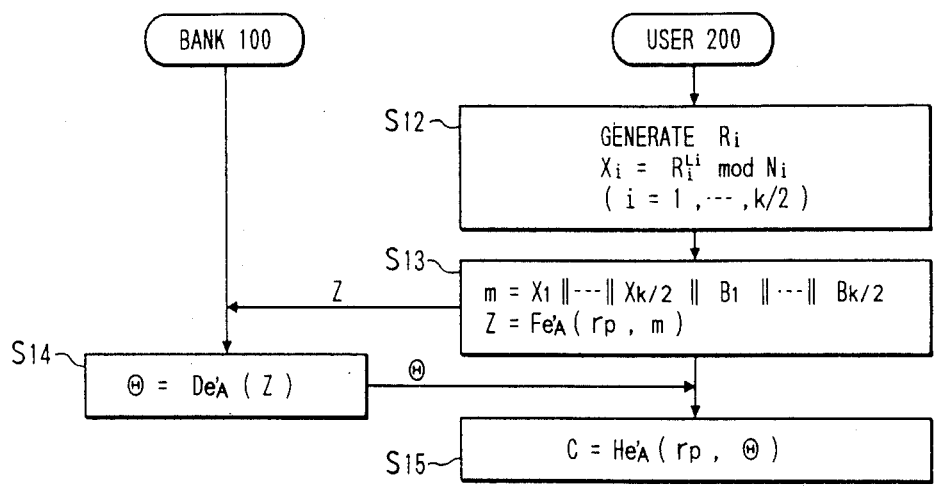
FIG. 6B is a flowchart showing the procedure for the issuance of an electronic coin between the bank 100 and the user 200 in the second embodiment of the invention.
Figure 7B:
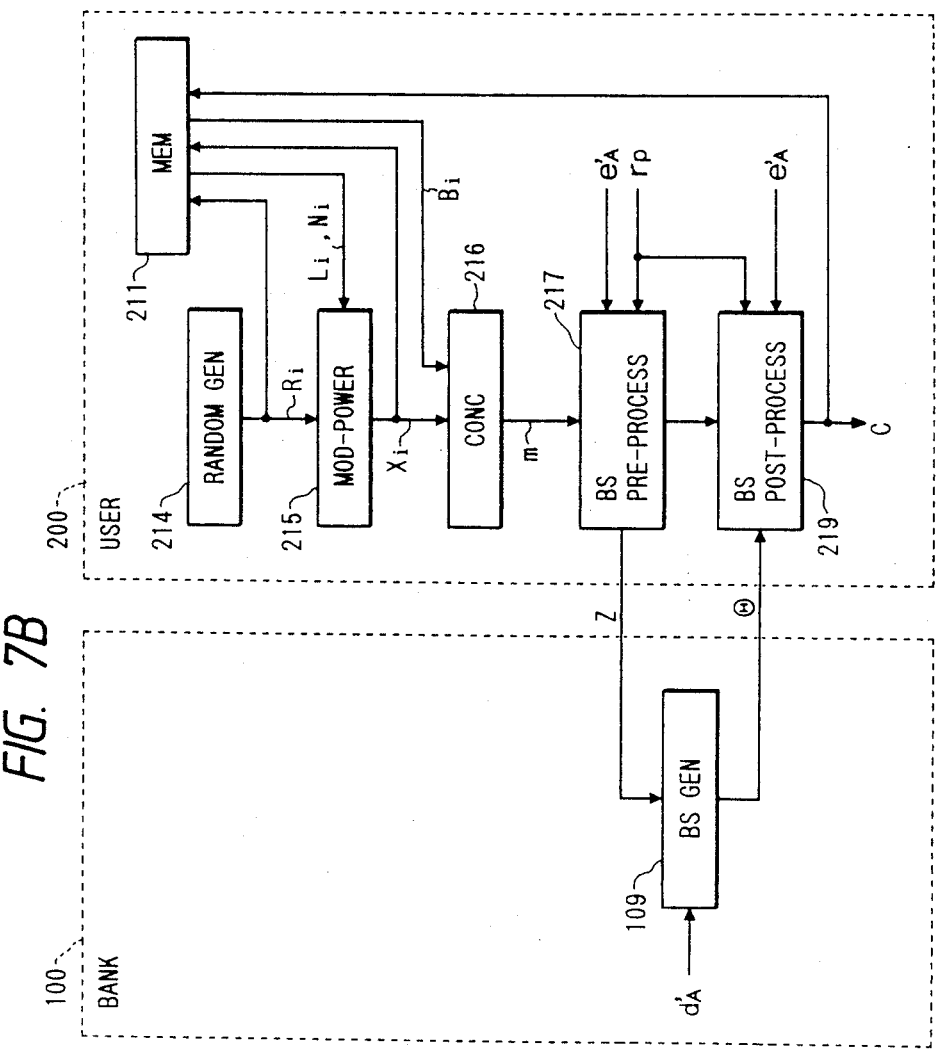
FIG. 7B shows functional block diagrams of the bank 100 and the user 200 in FIG. 6B.

Next, a description will be given of the procedure for the user 200 to have the bank 200 issue the electronic coin. In this procedure the user 200 creates the authentication information Xi based on the random information Ri, concatenates thereto the license Bi and uses it as the electronic coin after having it signed by the bank 100. Also in this instance, the blind signature scheme is used. At firstt, the bank 100 generates a pair of secret key $d_A'$ and public key $e_A'$ to be used for the blind signature, as information corresponding to the face value of the electronic coin, and makes the key $e_A'$ public. FIG. 6B shows an example of the procedure to be taken in this case between the bank 100 and the user 200. FIG. 7B shows block diagrams of the user 200 and the bank 100. The following description will be made on the assumption that $i = 1, \ldots, k/2$.

Step $S_{12}$: Based on random information Ri produced by a random generator 214 and parameter information Ni and Li read out from the memory 211, the user 200 calculates by a modulo power calculator 215 the following authentication information:

$$Xi = Ri^{Li} \bmod Ni \tag{34}$$

and stores the authentication Xi and the random information Ri in the memory 211.

Step $S_{13}$: For all of $i=1, \ldots, k/2$, the authentication information Xi and the license Bi read out of the memory are concatenated together by a concatenator 216, and its output $$m = X_1 \| \ldots \| X_{k/2} \| B_1 \| \ldots \| B_{k/2} \tag{35}$$

or in the case of using the one piece license B, $$m = X_1 \| \ldots \| X_{k/2} \| B \tag{35'}$$

is input into a blind signature preprocessor 217, along with the public key $e_A'$ corresponding to the face value of the electronic coin and a random number $r_p$, thereby calculating randomized authentication information given by the following equation:

$$Z = Fe_A'(r_p, m) \tag{36}$$

The randomized authentication information thus obtained and information on the face value of the electronic coin are sent to the bank 100.

Step $S_{14}$: Having received the randomized authentication information Z, the bank 100 inputs it and the secret key $d_A'$ corresponding to the face value of the electronic coin into a blind signature generator 109, from which the following signed-randomized authentication information is produced:

$$\Theta = De_A'(Z) \tag{37}$$

The bank 100 sends the signed randomized authentication information $\Theta$ to the user 200 and, at the same time, withdraws the corresponding amount of money from the account of the user 200 or receives payment of the amount of money concerned from the user 200.

Step $S_{15}$: Having received the signed randomized authentication information $\theta$ from the bank 100, the user 200 inputs the randomizing random number $r_p$ used in the blind signature preprocessor 217, the information $\Theta$ received from the bank 100 and the public key $e_A'$ into a blind signature postprocessor 219, by which the following equation $$C = He_A'(r_p, \Theta) \tag{38}$$

which is stored in the memory 211. The result of calculation of Eq. (38) satisfies the following equation $$He_A'(r_p, \Theta) = De_A'(m) \tag{39}$$

That is, the electronic coin C is equivalent to information obtained by applying the signature of the bank directly to the information m.

Figure 6C:
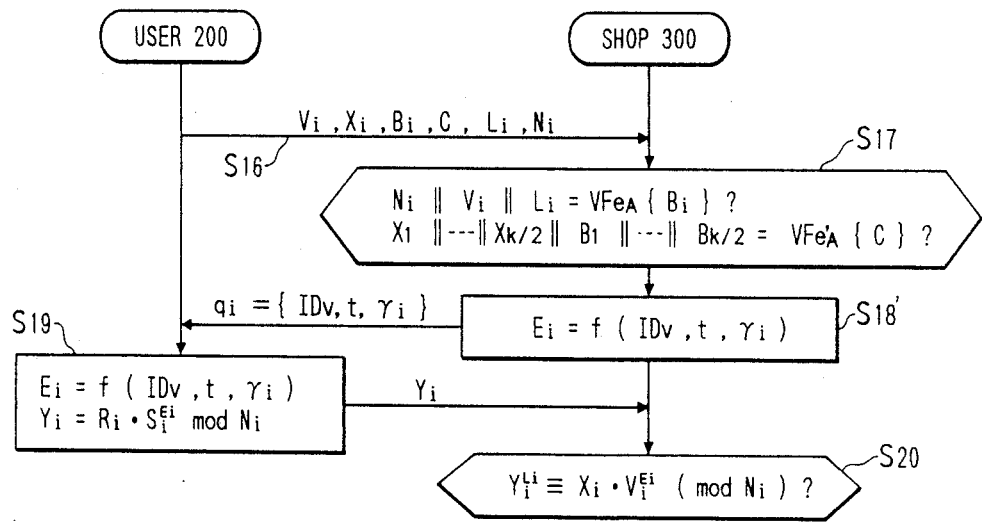
FIG. 6C is a flowchart showing the procedure for the use of the electronic coin between the user 200 and the shop 300 in the second embodiment of the invention.
Figure 7C:
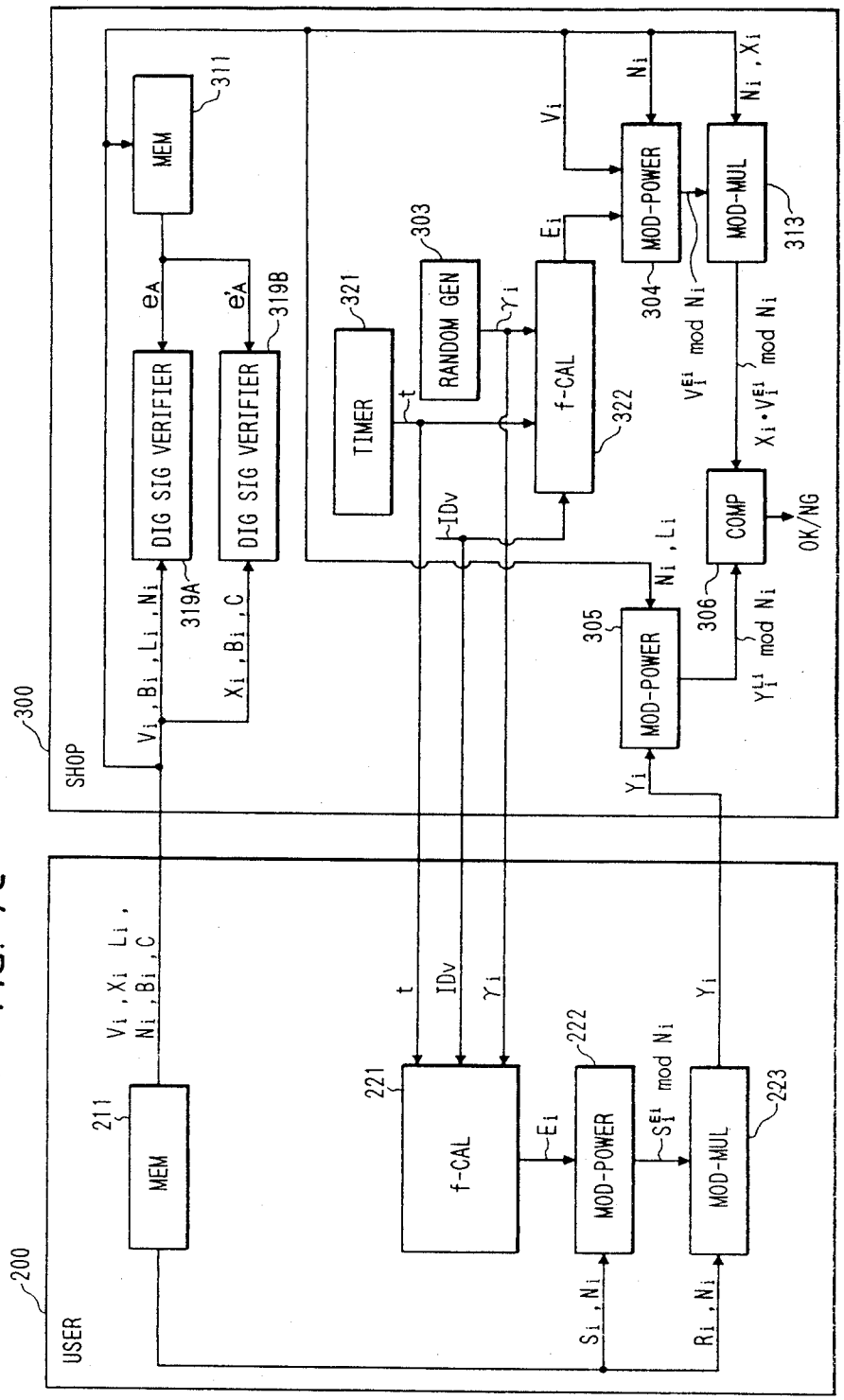
FIG. 7C shows functional block diagrams of the user 200 and the shop 300 in FIG. 6C.

Next, a description will be given of the case where the user 200 pays with the electronic coin C to the shop 300. FIG. 6C shows an example of the procedure to be performed between the user 200 and the shop 300 and FIG. 7C shows block diagrams of the shop 300 and the user 200. The following description will be given on the assumption that $i=1, \ldots, k/2$.

Step $S_{16}$: The user 200 transmits to the shop 300 the electronic coin C, the license Bi, the user information Vi, the authentication information Vi and the parameter information Ni, Li read out of the memory 211.

Step $S_{17}$: The shop 300 verifies the validity of the signature of the bank 100 applied to the message Mi=(Ni $\|$ Vi $\|$ Li) in the license Bi by digital signature verification equipment 319A through use of the public key $e_A$ and the validity of the signature of the bank 100 applied to $m = (X_1 \| \ldots \| X_{k/2} \| B_1 \| \ldots \| B_{k/2})$ in the electronic coin C by digital signature verification equipment 319B through use of the public key $e_A'$. This is done by calculation or checking whether the following verification equations hold or not. If the signature of the bank 100 is not found to be valid, then no further processing will be performed.

$$(Ni \| Vi \| Li) = VFe_A\{Bi\} = Bi^{e_A} \bmod n \tag{40}$$

$$(X_1 \| \ldots \| X_{k/2} \| B_1 \| \ldots \| B_{k/2}) = VFe_A'\{C\} = C^{e_A'} \bmod n \tag{41}$$

or $$\pi_{i=1}^{k/2} Mi = VFe_A\{B\} = B^{e_A} \bmod n \tag{40'}$$

$$(X_1 \| \ldots \| X_{k/2} \| B) = VFe_A'\{C\} = C^{e_A'} \bmod n \tag{41'}$$

Step $S_{18}$: The shop 300 sends an inquiry qi including time t available from a timer 321, a random value number $\gamma_i$ extracted from a random generator 303 and identification information IDv of the shop 300 to the user 200 and demands a predetermined reesponse based on these pieces of information. At the same time, the shop 300 calculates $$Ei = f(g_i) = f(IDV, t, \gamma_i) \tag{42}$$

by a one-way function calculator 322, using the above pieces of information.

Step $S_{19}$: The user 200 inputs the received identification information IDv, time t and random number value $\gamma_i$ into a one-way function calculator 221, by which the same calculation $f(IDv, t, \gamma_i)$ as mentioned above is performed. Its output value Ei and information Si and Ni read out of the memory 211 are used to calculate $y_i = Si^{Ei} \bmod Ni$ by a modulo power multiplier 222. Its output value $y_i$ and the information Ri and Ni read out of the memory 211 are used to calculate $Yi = y_i \times Ri \bmod Ni$ by a modulo multiplier 223, obtaining $$Yi = Ri \cdot Si^{Ei} \bmod Ni \tag{43}$$

The user 200 sends this Yi as a response to the shop 300.

Step $S_{20}$: The shop 300 calculates $y_i = Vi^{Ei} \bmod Ni$ by a modulo power multiplier 304 from the output value Ei and the information Ni and Vi previously received from the user 200. Further, a modulo multiplication of its result $y_i$ and Xi mod Ni is performed by a modulo multiplier 313 to obtain $Xi \times Vi^{Ei} \bmod Ni$. On the other hand, the received Yi and information Li and Ni are input into a modulo power multiplier 305 to calculate $Yi^{Li} \bmod Ni$, and its result and the output of the modulo multiplier 313 are input into a comparator 306 to check whether the following equation holds or not.

$$Y_i^{L_i} \equiv X_i \cdot V_i^{E_i} \pmod{N_i} \quad (44)$$

If this equation holds, the shop 300 receives the electronic coin C as a valid one.

Figure 6D:
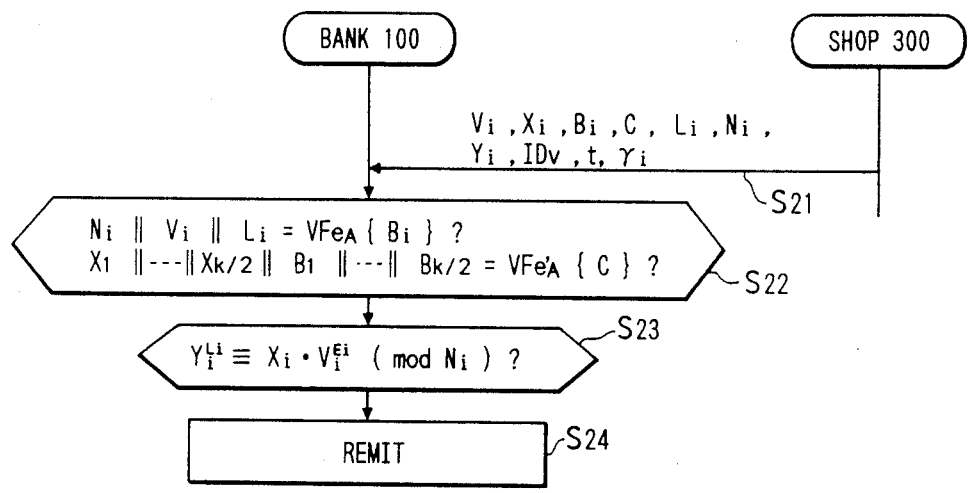
FIG. 6D is a flowchart showing the procedure for the settlement of accounts between the bank 100 and the shop 300 in the second embodiment of the invention.
Figure 7D:
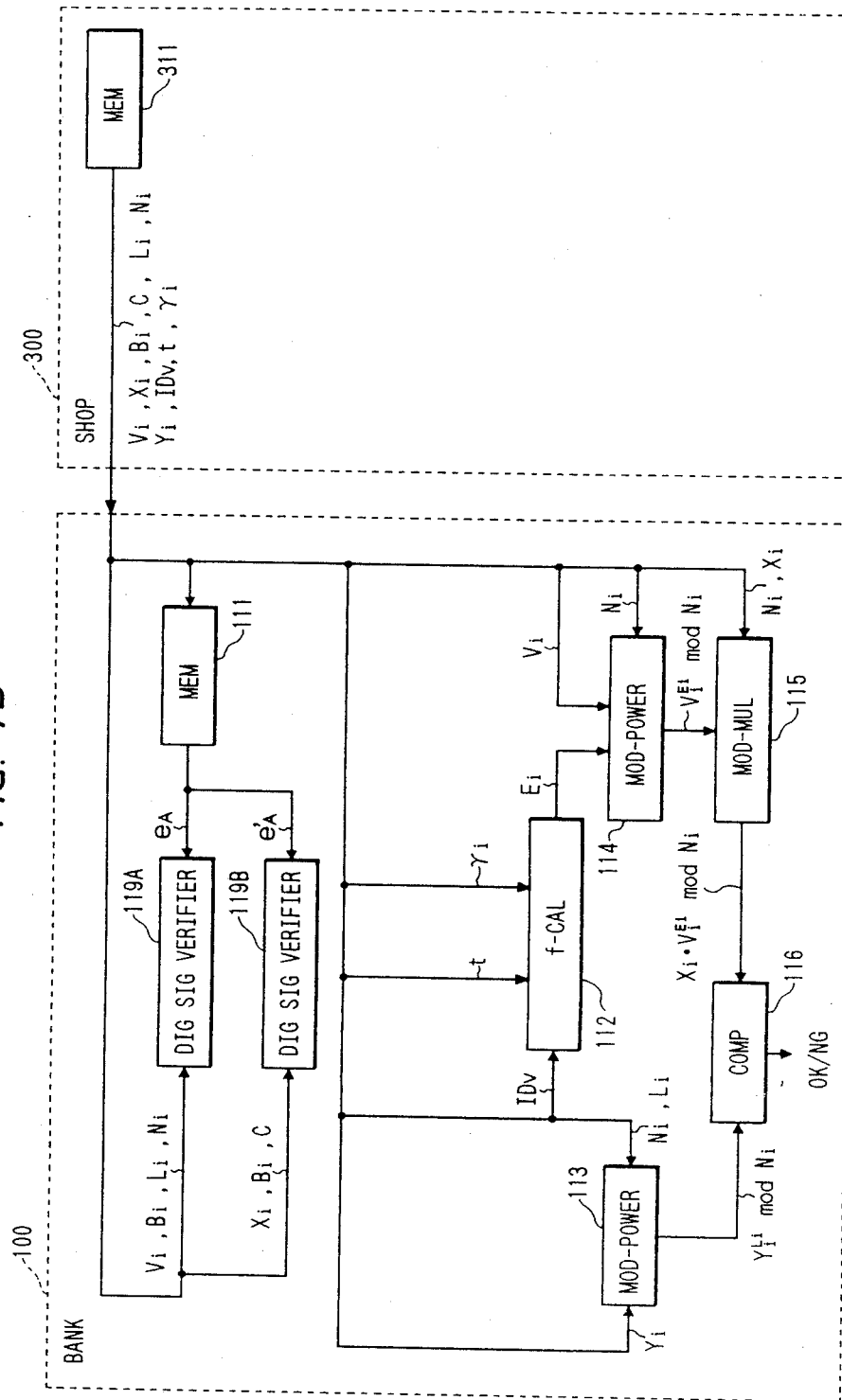
FIG. 7D shows functional block diagrams of the bank 100 and the shop 300 in FIG. 6D.

Now, a description will be given of the settlement of accounts between the shop 300 and the bank 100. FIG. 6D shows an example of the procedure to be performed between the shop 300 and the bank 100. FIG. 7D shows block diagrams of the bank 100 and the shop 300.

Step $S_{21}$: The shop presents the information {Ni, Li, Vi, Xi, Bi, Yi, C, IDv, t, $\gamma_i$} (i=1, . . . , k/2) in the memory 311 to the bank 100 and receives a payment of the amount of memory concerned.

Step $S_{22}$: Upon receipt of the information from the shop 300, the bank 100 verifies the validity of the signature of the bank 10 applied to the information Mi=(-Ni || Vi || Li) in the license Bi by digital signature verification equipment 119A through use of the public key $e_A$ and the validity of the signature of the bank applied to m=($X_1$ || . . . || $X_{k/2}$ || $B_1$ || . . . || $B_{k/2}$) in the electronic coin C by digital signature verification equipment 119B through use of the public key $e_A'$. This verification is done by checking whether Eqs. (40) and (41) hold or not. In the case of using the one-piece license B, Eqs. (40') and (41') are employed. Only when the validity of the signatures applied to the above-said information is confirmed, the bank 100 proceed to the next step.

Step $S_{23}$: The pieces of information IDv, t and $\gamma_i$ in the inquiry qi received from the shop 300 are provided to a one-way function calculator 112 to obtain its output value Ei=f(IDv, t, $\gamma_i$). $Y_i^{L_i}$ mod Ni is calculated by a modulo power multiplier 113 from the pieces of information Yi, Ni, and Li. $V_i^{E_i}$ mod Ni is calculated by a modulo power multiplier 114 from the pieces of information Ei, Vi, and Ni. Moreover, $X_i \cdot V_i^{E_i}$ mod Ni is calculated by a modulo multiplier 115 from the output of the modulo multiplier 114 and the pieces of information Ni and Xi. Then the outputs of the modulo power multiplier 113 and the modulo multiplier 115 are input into a comparator 116 to check whether the following equation holds or not.

$$Y_i^{L_i} \equiv X_i \cdot V_i^{E_i} \pmod{N_i}$$

Step $S_{24}$: When the information received from the shop 300 is found good as a result of the above verification, the bank 100 stores the information {Ni, Li, Vi, Xi, Bi, Yi, C, IDv, t, $\gamma_i$} (i=1, . . . , k/2) in a memory 111 and pays the amount of money concerned into the account (IDv) of the shop 300.

Although the above embodiment has been described with respect of the system utilizing the authentication scheme with the interactive proof system based on the difficulty of the calculation of higher degree roots (Japanese Pat. Appln. No. 36391/88), a similar system can be implemented as well by use of other authentication schemes with the interactive proof system.

Incidentally, since the authentication scheme with the interactive proof property satisfies the requirement of soundness property (the property that when two correct Yi are obtained for the same pair of user information Vi and authentication information Xi, the secret information Si corresponding to the information Vi can be calculated), the identification information IDp of the user will be revealed, if he uses the same electronic coin twice or more. In other words, if the user uses the electronic coin twice fraudulently, two pairs of information (Ei, Yi) and (Ei', Yi') which satisfy the verification equation (44) are obtained for the same pair of information Vi and Xi as in the case described previously in the first embodiment with reference to FIG. 2D. Consequently, the following equation holds:

$(Y_i/Y_i')^{L_i} \equiv V_i^{E_i-E_i'} \pmod{N_i}$, from which the following equation is obtained.

$(Y_i/Y_i') \equiv S_i^{E_i-E_i'} \pmod{N_i}$

On the other hand, $S_i^{L_i} = V_i$ mod Ni holds. Here, Li is a prime number and this Li and Ei-Ei' are mutually prime, so that the secret information Si can be calculated. Since the secret information Si contains the identification information IDp of the user 200 in the raw form, it is possible to specify the user who used the electronic coin fraudulently.

As described above in detail, the second embodiment also possesses the features of (a) protecting the privacy of the user and (b) detecting double usage of the electronic coin as is the case with the first embodiment. Since the blind signature scheme is utilized for the feature (a), it is possible to maintain the privacy of the user such as his propensity to consume. For the feature (b), when the electronic coin is used twice or more, the secret information used for creating the license is revealed owing to the property of the authentication scheme with the interactive proof property.

Incidentally, the issuance of the license involves the procedure in which the user sends k pieces of information Wi to the bank and the bank selects k/2 pieces of the information Wi and makes the user disclose k/2 sets of parameters used for generation of the selected k/2 pieces of information Wi. This imposes a large burden on the processing. In the present invention, however, this procedure is required only when the user opens his account at the bank. In contrast thereto, the frequency of the process for issuing the electronic coin is considered to be relatively high, but its processing basically involves only one blind signature generating procedure, and hence the burden of this procedure is small. In the first embodiment, however, since the license and the electronic coin are integrated into electronic cash, it is necessary, for each issuance of the electronic cash, to perform the procedure in which the user sends k pairs of information (Wi, Zi) to the bank and the bank selects k/2 pairs from them and makes the user disclose the corresponding parameters. The burden of this procedure is large.

As described above, according to the second embodiment, the electronic coin C can easily be issued at any time using the license Bi (i=1, . . . , k/2) or B issued in advance by the bank. The electronic coin according to the scheme of the present invention in which the license and the electronic coin are issued separately can be used more conveniently in several manners. First, the electronic coin can be transferred to other users; second, the same electronic coin can be used many times; third, the electronic coin can be transferred to other users and used many times. A description will be given of the electronic coin which possesses these functions in the second embodiment.

Transfer of the Electronic Coin

Figure 8A:
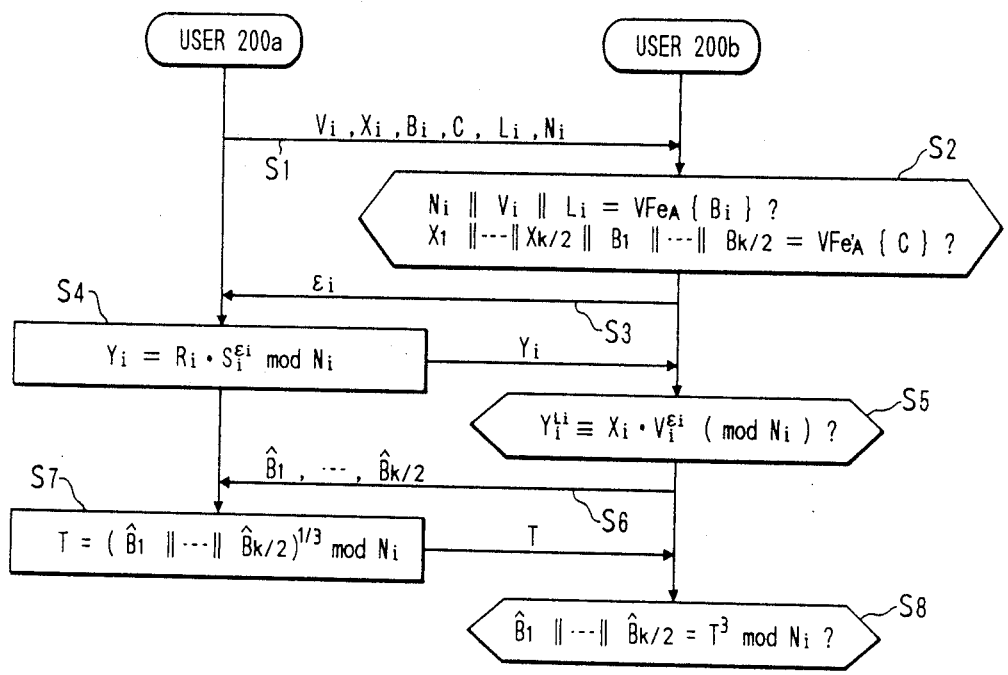
FIG. 8A is a flowchart showing the procedure for the transfer of an electronic coin between users 200a and 200b in the second embodiment of the invention.
Figure 9A:
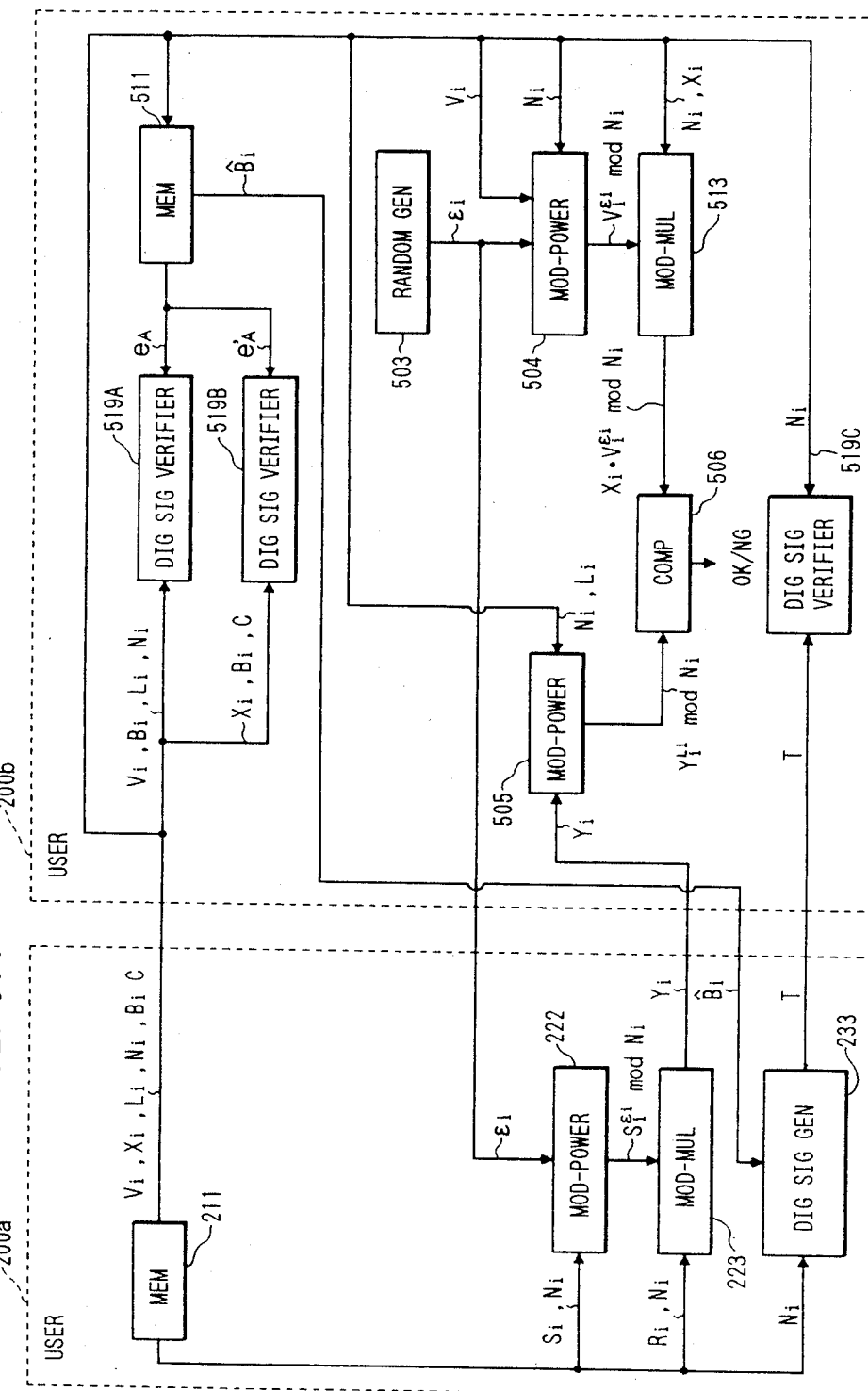
FIG. 9A shows functional block diagrams of the users 200a and 200b in FIG. 8A.

The following description will be made in connection with the case where a first user 200a transfers to a second user 200b the electronic coin C issued following the procedure shown in FIG. 6B. Assume, in this case, that the user 200b also has the license obtained from the bank 100 by the same procedure as is the case with the user 200a. FIG. 8A shows an example of the procedure between the users 200a and 200b. FIG. 9A illustrates their block diagrams. In the following, i=1, 2, ..., k/2, and variables with " " on symbols are all related to the second user 200b who is the transferee. The meaning of each variable is the same as that defined previously, unless specified otherwise.

Step $S_1$: The first user 200a transmits to the second user 200b the license Bi or B, the electronic coin C, the user information Vi, the authentication information Xi and the parameter informations Ni and Li read out of the memory 211.

Step $S_2$: The second user 200b verifies the validity of the signature of the bank applied to the message $Mi = (Ni \parallel Vi \parallel Li)$ in the license Bi by digital signature verification equipment 519A on the basis of the public key $e_A$ and the validity of the signature of the bank applied to $m = (X_1 \parallel \ldots \parallel X_{k/2} \parallel B_1 \parallel \ldots \parallel B_{k/2})$ in the electronic coin C by digital signature verification equipment 519B on the basis of the public key $e_A'$. This verification is performed by checking whether or not the following verification equations (45) and (46) hold, by calculation. In the case of the one-piece license B, the verification is effected using the following equations (45') and (46'). If the signatures of the bank are found invalid, then no further processing will take place.

$$(Ni \parallel Vi \parallel Li) = VFe_A\{Bi\} = Bi^{e_A} \bmod n \qquad (45)$$

$$(X_1 \parallel \ldots \parallel X_{k/2} \parallel B_1 \parallel \ldots \parallel B_{k/2}) = VFe_{A'}\{C\} = C^{e_{A'}} \bmod n \qquad (46)$$

$$\prod_{i=1}^{k/2} Mi = VFe_A\{B\} = B^{e_A} \bmod n \qquad (45')$$

$$(X_1 \parallel \ldots \parallel X_{k/2} \parallel B) = VFe_{A'}\{C\} = C^{e_{A'}} \bmod n \qquad (46')$$

Step $S_3$: To make sure that the received user information Vi and the authentication information Xi belong to the user 200a who is the transferor, the user 200b sends to the user 200a, as an inquiry, a value $\epsilon_i$ available from a random generator 503.

Step $S_4$: The user 200a calculates $Si^{\epsilon_i} \bmod Ni$ by a modulo power calculator 222 on the basis of the received value $\epsilon_i$ and the information Si and Ni of his own read out of the memory 211, and calculates $$Yi = R_i \cdot Si^{\epsilon_i} \bmod Ni$$

by a modulo multiplier 223 on the basis of the output of the modulo power calculator 222 and the information Ri and Ni read out of the memory 211. Then the user 200a sends the value Yi as a response to the user 200b.

Step $S_5$: The user 200b inputs the value $\epsilon_i$ and the received information Vi and Ni into a modulo power multiplier 504 to calculate $$Vi^{\epsilon_i} \bmod Ni$$

and inputs the calculated value, the received authentication information Xi and received Ni into a modulo multiplier 513 to calculate $$Xi \cdot Vi^{\epsilon_i} \bmod Ni.$$

On the other hand, the received pieces of information Yi, Li and Ni are input into a modulo power multiplier 505 to calculate $$Yi^{Li} \bmod Ni$$

and the calculated value and the output of the modulo multiplier 513 are provided to a comparator 506 to check them for coincidence. If they coincide, the user information Vi and the authentication information Xi are determined to be valid.

Step $S_6$: The user 200b who is the transferee sends his license $B_1, \ldots, B_{k/2}$ (or B) to the user 200a to have the transferor 200a sign the licenses.

Step $S_7$: The transferor 200a signs the received license $B_1, \ldots, B_{k/2}$ (or B) by signing equipment 233 which calculates a digital signature function of the following equation (47) or (47'), for example, and then returns to the user 200b the signed license as a deed of transfer T.

$$T = (B_1 \parallel \ldots \parallel B_{k/2})^{1/3} \bmod Ni \qquad (47)$$

$$T = B^{1/3} \bmod Ni \qquad (47')$$

In the above, Ni assumes a value for predetermined item i in the range of $1 \leq i \leq k/2$.

Step $S_8$: The user 200b inputs the public key Ni of the user 200a and the received deed of transfer T into digital signature verification equipment 519C to verify the validity of the deed of transfer T by checking whether the following equation holds or not. In this instance, Ni is a value for the above-mentioned predetermined item i.

$$(B_1 \parallel \ldots \parallel B_{k/2}) = T^3 \bmod Ni \qquad (48)$$

$$B = T^3 \bmod Ni \qquad (48')$$

When the validity of the signature of the user 200a is found good, the user 200b receives the electronic coin C as a valid one.

Figure 8B:
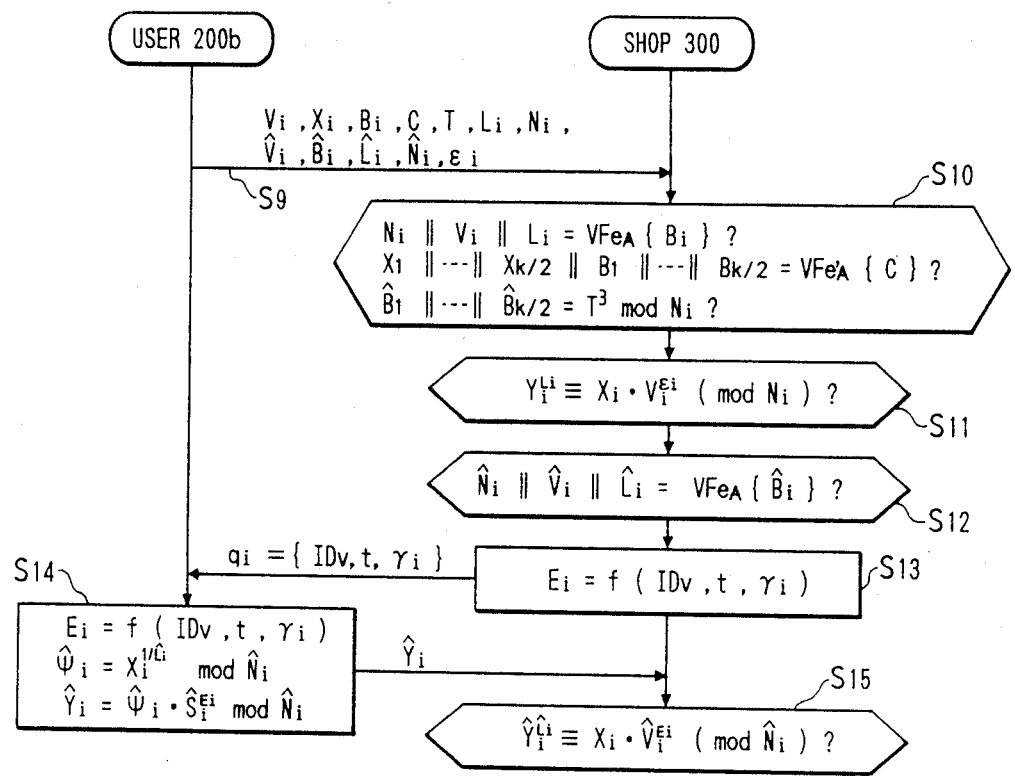
FIG. 8B is a flowchart showing the procedure for the user of the transferred electronic coin between the user 200b and the shop 300.
Figure 9B:
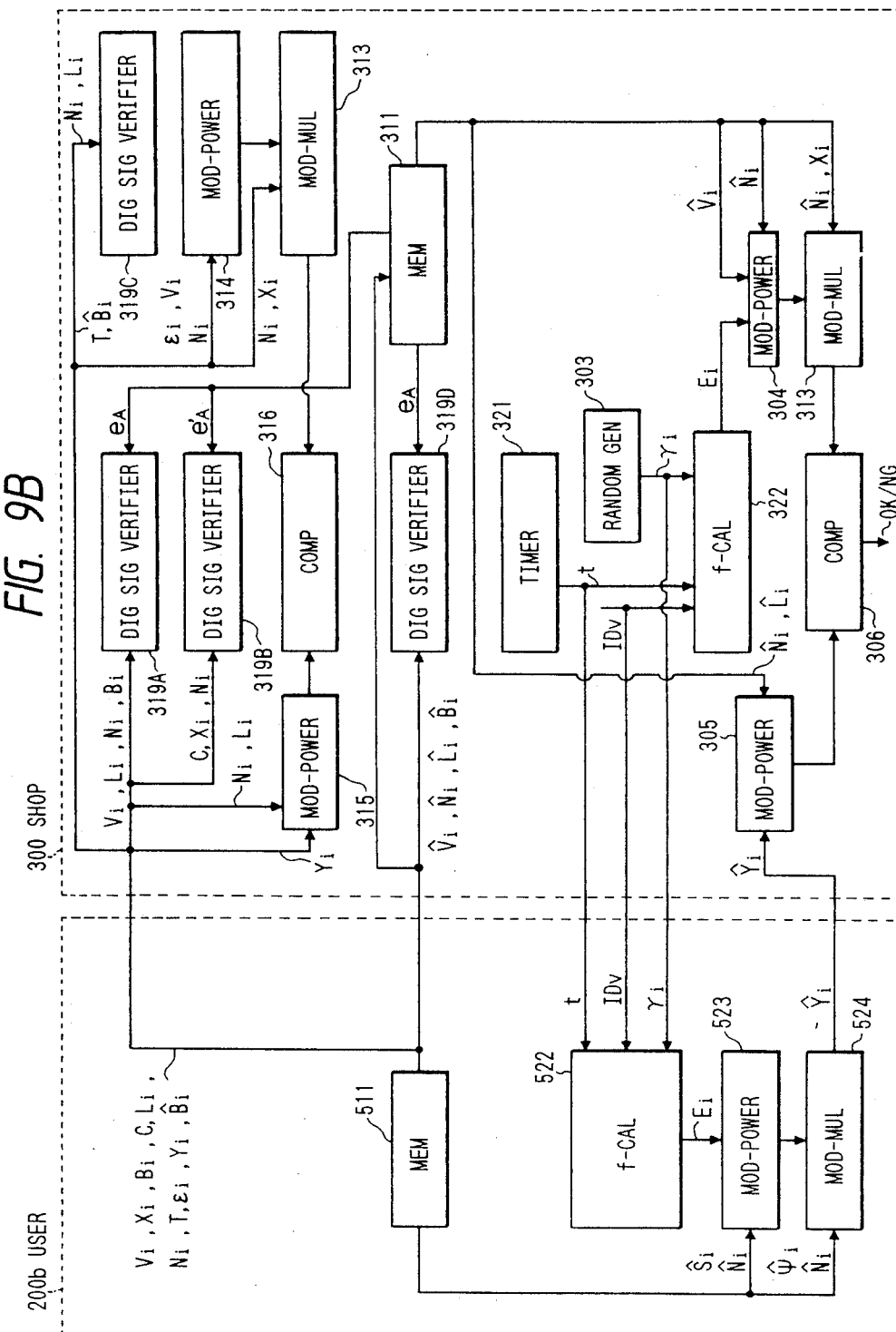
FIG. 9B shows functional block diagrams of the user 200b and the shop 300 in FIG. 8B.

Next, a description will be given of the case where the user 200b makes payment to the shop 300 with the electronic coin C transferred from the user 200a. FIG. 8B shows an example of the procedure between the user 200b and the shop 300. FIG. 9B shows their block diagrams. In the following, $i = 1, \ldots, k/2$.

Step $S_9$: The user 200b transmits to the shop 300 the received information group {Ni, Li, Vi, Xi, Bi, Yi, C, T} read out of the memory 511 and an information group {Ni, Li, Vi, Bi, $\epsilon_i$} of his own also read out of the memory 511.

Step $S_{10}$: The shop 300 verifies the validity of the signature of the bank 100 applied to $(Ni \parallel Vi \parallel Li)$ in the license Bi of the user 200a by digital signature verification equipment 319A using the public key $e_A$ and the validity of the signature of the bank 100 applied to $(X_1 \parallel \ldots \parallel X_{k/2} \parallel B_1 \parallel \ldots \parallel B_{k/2})$ in the electronic coin C by digital signature verification equipment 319B using the public key $e_A'$. This verification is performed using the afore-mentioned Eqs. (45) and (46). In the case of using the one-piece license B, Eqs. (45') and (46') are used. Further, the shop 300 verifies the validity of the signature of the user 200a applied to $(B_1 \parallel \ldots \parallel B_{k/2})$ in the deed of transfer T, by digital signature verification equipment 319C following the afore-mentioned equation (48). In the case of using the one-piece license B, Eq. (48') is employed.

Step $S_{11}$: Moreover, the shop 300 inputs the received pieces of information $\epsilon_i$, Vi and Ni into a modulo power calculator 314 to calculate $Vi^{\epsilon_i} \bmod Ni$ and inputs the calculated output and the received pieces of information Xi and Ni into a modulo multiplier 313 to calculate $Xi \cdot Vi^{\epsilon_i} \bmod Ni$. On the other hand, the received pieces of information Yi, Ni and Li are provided to a modulo power calculator 315 to calculate $Yi^{Li} \bmod Ni$ and then the calculated output and the output of the modulo multiplier 313 are input into a comparator 316 to check whether the following equation holds or not.

$$Y_i^{Li} \equiv Xi.Vi^{ei} \pmod{Ni} \tag{49}$$

If this equation holds, then it is determined that the received pieces of information Vi and Xi are those of the user 200a.

Step $S_{12}$: Furthermore, the shop 300 verifies the validity of the signature of the bank 100 applied to Mi=(-Ni || Vi || Li) in the license Bi of the user 200b who is the transferee. This verification is carried out by digital signature verification equipment 319D using the public eye $e_A$, in accordance with the following equation (50) similar to the afore-mentioned equation (45). In the case of using the one-piece license B, the following equation (50') is employed.

$$(Ni || Vi || Li) = VFe_A\{Bi\} = Bi^{e_A} \bmod n \tag{50}$$

$$\pi_{i=1}^{k/2} Mi = VFe_A\{B\} = B^{e_A} \bmod n \tag{50'}$$

When the signature of the bank 100 is found invalid, the processing is discontinued.

Step $S_{13}$: To identify the user information Vi of the user 200b who is the transferee, the shop 300 sends to the user 200b, as an inquiry qi, time t available from a timer 321, a value $\gamma_i$ from a random generator 303 and the identification information IDv of the shop 300. At the same time, these pieces of information IDv, t and $\gamma_i$ are provided to a one-way function calculator 322 to calculate Ei=f(qi)=f(IDv, t, $\gamma_i$).

Step $S_{14}$: The user 200b inputs the received pieces of information IDv, t and $\gamma_i$ into a one-way function calculator 522. Its output value Ei=f(IDv, t, $\gamma_i$) and pieces of information Si and Ni of the user 200b are provided to a modulo power calculator 523 to calculate $Si^{Ei}$ mod Ni. Further, the calculated result and pieces of information $\Psi_i$ and Ni read out of the memory 511 are input into a modulo multiplier 524 to obtain $$Yi = \Psi_i \cdot Si^{Ei} \bmod Ni \tag{51}$$

The value Yi thus obtained is transmitted as a response to the shop 300.

Incidentally, $\Psi_i$ is a value which satisfies the relation of the following equation (52), and it is calculated after the transfer of the electronic coin C from the user 200a and is stored in the memory 511.

$$\Psi_i = Xi^{1/Li} \bmod Ni \tag{52}$$

Here, 1/Li is an inverse element as an exponent component Li in mod Ni and satisfies the following equation:

$$(1/Li)Li \equiv 1 \bmod LCM \{(Pi-1), (Qi-1)\} \tag{53}$$

The value 1/Li is calculated by an inverse calculation from Pi, Qi and Li.

Step $S_{15}$: The shop 300 inputs the output value Ei of the one-way function calculator 322 and the received pieces of information Vi and Ni into a modulo power calculator 304 to calculate $Vi^{Ei}$ mod Ni and inputs the calculated result and the pieces of information Xi and Ni into a modulo multiplier 313 to obtain $Xi.Vi^{Ei}$ mod Ni. On the other hand, the received response Yi and the pieces of information Ni and Li are applied to a modulo power calculator 305 to calculate $Yi^{Li}$ mod Ni, and the calculated result and the output of the modulo multiplier 313 are input into a comparator 306 to check whether the following equation holds or not.

$$Y_i^{Li} \equiv Xi.Vi^{Ei} \pmod{Ni} \tag{54}$$

When the response Yi is found valid, the shop 300 determines that the response Yi belongs to the user 200b who is the transferee, and receives the electronic coin C as a valid one.

As described above, in step $S_{14}$ the user 200b produces the response Yi of Eq. (45) using $\Psi_i$ given by Eq. (52), which is a function of Xi, instead of using the random information Ri of the user 200b himself, and consequently, the authentication information Xi of the user 200a can be employed for the calculation of the verification equation (54) in Step $S_{15}$ which is performed by the shop 300. In other words, the user 200b who uses the transferred electronic coin needs not to present his authentication information Xi to the shop 300.

Figure 8C:
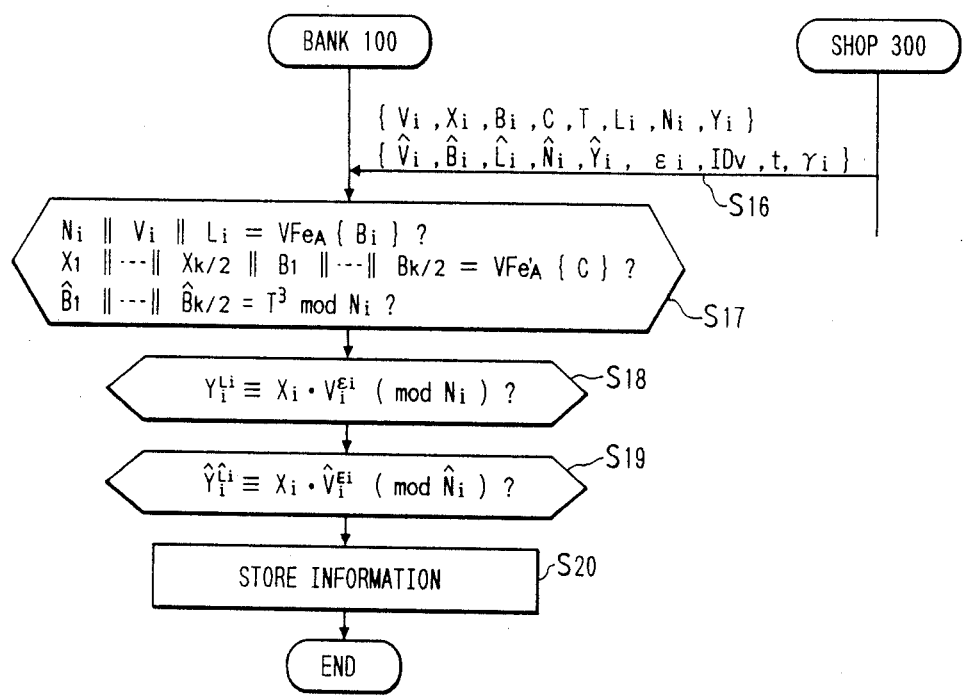
FIG. 8C is a flowchart showing the procedure for the settlement of the transferred electronic coin between the bank 100 and the shop 300.

Next, a description will be given of the settlement of accounts between the shop 300 and the bank 100. FIG. 8C shows an example of the procedure between the shop 300 and the bank 100. FIG. 9C illustrates their block diagrams.

Step $S_{16}$: The shop presents to the bank 100 an information group concerning the user 200a, {Ni, Li, Vi, Xi, Bi, Yi, C, T}, an information group concerning the user 200b and the shop 300, {Ni, Li, Vi, Bi, Yi, $\epsilon_i$, IDv, t, $\gamma_i$}, read out of the memory 311 (i=1, ..., k/2).

Step $S_{17}$: The bank 100 verifies the validity of the signature of the bank applied to (Ni || Vi || Li) in the license Bi of the user 200a by digital signature verification equipment 119A using the public key $e_A$ and the validity of the signature of the bank applied to ($X_1$ || ... || $X_{k/2}$ || $B_1$ || ... || $B_{k/2}$) in the electronic coin C by digital signature verification equipment 119B using the public key $e_A'$. This verification is performed following the afore-mentioned Eqs. (45) and (46). Moreover, the bank 100 verifies the validity of the signature of the user 200a applied to ($B_1$ || ... || $B_{k/2}$) in the deed of transfer T by digital signature verification equipment 119C, following the afore-mentioned equation (48). In the case of using the one-piece license B, the verification is performed using Eqs. (45'), (46') and (48').

Step $S_{18}$: The pieces of information $\epsilon_i$, Vi and Ni are input into a modulo power calculator 117 to calculate $Vi^{\epsilon_i}$ mod Ni, and the calculated result and the pieces of information Ni and Xi are provided to a modulo multiplier 118 to calculate $Xi.Vi^{\epsilon_i}$ mod Ni. On the other hand, the pieces of information Yi, Ni and Li are input into a modulo power calculator 103 to calculate $Yi^{Li}$ mod Ni, and the calculated result and the output of the modulo multiplier 118 are applied to a comparator 106 to check whether or not the following equation identical with the afore-mentioned equation (49) holds.

$$Yi^{Li} \equiv Xi.Vi^{\epsilon_i} \pmod{Ni}$$

When this equation holds, it is determined that the pieces of information Vi and Xi are those of the transferor 200a.

Step $S_{19}$: The validity of the signature of the bank 100 applied to (Ni || Vi || Li) in the license Bi of the transferee 200b is verified by digital signature verification equipment 119D using the public key $e_A$. For this verification the same equation as Eq. (50) is used. In the case of using the one-piece license B, Eq. (50') is used. Further, the pieces of information IDv, t, $\gamma_i$ of the inquiry qi are input into a one-way function calculator 112 to calculate Ei=f(IDv, t, $\gamma_i$). The output of the one-way function calculator 112 and the pieces of information Vi and Ni are provided to a modulo power calculator 114 to calculate $V_i^{Ei}$ mod Ni, and the output of the modulo power calculator 114 and the pieces of information Xi and Ni are input into a modulo multiplier 115 to obtain $X_i \cdot V_i^{Ei}$ mod Ni. On the other hand, the pieces of information Yi, Ni and Li are input into a modulo power calculator 113 to calculate $Y_i^{Li}$ mod Ni. The outputs of the modulo multiplier 115 and the modulo power calculator 113 are applied to a comparator 116, wherein it is checked whether or not the following equation which is identical with Eq. (54) holds.

$$Y_i^{Li} \equiv X_i \cdot V_i^{Ei} \pmod{N_i}$$

When this equation holds, it is determined that the information Vi is the information of the transferee 200b.

Step $S_{20}$: When the foregoing verifications are passed, the bank 100 stores the information group of the user 200a, {Ni, Li, Vi, Xi, Bi, Yi, C, T}, and the information group concerning the user 200b and the shop 300, {Ni, Li, Vi, Bi, Yi, $\epsilon_i$, IDv, t, $\gamma_i$}, (i=1, ..., k/2) in the memory 111 and pays the amount of money concerned into the account IDv of the shop 300.

Figure 2D:
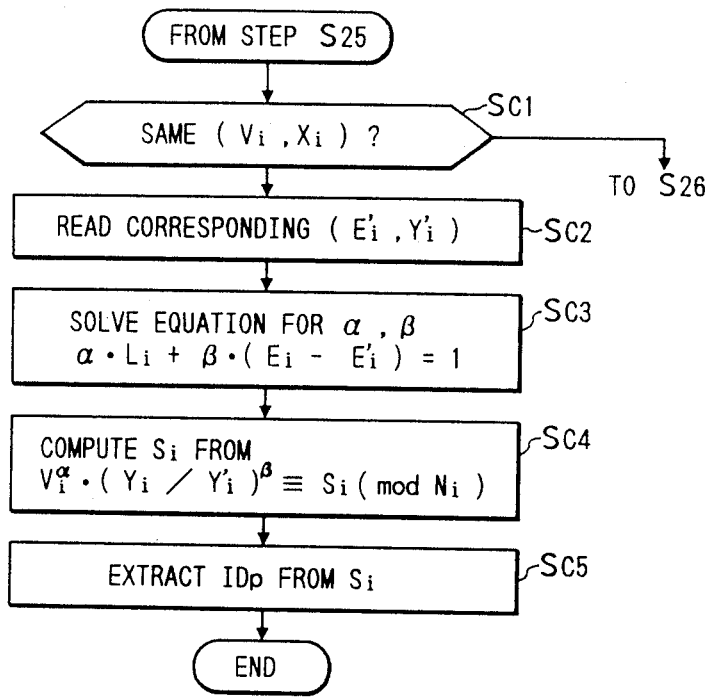
FIG. 2D is flowchart showing a double usage checking procedure by the bank 100 in FIG. 2C.

If the user 200a who has transferred the electronic coin as described above uses it twice fraudulently, then two identical pairs of information (Vi, Xi) exist as described previously, and consequently the double usage of the electronic coin is detected by the bank 100 in the procedure shown in FIG. 2D and the user 200a is identified. On the other hand, in the case of detecting double usage of the transferred electronic coin by the transferee 200b, the bank 100 needs only to make a check as to whether or not a pair of information of the same value as the received pair of information (Vi, Xi) is present in the memory 111. If the pair of information (Vi, Xi) of the same value is found, the secret information Si of the user 200b can be calculated by the following equation, using the pieces of information Yi, Li and Ni corresponding to the stored pair of information in the procedure shown in FIG. 2D.

$$V_i^{\alpha} \times (Y_i/Y_i')^{\beta} \equiv S_i^{\alpha \times L_i + \beta \times (\epsilon_i - \epsilon_i')} = S_i \pmod{N_i}$$

Repetitive Use of the Electronic Coin

Figure 10:
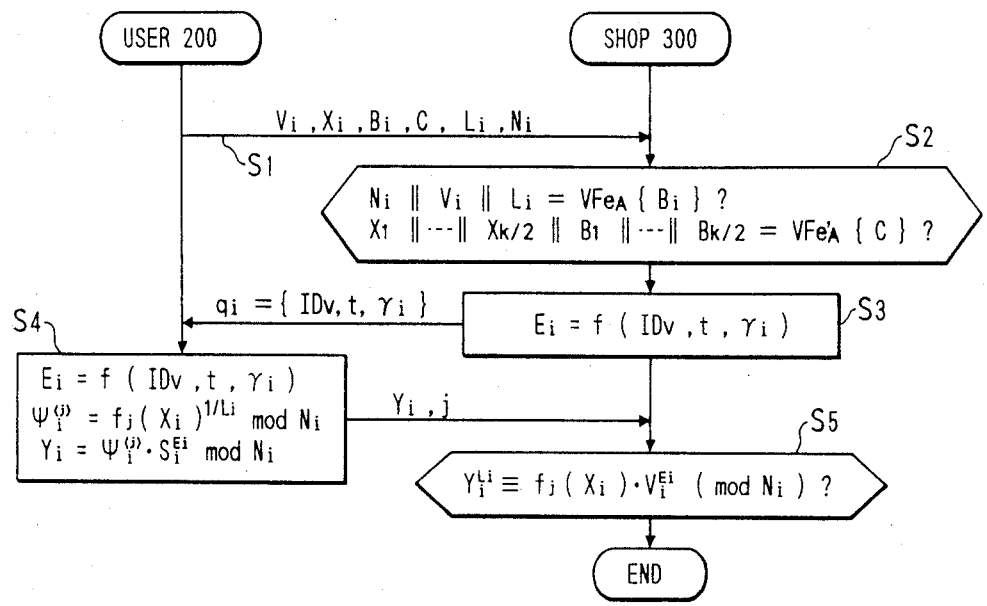
FIG. 10 is a flowchart showing the procedure for the use of an electronic coupon coin between the user 200 and the shop 300 in the second embodiment of the invention.
Figure 11:
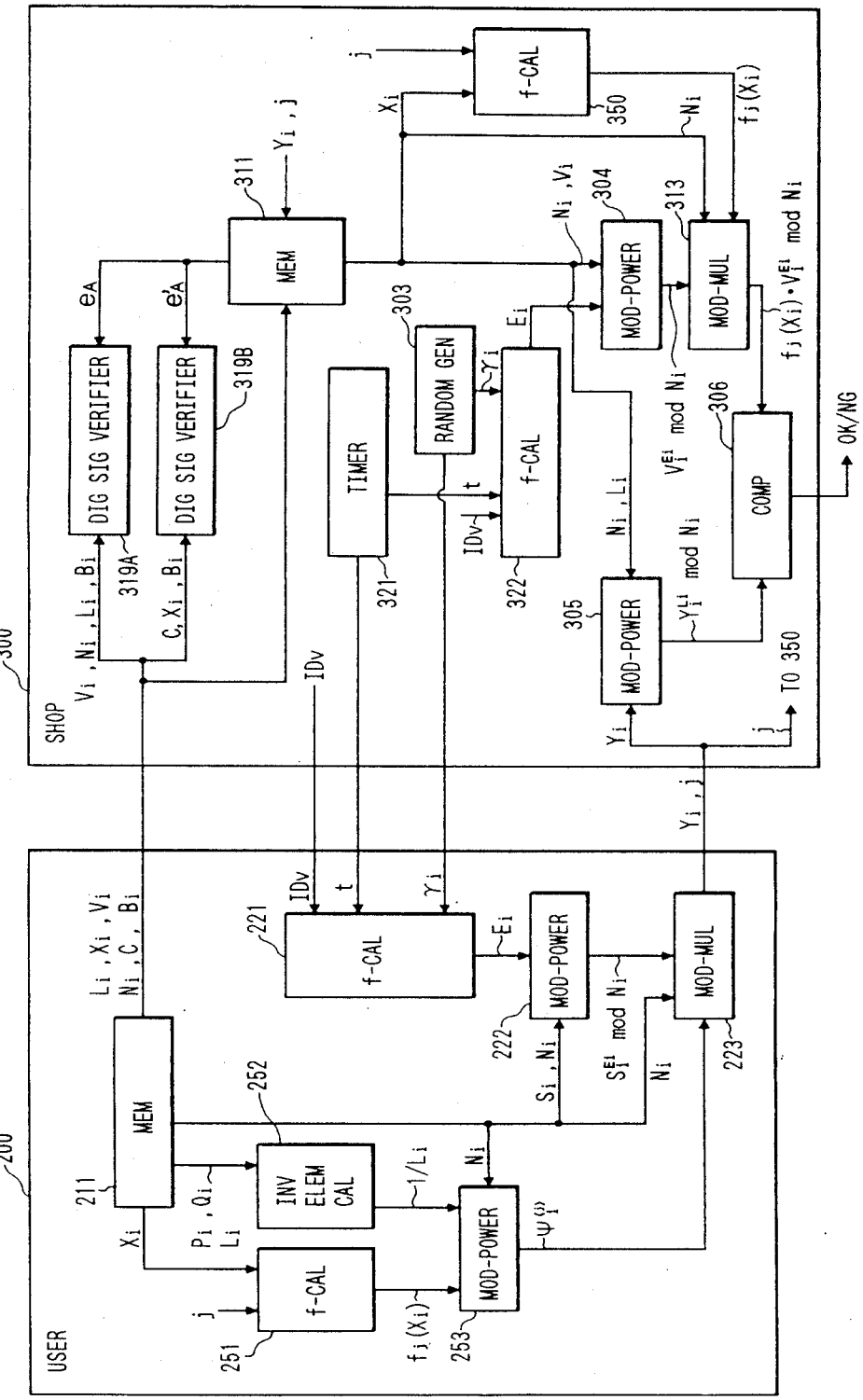
FIG. 11 shows functional block diagrams of the user 200 and the shop 300 in FIG. 10.

Now, a description will be given of a method by which the user 200 repetitively uses the electronic coin obtained by the procedure of FIG. 6B in the second embodiment. The following will describe the procedure for the j-th use of the electronic coin which the user 200 is allowed to use K times ($j \leq K$). This is applicable to either of the cases of transfer to another user 200 and payment to the shop 300, but the procedure will be described in connection with the case of payment to the shop 300. FIG. 10 shows an example of the procedure to be performed between the user 200 and the shop 300, and FIG. 11 illustrates them in block form. In the following, i=1, ..., k/2.

Step $S_1$: The user 200 transmits an information group {Ni, Li, Vi, Bi, Xi, C}, read out of the memory 211, to the shop 300.

Step $S_2$: The shop 300 verifies the validity of the signature of the bank 100 applied to (Ni || Vi || Li) in the license Bi of the user 200a by digital signature verification equipment 319A using the public key $e_A$ and the validity of the signature of the bank applied to ($X_1$ || .. . || $X_{k/2}$ || $B_1$ || ... || $B_{k/2}$) in the electronic coin C by digital signature verification equipment 319B using the public key $e_A'$. This verification is performed following Eqs. (40) and (41). In the case of using the one-piece license B, Eqs. (40') and (41') are used. When the signatures of the bank 100 are not valid, the procedure is discontinued.

Step $S_3$: The shop 300 sends to the user 200, as an inquiry qi, time t available from a timer 321, a random value $\gamma_i$ from a random generator 303 and the identification information IDv of the shop 300. At the same time these pieces of information are applied to a one-way function calculator 322 to calculate Ei=f(qi)=f(IDv, t, $\gamma_i$).

Step $S_4$: The user 200 applies the received pieces of information IDv, t and $\gamma_i$ to a one-way function calculator 221, and provides its output value Ei=f(IDv, t, $\gamma_i$) and pieces of information Si and Ni, read out of the memory 211, to a modulo power calculator 222, wherein $S_i^{Ei}$ mod Ni is calculated. The output of the modulo power calculator 222, the information Ni and information $\Psi_i^{<j>}$ described later are input into a modulo multiplier 223 to obtain $$Y_i = \Psi_i^{<j>} \cdot S_i^{Ei} \bmod N_i \quad (55)$$

Then the user 200 transmits Yi and j as a response to the inquiry qi. Here, $\Psi_i^{<j>}$ is a value which satisfies the following relation, and it is precalculated by a modulo power calculator 253 and may be stored in the memory.

$$\Psi_i^{<j>} = f_j(X_i)^{1/L_i} \bmod N_i \quad (56)$$

where 1/Li is an inverse element Li as an exponent component in mod Ni, which satisfies the following equation:

$$(1/L_i) \times L_i \equiv 1 \bmod \mathrm{LCM}\{(P_i-1), (Q_i-1)\} \quad (57)$$

The pieces of information Pi, Qi and Li are read out of the memory 211 and applied to an inverse element calculator 252 to calculate the value 1/Li. The function $f_j(X_i)$ of Xi is a one-way function which uses, as a parameter, j and is implemented by a one-way function calculator 251, in such a form as shown below. Here, assume that f is a suitable one-way function.

$$f_j(X) = f(X \| j) \quad (58)$$

Step $S_5$: The shop 300 inputs the received j and Xi, read out of the memory 311, into a one-way function calculator 350 to calculate a function $f_j(X_i)$ similar to that given by Eq. (58) using the j as a parameter. The output value Ei of the one-way function calculator 322 and the received pieces of information Vi and Ni are applied to a modulo power calculator 304 to calculate $V_i^{Ei}$ mod Ni, and the output of the one-way function calculator 350, the output of the modulo power calculator 304 and the information Ni are input into a modulo multiplier 313 to obtain $f_j(X_i) \cdot V_i^{Ei}$ mod Ni. Moreover, the pieces of information Yi, Ni and Li are provided to a modulo power calculator 305 to calculate $Y_i^{Li}$ mod Ni. The outputs of the modulo power calculator 305 and the modulo multiplier 313 are applied to a comparator 306, thereby checking whether the following equation holds or not.

$$Y_i^{L_i} \equiv f_j(X_i) \cdot V_i^{E_i} \pmod{N_i} \quad (59)$$

If this equation holds, then the shop 300 judges that the user 200 has correctly generated the response Yi by use of the secret information of his own, and accepts the electronic coin as valid and receives it.

The procedure to be performed between the shop 300 and the bank 100 and their functional blocks are substantially identical with those shown in FIGS. 6D and 7D, respectively, and hence their detailed description will not be given. Only the difference from the procedure of FIG. 6D is that the information sent from the shop 300 to the bank 100 in Step $S_{21}$ in FIG. 6D must further contain the number of use j of the electronic coin. In the case where the bank 100 detects invalid double usage of the electronic coin, it is checked whether a set of information (Vi, Xi, j) of the same values as the set of information received in Step $S_{C1}$ of FIG. 2D has already been stored in the memory 111 (where $1 \leq j \leq k$), and the subsequent steps are identical with those $S_{C2}$ through $S_{C5}$. That is, when two sets of information (Vi, Xi, j) of the same values exist for the same coin C, two sets of other information (Ei, Yi) and (Ei', Yi') of different values exist corresponding to them, respectively, and consequently, the corresponding secret information Si can be calculated as described previously. Since the secret information Si contains the user identification information IDp, the user 200 of double usage of the electronic coin can be identified.

Transfer of the Electronic Coin as the j-th Use

According to the second embodiment, it is possible to combine the afore-mentioned transfer of the electronic coin and its plural use.

Now, a description will be given of the case where the user 200a transfers the electronic coin C, as its J-th use, to the user 200b and the latter uses the transferred electronic coin for payment to the shop 300.

Figure 12A:
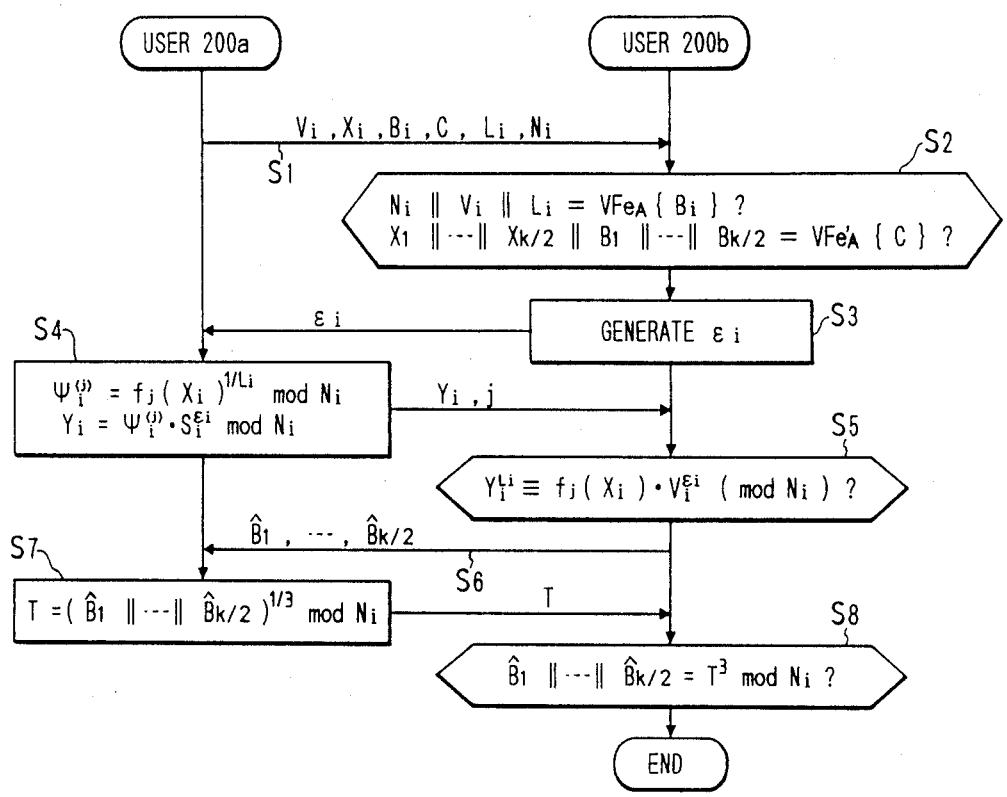
FIG. 12A is a flowchart showing the procedure between the users 200a and 200b for the transfer of the electronic coupon coin in the second embodiment of the invention.
Figure 13A:
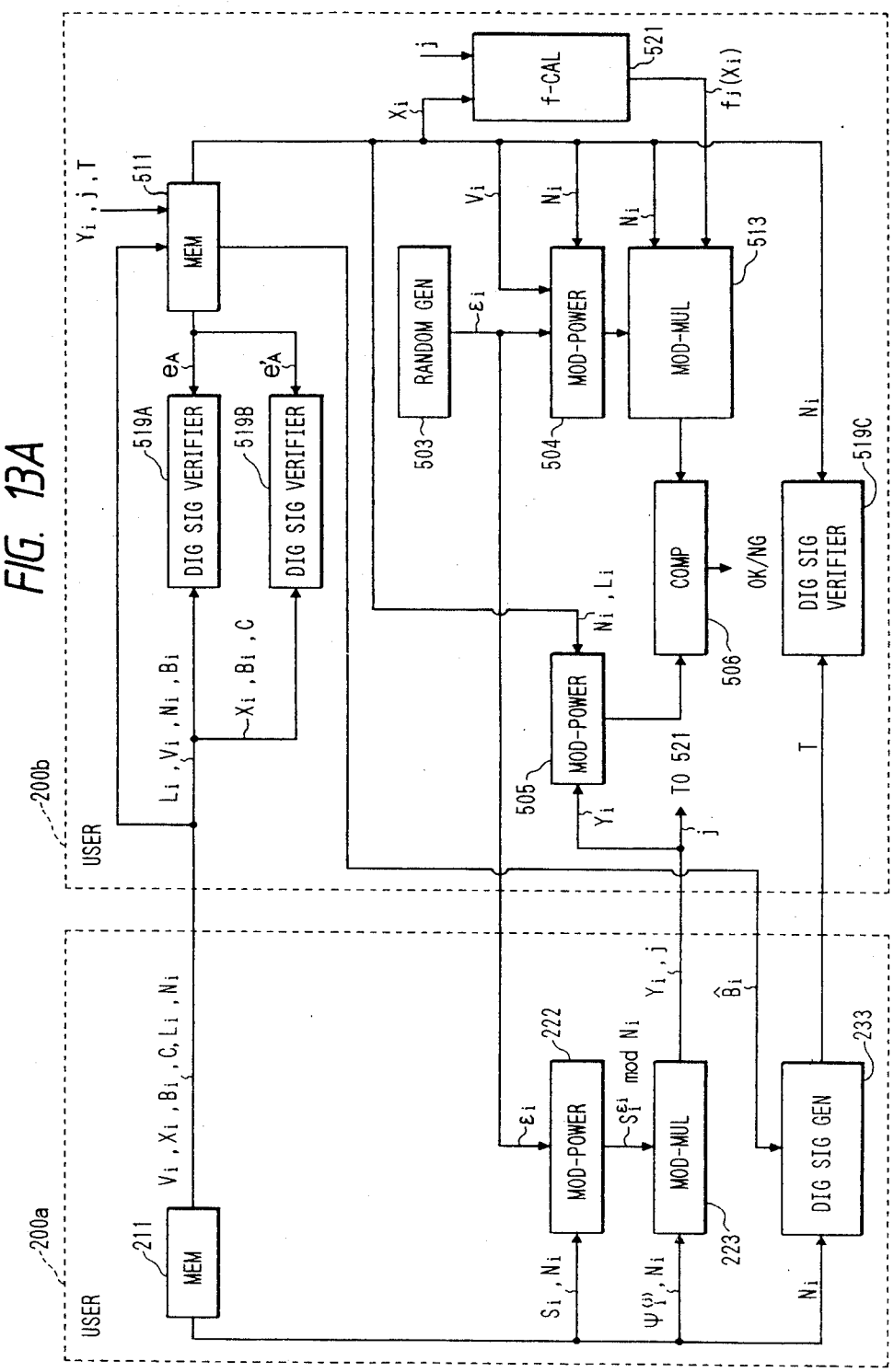
FIG. 13A shows functional block diagrams of the users 200a and 200b in FIG. 12A.

FIG. 12A shows the procedure to be performed between the user 200a who is the transferor and the user 200b who is the transferee, and FIG. 13A illustrates their functional blocks in such a case. In the following, i=1, ..., k/2.

Step $S_1$: At first, the transferor 200a reads out of the memory 211 the information {Ni, Li, Vi, Bi, Xi, C} that he has, and transmits the information to the transferee 200b.

Step $S_2$: The transferee 200b verifies the validity of the signature of the bank 100 applied to Mi=Ni || Vi || Li or ($M_1, \ldots, M_{k/2}$) in the license Bi or B of the transferor 200a by digital signature verification equipment 519A using the public key $e_A$ and verifies the validity of the signature of the bank 100 applied to $X_1 || \ldots || X_{k/2} || B_1 || \ldots || B_{k/2}$ or $X_1 || \ldots || X_{k/2} ||$ B in the electronic coin C by digital signature verification equipment 519B using the public key $e_A'$. In this instance, the afore-mentioned verification equation (45) or (45') is employed for the former verification and the afore-mentioned verification equation 46) or (46') is employed for the latter verification. If either signature is found invalid, then no further processing will be performed.

Step $S_3$: The transferee 200b sends, as an inquiry, the random number $\epsilon_i$ from the random generator 503 to the transferor 200a.

Step $S_4$: The transferor 200a inputs the received random number $\epsilon_i$ and the pieces of information Si and Ni of his own, read out of the memory 211, into the modulo power calculator 222 to calculate $Si^{\epsilon i}$ mod Ni. The output of the modulo power calculator 222 and the pieces of information Ni and $\Psi_i^{<j>}$, read out of the memory 211, are applied to the modulo multiplier 223 to calculate $$Yi = \Psi_i^{<j>} \cdot Si^{\epsilon i} \bmod Ni.$$

The output Yi of the modulo multiplier 223 and j are sent as a response to the transferee 200b. Here, $\Psi_i^{<j>}$ is the same as that described previously in respect of FIG. 11, and $\Psi_i^{<j>}$ which satisfies Eqs. (56), (57) and (58) are precalculated and prestored in the memory 211.

Step $S_5$: The transferee 200b input the received j and the information Xi, read out of a memory 511, into a one-way function calculator 521 to calculate the same function $f_j(Xi)$ as given by Eq. (58) using j as a parameter. On the other hand, the random number $\epsilon_i$ from the random generator 503 and the received pieces of information Vi and Ni are provided to a modulo power calculator 504 to calculate $Vi^{\epsilon i}$ mod Ni, and the output of the modulo power calculator 504, the output $f_j(Xi)$ of the one-way function calculator 521 and the information Ni are applied to a modulo multiplier 513 to obtain $f_j(Xi) Vi^{\epsilon i}$ mod Ni. Moreover, the received response Yi and the pieces of information Ni and Li, read out of the memory 511, are applied to modulo power calculator 505 to calculate $Yi^{Li}$ mod Ni. The outputs of the modulo power calculator 505 and the modulo multiplier 513 are provided to a comparator 506, thereby checking whether the following equation holds or not:

$$Yi^{Li} \equiv f_j(Xi) \cdot Vi^{\epsilon i} \; (\bmod Ni) \qquad (60)$$

If this equation holds, the transferee 200b judges that the transferor 200a has correctly generated the response Yi based on the secret Si of his own.

Step $S_6$: Then the transferee 200b reads out his pieces of license $B_1, \ldots, B_{k/2}$ (or B) from the memory 511 and sends them to the transferor 200a.

Step $S_7$: The transferor 200a applies his signature to the received pieces of license $B_1, \ldots, B_{k/2}$ (or B) by use of signing equipment 233 which calculates the digital signature function of Eq. (47), for example, and sends the signed license, as the deed of transfer T, back to the transferee 200b.

Step $S_8$: The transferee 200b input the public key Ni of the transferor 200a and the received deed of transfer T into digital signature verification equipment 519C to check whether Eq. (48) holds or not. In the case of using the one-piece license B, the check is made using Eq. (48'). When the verification equation holds, the transferee 200b accepts the j-th coin as an invalid one.

Figure 12B:
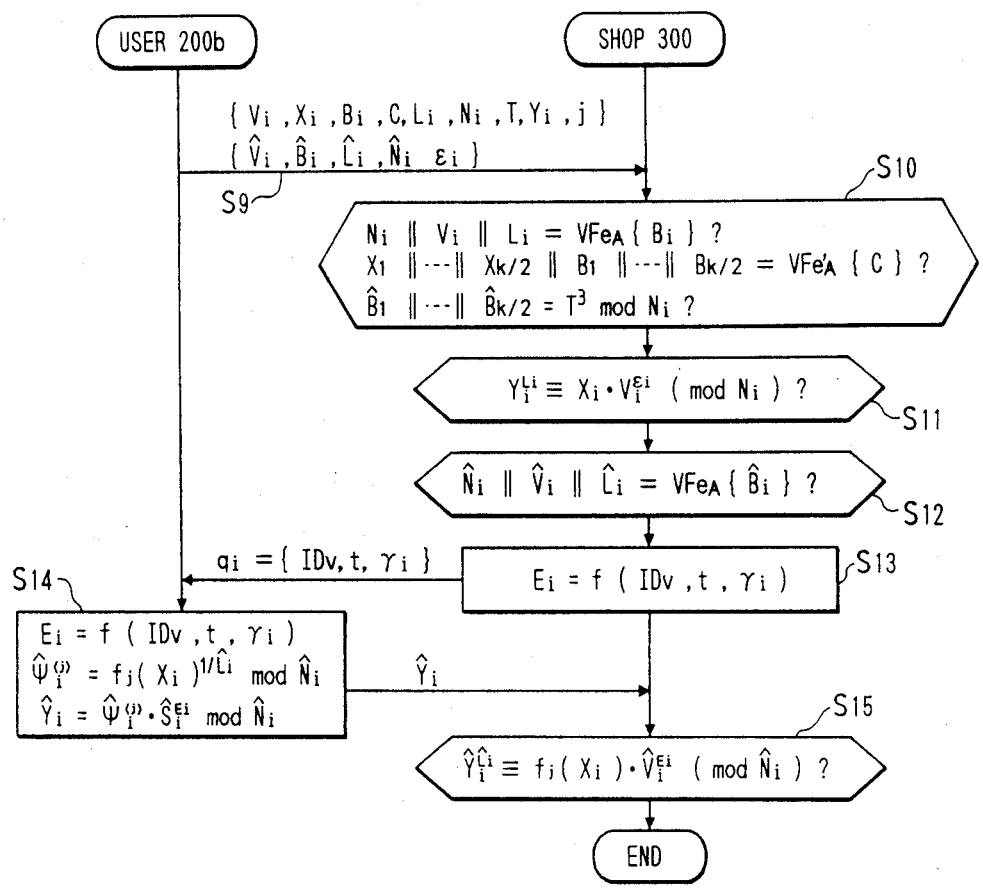
FIG. 12B is a flowchart showing the procedure for the use of the transferred electronic coupon coin.
Figure 13B:
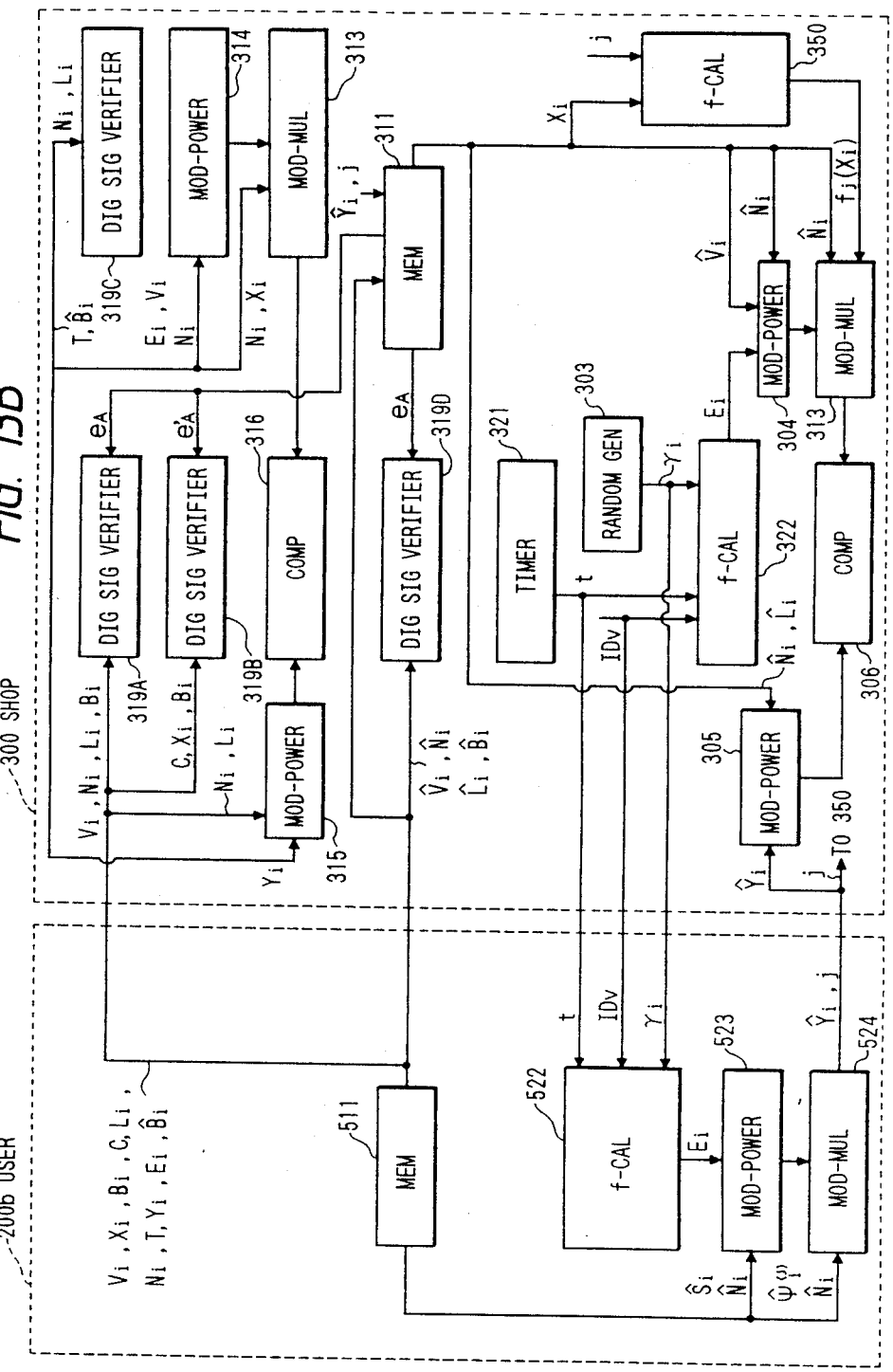
FIG. 13B shows functional block diagrams of the user 200b and the shop 300 in FIG. 12B.

Next, a description will be given of the case where the transferee 200b pays with the transferred electronic coin C to the shop 300. FIG. 12B shows an example of the procedure to be performed between the user 200b and the shop 300, and FIG. 13B illustrates their functional blocks in such a case. In the following, i=1, ..., k/2.

Step $S_9$: The user 200b reads out the received information group {Ni, Li, Vi, Xi, Bi, Yi, C, T, J} and the information group {Ni, Li, Vi, Bi, $\epsilon_i$} of his own from the memory 511 and transmits them to the shop 300.

Step $S_{10}$: The shop 300 verifies the validity of the signature of the bank 100 applied to (Ni || Vi || Li) in the license Bi of the transferor 200a by the digital signature verification equipment 319A using the public key $e_A$ and verifies the validity of the signature of the bank 100 applied to $(X_1 \| \ldots \| X_{k/2} \| B_1 \| \ldots \| B_{k/2})$ in the electronic coin C by the digital signature verification equipment 319B using the public key $e_4'$. For the verification of the signatures, Eqs. (45) and (46) are used, respectively. In the case of the one-piece license B, Eqs. (45') and (46') are used. Moreover, the validity of the signature of the transferor 200a applied to $(B_1 \| \ldots \| B_{k/2})$ in the deed of transfer T is verified by the digital signature verification equipment 319C following Eq. (48). In the case of the one-piece license B, Eq. (48') is employed.

Step $S_{11}$: Furthermorre, the shop 300 inputs the received pieces of information $\epsilon_i$, Vi and Ni into the modulo power calculator 314 to calculate $Vi^{\epsilon_i}$ mod Ni, and applies the output of the modulo power calculator 314 and the received pieces of information Ni and Xi to the modulo multiplier 313 to calculate $Xi \cdot Vi^{\epsilon_i}$ mod Ni. On the other hand, the received pieces of information Yi, Ni and Li are provided to the modulo power calculator 315 to calculate $Yi^{Li}$ mod Ni, and the output of the modulo power calculator 315 and the outputs of the modulo multiplier 313 are input into the comparator 316 to check whether the following equation holds or not.

$Yi^{Li} \equiv Xi \cdot Vi^{\epsilon_i}$ (mod Ni)

If this equation holds, then the shop 300 judges that the received pieces of information Vi and Xi are those of the transferor 200a.

Step $S_{12}$: Moreover, the shop 300 verifies the validity of the signature of the bank 100 applied to $(Ni \| Vi \| Li)$ in the license Bi of the user 200b by the digital signature verification equipment 319D using the public key $e_4$. For this verification the same equation as Eq. (50) is used. In the case of the one-piece license B, the verification is carried out using the same equation as Eq. (50'). When the signature of the bank 100 is found invalid, the processing is discontinued.

Step $S_{13}$: To verify the validity of the user information Vi of the transferee 200b, the shop 300 sends to the user 200b, as an inquiry qi, the output time t of the timer 321, the random number $\gamma_i$ from the random generator 303 and the identification information IDv of the shop 300. At the same time the pieces of information IDv, t and $\gamma_i$ are input into the one-way function calculator 322 to calculate $Ei = f(qi) = f(IDv, t, \gamma_i)$.

Step $S_{14}$: The user 200b inputs the received pieces of information IDv, t and $\gamma_i$ into a one-way function calculator 522, and then applies its output $Ei = f(IDv, t, \gamma_i)$ and the pieces of information Si and Ni of his own, read out of the memory 511, to a modulo power calculator 523 to calculate $Si^{Ei}$ mod Ni. The output of the modulo power calculator 523 and the pieces of information $\Psi_i^{<j>}$ and Ni are input into a modulo multiplier 524 to calculate the following equation:

$Yi = \Psi_i^{<j>} \cdot Si^{Ei}$ mod Ni

This output of the modulo multiplier 524 and j are sent as a response to the shop 300. Incidentally, $\Psi_i^{<j>}$ satisfies the following equation as is the case with the aforementioned $\Psi_i^{<j>}$, and it is precalculated and stored in the memory 511.

$\Psi_i^{<j>} = f_j(Xi)^{1/Li}$ mod Ni

Step $S_{15}$: The shop 300 applied the output Ei of the one-way function calculator 322 and the received pieces of information Vi and Ni to the modulo power calculator 304 to calculate $Vi^{Ei}$ mod Ni. On the other hand, the received information j and the information Xi read out of the memory 311 are provided to the one-way function calculator 350 to calculate $f_j(Xi)$, and the output of the one-way function calculator 350, the information Ni and the output of the modulo power calculator 304 are input into the modulo multiplier 313 to obtain $f_j(Xi) \cdot Vi^{Ei}$ mod Ni. Moreover, the received pieces of information Yi, Ni and Li are applied to the modulo power calculator 305 to calculate $Yi^{Li}$ mod Ni. The outputs of the modulo power calculator 305 and the modulo multiplier 313 are applied to the comparator 306, wherein it is checked whether the following equation holds or not:

$Yi^{Li} \equiv f_j(Xi) \cdot Vi^{Ei}$ (mod Ni)

If this equation holds, the shop 300 judges that the information Vi is the information of the transferee 200b, and accepts the electronic coin C as a valid one.

The procedure to be taken between the bank 100 and the shop 300 and their functional blocks are substantially the same as those shown in FIGS. 8C and 9C, and hence are not shown. The above-described procedure differs from the previously described one in that the information group which is transmitted to the bank 100 in Step $S_{16}$ of FIG. 8C is added with the number-of-use information j received from the user 200b. To detect invalid double usage, the bank 100 checks in Step $S_{C1}$ of FIG. 2D as to whether the set of information of the same values as the received set of information (Vi, Xi, j) is present in the memory 111, and the subsequent steps are the same as those Steps $S_{C2}$ through $S_{C5}$. In the case where two sets of the same information (Vi, Xi, j) are exist, sets of information (Ei, Yi) and (Ei', Yi') of different values corresponding to them also exist, and the corresponding secret information Si can be calculated. Hence, the user of double usage can be identified.

As has been described above, according to the present invention, by adapting protocols of the bank, the users and the shops to attain the intended purposes, it is possible to implement electronic cash having the same functions as those of the prior art system, without taking into account the collision-free property of the two components of the function f which poses a problem in the prior art.

By issuing the license in advance so that it is used for issuing the electronic coin, the processing for issuing the electronic coin involves only one blind signature generating procedure, and consequently, the burden of the processing can be lessened.

Furthermore, the present invention permits the transfer of the electronic coin between users which is impossible with the prior art. That is, the user who has the electronic coin issued by the bank can transfer the electronic coin. In this instance, if the user transfers a used electronic coin to another user, or if the user transfers the same electronic coin to a plurality of users, the secret information of the user who fraudulently processed the electronic coin will be revealed as in the case where the same coin is used twice.

Moreover, the present invention makes it possible to implement a system in which one electronic coin can be used a plurality of times within a fixed number of times. This system produces the same effect as in the case where the user possesses many coins though the amount of information to be held is small (the same amount of information as in the case of possessing one coin).

It will be apparent that many modifications and variations may be effected without departing from the scope of the novel concepts of the present invention.

What is claimed is:

1. An electronic cash implementing method in which a bank issues electronic cash to a user, said user pays a third party with said electronic cash, and said bank settles accounts with a party who finally possesses said used electronic cash, said method comprising the following steps:

wherein said user:
(a) generates user information based on secret information containing identification information of his own, through utilization of a first one-way function;
(b) obtains signed user information by having said bank apply blind signature to information containing said user information;
(c) generates authentication information based on random information through utilization of a second one-way function;
(d) obtains signed authentication information by having said bank apply blind signature to information containing said authentication information;
(e) sends, as said electronic cash issued by said bank, electronic cash information containing said user information, said signed user information, said authentication information and said signed authentication information to said third party;

wherein said third party:
(f) verifies the validity of said signed user information and said signed authentication information contained in said electronic information received from said user;
(g) if said validity is verified, generates and sends an inquiry to said user;

wherein said user:
(h) generates a response based on at least said secret information generated by himself and said inquiry received from said third party and sends said response to said third party;

wherein said third party:
(i) verifies the validity of said response through utilization of said user information and said authentication information contained in said electronic cash information received from said user and, if said response is valid, receives said electronic cash as valid one;
(j) sends said electronic cash information, said inquiry of said third party, and said response of said user to a fourth party, as required.

2. The electronic cash implementing method of claim 1 including a step wherein having when received, from a final party who possesses said used electronic cash, information containing said electronic cash information, said inquiry generated by said third party and said response generated by said user for settlement of accounts, said bank verifies the validity of said signed user information and said signed authentication information contained in said electronic cash information and the validity of said response to said user to said inquiry of said third party.

3. The electronic cash implementing method of claim 2, wherein the step for settlement of accounts includes a step wherein said bank:
detects invalid usage of said electronic cash by said user by checking whether or not a pair of pieces of information of the same values as the pair of said user information and said authentication information contained in said electronic cash exists in information stored in a memory of said bank; and
stores information containing said electronic cash information, said inquiry and said response in said memory.

4. The electronic cash implementing method of claim 2, wherein said user possesses said signed user information as a license issued by said bank; in case of necessity, said user has said bank apply blind signature to information containing said authentication information and said license to obtain signed authentication information and uses said signed authentication information thus obtained, as an electronic coin issued by said bank; when said user uses said electronic coin, he sends an information group containing at least said license, said electronic coin, said user information and said authentication information, as said electronic cash, to said third party; and said third party and said bank verify the validity of said signed user information and said signed authentication information as the verification of the validity of said license and said electronic coin.

5. The electronic cash implementing method of claim 4, wherein said final party is said third party; said fourth party is said bank; and said inquiry generated by said third party contains identification information of said third party and time information.

6. The electronic cash implementing method of claim 4, wherein said third party has secret information and license of his own; and wherein when having verified that said response from said user is valid, said third party sends said license of his own to said user, and said user signs said third party's license and sends said signed license as a deed of transfer to said third party.

7. The electronic cash implementing method of claim 6, wherein said final party is said fourth party; said fourth party receives from said third party at least said user's license, said electronic coin, said user information, said authentication information and said response which have been presented by said user, and said third party's license, said third party's user information and said inquiry presented by said third party;

said fourth party:
verifies the validity of each of said user's license and said electronic coin;
verifies the validity of said user's response to said third party's inquiry;
verifies the validity of said third party's license;
generates an inquiry containing identification information of said fourth party himself and time information and sends said inquiry to said third party;

said third party:
generates a response based on said fourth party's inquiry, said third party's secret information and information generated based on said user's authentication information and sends said response to said fourth party;

said fourth party:
verifies the validity of said third party's response through utilization of said third party's user information, said fourth party's inquiry and said user's authentication information; and
sends to said bank information containing said electronic cash information, said third party's inquiry, said user's response, said third party's license, said third party's user information, said fourth party's inquiry and said third party's response.

8. The electronic cash implementing method of claim 7, wherein said step for the settlement of accounts includes a step wherein said bank verifies the validity of said third party's response to said fourth party's inquiry; a step wherein said bank detects invalid usage of said electronic coin by said third party by checking whether or not an information group of the same values as an information group of said user's authentication information and said third party's user information exists in information stored in said memory of said bank; and a step wherein said bank stores the information including said electronic cash information, said third party's inquiry and said user's response into said memory.

9. The electronic cash implementing method of claim 4, wherein said bank permits said electronic coin to be used a predetermined number K of times; in response to said third party's inquiry in a j-th (where $1 \leq j \leq K$) use of said electronic coin, said user generates said response based on said user's secret information and information calculated from said user's authentication information through utilization of a one-way function which varies using said value J as a parameter, and said user sends said response and said value j to said third party; and said third party verifies the validity of said response through use of said inquiry, said user's authentication information, said user's information and said value j, and inserts said value j into said information to be provided to said fourth party.

10. The electronic cash implementing method of claim 9, further including a step wherein when having verified that said response from said user is valid, said third party sends license of his own to said user; said user signs said third party's license and sends said signed license as a deed of transfer to said third party; and said third party verifies the validity of said deed of transfer.

11. The electronic cash implementing method of claim 9 or 10, further including a step wherein said bank receives also said value j from said final party and detects invalid usage of said electronic coin by said user by checking whether or not an information group of the same values as the information group of said user information, said authentication information and said value j exists in the information stored in said memory of said bank.

12. The electronic cash implementing method of claim 1, 2 or 4, wherein said step of making said bank apply blind signature to said information containing said user information, includes:
a step wherein said user processes said information containing said user information with a one-way blind signature preprocessing function using a randomizing random number as a variable and sends said randomized information as randomized user information to said bank;
a step wherein said bank signs a part of said randomized user information with a signature function and returns said signed information as signed-randomized user information to said user; and
a step wherein said user removes the influence of said randomizing random number from said signed-randomized user information with a blind signature postprocessing function to thereby obtain said signed user information.

13. The electronic cash implementing method of claim 12, further including:
a step wherein said user generates k pieces of said secret information, k being an integer equal to or greater than 2, and k pieces of each of said user information and said randomized user information corresponding to said k pieces of secret information, respectively; and
a step wherein having received said k pieces of randomized user information, said bank demands said user to present a predetermined number of groups of data containing said secret information and said randomizing random numbers used for the generation of those of said randomized user information selected by said bank, calculates said selected pieces of randomized user information from said group of data obtained from said user and verifies that the calculated results each coincide with the corresponding one of said randomized user information received from said user.

14. The electronic cash implementing method of claim 13, wherein said part of randomized user information is a predetermined second number of pieces of said randomized user information other than those used for said verification and said bank sends said predetermined second number of pieces of said signed randomized user information to said user.

15. The electronic cash implementing method of claim 4, wherein said step of obtaining said license, includes a step wherein:
said user:
generates k, k being an integer equal to or greater than 2, pieces of secret information Si, each containing said identification information, generates k pieces of said user information Vi from k pieces of said secret information Si by use of said first one-way function, generates k pieces of said randomized user information Wi by applying, as a variable, information Mi containing said user information to a one-way first blind signature preprocessing function, and sends said k pieces of randomized user information Wi to said bank;
said bank:
selects a predetermined number $k_1$, $k_1$ being smaller than k, of pieces of said randomized user information from said k pieces of randomized user information Wi received from said user, and demands said user to present specified number of sets of information containing said secret information used by said user for generating said selected randomized user information;
said user:
sends said specified $k_1$ sets of information to said bank;
said bank:
calculates $k_1$ pieces of corresponding randomized user information Wi from said sets of information received from said user, verifies that these calculated pieces of randomized user information Wi' respectively coincide with corresponding pieces of said randomized user information Wi selected by said bank, confirms that said identification information IDp of said user is contained in each of pieces of said secret information Si in said sets of information received from said user, and generates a predetermined number $k_2$ of pieces of signed-randomized user information $\Omega_i$ by signing, with a first signature function, $k_2$ pieces of said randomized user information among said k pieces of randomized user information Wi received from said user, except said selected $k_1$ pieces of randomized user information, and sends said $k_2$ pieces of signed-randomized user information $\Omega_i$ to said user; and
said user:
obtained $k_2$ pieces of said signed user information Bi by derandomizing with a first blind signature postprocessing function each of said $k_2$ pieces of said signed-randomized user information $\Omega_i$ received from said bank; and wherein said user uses said $k_2$ pieces of signed user information as said license issued by said bank.

16. The electronic cash implementing method of claim 15, further including a step of issuing said electronic coin, wherein said user generates $k_2$ pieces of said random information Ri, generates from said $k_2$ pieces of random information $k_2$ pieces of said authentication information Xi by use of said second one-way function, generates said randomized authentication information Z by applying, as a variable, information m containing $k_2$ pieces of said license Bi and $k_2$ pieces of said authentication information Xi to a one-way second blind signature preprocessing function, and sends said randomized authentication information Z to said bank;

said bank:

generates said signed-randomized authentication information $\Theta$ by signing with a second signature function said randomized authentication information Z received from said user, and sends said signed-randomized authentication information $\Theta$ to said user; and said user:

obtains, as said electronic coin C, said signed authentication information by derandomizing said signed-randomized authentication information $\Theta$ with a second blind signature postprocessing function.

17. The electronic cash implementing method of claim 16, further including a step wherein:

said user:

generates k prime numbers Li, k pairs of secret prime numbers Pi and Qi and k prime-number products $Ni = Pi \times Qi$, calculates k pieces of said user information Vi from k pieces of said secret information Si by said first one-way function expressed by the following equation:

$Vi = Si^{Li}$ mod Ni, where $i = 1, \ldots, k$.

18. The electronic cash implementing method of claim 17, further including a step wherein, supposing said $k_2$ items $i = 1, \ldots, k_2$, said user:

generates $k_2$ pieces of said authentication information Xi by said second one-way function expressed by the following equation:

$Xi = Ri^{Li}$ mod Ni, wherein $i = 1, \ldots, k_2$.

19. The electronic cash implementing method of claim 18, wherein said final party is said third party and said fourth party is said bank, and further including a step wherein:

said user:

when using said electronic coin C, furnishes said third party with said electronic cash information containing said electronic coin C, $k_2$ pieces of said license Bi, $k_2$ pieces of said user information Vi and $k_2$ pieces of said authentication information xi, along with $k_2$ said prime numbers Li and $k_2$ pieces of said information Ni;

said third party:

generates said inquiry qi, furnishes said user with said inquiry qi, and calculates $k_2$ pieces of inquiry information Ei by an inquiry function $Ei = f(qi)$;

said user:

generates inquiry information Ei from said inquiry qi by said inquiry function, generates $k_2$ pieces of said response Yi from said inquiry information Ei, said secret information Si and said random information Ri by the following equation:

$Yi = Ri \cdot Si^{Ei}$ mod Ni, wherein $i = 1, \ldots, k_2$, and furnishes said third party with said response Yi; and said third party:

verifies the valdity of said response Yi by checking it to ensure that a verification equation expressed by the following equation:

$Yi^{Li} \equiv Xi \cdot Vi^{Ei}$ (mod Ni), where $i = 1, \ldots, k_2$, holds, by use of said inquiry information Ei generated by himself and said user information Vi and said authentication information Xi received from said user, and regards said electronic coin C as valid.

20. The electronic cash implementing method of claim 19, further including a step wherein:

said third party:

furnishes, for settlement of said electronic coin, said bank with information containing said electronic cash information {Vi, Xi, Bi, C}, said prime-number products Ni, said prime numbers Li, said inquiry qi and said response Yi;

said bank:

verifies the validity of said response Yi to said inquiry qi by checking that the following equation holds:

$Yi^{Li} \equiv Xi \cdot Vi^{Ei}$ (mod Ni), where $i = 1, \ldots, k_2$.

21. The electronic cash implementing method of claim 20, further including a step wherein said bank checks whether or not a pair of information of the same values as a pair of said user information and said authentication information {Vi, Xi} received from said fourth party exists in said memory of said bank; if such a pair of information does not exist, said bank stores in said memory the information received from said fourth party; and if such a pair of information exists, said bank reads out the corresponding inquiry qi' and response Yi' from said memory, calculates inquiry information $Ei' = f(qi')$ from said read-out inquiry qi' solves, by the Euclid's algorithm, integers $\alpha$ and $\beta$ which satisfy the following equation:

$\alpha \cdot Li + \beta(Ei - Ei') = 1$, calculates secret information Si by the following equation:

$Vi^\alpha \cdot (Yi/Yi')^\beta$ mod $Ni = Si$, and detects from said calculated secret information Si identification information of said user who invalidly used said electronic coin.

22. The electronic cash implementing method of claim 18, wherein said final party is said fourth party, and further including a step wherein:

said user:

when sending said electronic coin to said third party, furnishes said third party with information containing said electronic cash information {Vi, Xi, Bi, C}, said prime-number products Ni and said prime numbers Li;

said third party:

generates $k_2$ pieces of said inquiry $\epsilon_i$ and sends them to said user;

said user:

generates $k_2$ pieces of response Yi from said inquiry $\epsilon_i$, said random information Ri and said secret information Si by the following equation:

$$Yi = Ri \cdot Si^{\epsilon_i} \bmod Ni,$$

where $i=1, \ldots, k_2$, and sends said $k_2$ pieces of response Yi to said third party;

said third party:

verifies the validity of said response by checking it to ensure that the following equation holds:

$$Yi^{Li} \equiv Xi \cdot Vi^{\epsilon_i} \pmod{Ni},$$

where $i=1, \ldots, k_2$, and furnishes said user with $k_2$ pieces of license Bi of said third party;

said user:

generates a deed of transfer T by applying a signature, with use of the prime-number Ni of said user, to said $k_2$ pieces of license Bi and sends said deed of transfer T to said third party.

23. The electronic cash implementing method of claim 22, further including a step wherein:

said third party:

when using said electronic coin, furnishes said fourth party with the information Ni, Li, said electronic cash information {Vi, X, Bi, C}, said deed of transfer T, said third party's inquiry $\epsilon_i$, said user's response Yi, said third party's license Bi, and said third party's prime-number products Ni, prime numbers Li and user information Vi used for generating said third party's license Bi;

said fourth party:

verifies the validity of said response Yi of said user by checking it to ensure that the following equation holds:

$$Yi^{Li} \equiv Xi \cdot Vi^{\epsilon_i} \pmod{Ni},$$

where $i=1, \ldots, k_2$, generates an inquiry qi, sends said inquiry qi to said third party, and calculates inquiry information Ei from an inquiry function Ei = f(qi);

said third party calculates inquiry information Ei from said inquiry qi received from said fourth party by said inquiry function Ei = f(qi), generates a response Yi from the following equations:

$$\Psi = Xi^{1/Li} \bmod Ni,$$

$$Yi = \Psi_i \cdot Si^{Ei} \bmod Ni,$$

where $i=1, \ldots, k_2$ and sends said response Yi to said fourth party; and said fourth party:

verifies the validity of said response Yi of said third party by checking it, through use of said user's authentication information Xi, to ensure that the following equation holds:

$$Yi^{Li} \equiv Xi \cdot Vi^{Ei} \pmod{Ni},$$

where $i=1, \ldots, k_2$.

24. The electronic cash implementing method of claim 23, further including a step wherein:

said fourth party:

for settlement of said electronic coin, furnishes said bank with said electronic cash information {Vi, Xi, Bi, C}, pieces of the information Ni, Li and Yi of said user, said deed of transfer T, the information {Ni, Vi, Li, Bi, $\epsilon_i$, Yi} of said third party and said inquiry qi of said fourth party;

said bank:

verifies the validity of said response Yi of said user and said response Yi of said third party by checking them to ensure that the following equations hold:

$$Yi^{Li} \equiv Xi \cdot Vi^{\epsilon_i} \pmod{Ni},$$

where $i=1, \ldots, k_2$, $$Yi^{Li} \equiv Xi \cdot Vi^{Ei} \pmod{Ni}.$$

25. The electronic cash implementing method of claim 24, further including a step wherein said bank checks whether or not a pair of information of the same values as a pair of said user information and said authentication information {Vi, Xi} received from said fourth party exists in said memory of said bank; if such a pair of information does not exist, said bank stores in said memory the information received from said fourth party; and if such a pair of information exists, said bank reads out the corresponding inquiry qi' and response Yi' from said memory, calculates inquiry information Ei' = f(qi') from said read-out inquiry qi', solves, by the Euclid's algorithm, integers $\alpha$ and $\beta$ which satisfy the following equation:

$$\alpha \cdot Li + \beta(Ei - Ei') = 1,$$

calculates secret information Si from the following equation:

$$Vi^{\alpha} \cdot (Yi/Yi')^{\beta} \bmod Ni = Si,$$

and detects from said calculated secret information Si the identification information of said user who invalidly used said electronic coin C.

26. The electronic cash implementing method of claim 24 or 25, further including a step wherein said bank checks whether or not a pair of information of the same values as a pair {Vi, Xi} of said user information Vi of said third party and said authentication information Xi of said user received from said fourth party, is stored in said memory of said bank; if such a pair of information is not found, said bank stores in said memory the information received from said fourth party; and if such a pair of information is found, said bank reads out the corresponding inquiry qi' of said fourth party and the response Yi' thereto of said third party from said memory, calculates inquiry information Ei' = f(qi') from said read-out inquiry qi', solves, by the Euclid's algorithm, integers $\alpha$ and $\beta$ which satisfy the following equation:

$$\alpha \cdot Li + \beta(Ei - Ei') = 1,$$

calculates secret information Si from the following equation:

$$Vi^{\alpha} \cdot (Yi/Yi')^{\beta} \bmod Ni = Si,$$

and detects from said calculated secret information Si the identification information of said third party who invalidly used said electronic coin C.

27. The electronic cash implementing method of claim 18, wherein said bank allows said electronic coin to be used a predetermined number K of times, said final party is said third party and said fourth party is said bank, and further including a step wherein:
said user:
furnishes said third party with said electronic cash information {Vi, X, Bi, C} and information {Ni, Li} at the time of a j-th use of said electronic coin by said user, where $1 \leq j \leq K$;
said third party:
generates $k_2$ pieces of said inquiry qi, sends said inquiry qi to said user, and calculates inquiry information Ei by an inquiry function Ei=f(qi);
said user:
calculates said inquiry information Ei from said inquiry qi by said inquiry function Ei=f(qi), generates said response Yi from the following equations:

$$\Psi_i<j> = f_j(Xi)^{1/Li} \bmod Ni,$$

where $i=1, \ldots, k_2$, $$Yi = \Psi_i<j> \cdot Si^{Ei} \bmod Ni,$$

sends said response Yi to said third party, where $f_j(Xi)$ is a function of Xi which varies with j as a parameter; and
said third party:
verifies the validity of said response Yi by checking it to ensure that the following equation holds:

$$Yi^{Li} \equiv f_j(Xi) \cdot Vi^{Ei} \pmod{Ni},$$

where $i=1, \ldots, k_2$.

28. The electronic cash implementing method of claim 27, further including a step wherein, when having received information containing said electronic cash information {Vi, Xi, Bi, C}, the information {Ni, Li, Yi, j} of said user and the inquiry qi of said third party, from said final party for settlement of said electronic coin, said bank calculates inquiry information Ei by said inquiry function Ei=f(qi), and checks whether or not a set of information of the same values as a set of said user information Vi, said authentication information Xi and said j is stored in said memory of said bank; and if such a set of information is found, said bank reads out the corresponding inquiry qi' of said third party and the corresponding response Yi of said user from said memory, calculates inquiry information Ei'=f(qi') from said read-out inquiry qi', solves, by the Euclid's algorithm, integers $\alpha$ and $\beta$ which satisfy the following equation:

$$\alpha \cdot Li + \beta(Ei - Ei') = 1,$$

where $i=1, \ldots, k_2$,
calculates secret information Si from the following equation:

$$Vi^\alpha \cdot (Yi/Yi')^\beta \bmod Ni = Si,$$

where $i-1, \ldots, k_2$,
and obtains from said calculated secret information Si the identification information IDp of said user who invalidly used said electronic coin.

29. The electronic cash implementing method of claim 18, wherein said bank allows said electronic coin to be used a predetermined number K of times, and further including a step wherein:
said user:
furnishes said third party with said electronic cash information {Vi, Xi, Bi, C} and information {Ni, Li} at the time of a j-th use of said electronic coin by said user, where $1 \leq j \leq k$;
said third party generates said inquiry $\epsilon_i$ and sends it to said user;
said user:
generates said response Yi by the following equations with use of said inquiry $\epsilon_i$:

$$\Psi_i<j> = f_j(Xi)^{1/Li} \bmod Ni,$$

where $i=1, \ldots, k_2$, $$Yi = \Psi_i<j> \cdot Si^{\epsilon_i} \bmod Ni,$$

and sends said response Yi to said third party, together with j, where $f_j(Xi)$ is a function of Xi which varies with j as a parameter;
said third party:
verifies the validity of said response Yi by checking it to ensure that the following equation holds:

$$Yi^{Li} \equiv f_j(Xi) \cdot Vi^{\epsilon_i} \pmod{Ni},$$

where $i=1, \ldots, k_2$,
and furnishes said user with a license Bi, where $i=1, \ldots, k_2$, which said third party has;
said user:
generates a deed of transfer T by applying a signature, with use of a prime-number product Ni of said user, to said license Bi of said third party and sends said deed of transfer T to said third party.

30. The electronic cash implementing method of claim 29, wherein said final party is said fourth party, and further including a step wherein:
said third party:
when using said electronic coin C, furnishes said fourth party with said electronic cash information {Vi, Xi, Bi, C} information {Ni, Li, T, Yi, j} of said user and information {Ni, Li, Bi, $\epsilon_i$} of said third party;
said fourth party:
verifies the validity of said response Yi of said user by checking it to ensure that the following equation hold:

$$Yi^{Li} \equiv Xi \cdot Vi^{\epsilon_i} \pmod{Ni},$$

where $i=1, \ldots, k_2$,
generates an inquiry qi, sends said inquiry qi to said third party, and calculates inquiry information Ei from an inquiry information Ei=f(qi);
said third party:
calculates said inquiry function Ei from said inquiry qi by said inquiry function Ei=f(qi), generates a response Yi by the following equations:

$$\Psi_i<j> = f_j(Xi)^{1/Li} \bmod Ni,$$

$$Yi = \Psi_i<j> \cdot Si^{Ei} \bmod Ni,$$

where $i=1, \ldots, k_2$, and sends said response Yi to said fourth party; and said fourth party:

verifies the validity of said response Yi of said third party by checking it to ensure that the following equation holds:

$$Y_i^{L_i} = f(X_i) \cdot V_i^{E_i} \pmod{N_i},$$

where $i = 1, \ldots, k_2$.

31. The electronic cash implementing method of claim 4, wherein said step of making said bank apply said blind signature to said information containing said user information, includes a step wherein:
said user:
  generates k, k being an integer equal to or greater than 2, pieces of said secret information Si each containing said identification information, generates k pieces of said user information Vi from said k pieces of secret information Si by use of said first one-way function, generates k pieces of said randomized under information Wi randomized by applying, as a variable, information Mi containing each of said k pieces of user information Vi to a one-way first blind signature preprocessing function, and sends said k pieces of randomized user information Wi;
said bank;
  when having received said k pieces of randomized user information Wi, selects therefrom a predetermined first number $k_1$ of pieces of said randomized user information, $k_1$ being smaller than k, specifies sets of information each containing said secret information Si used by said user for generating said randomized user information, and demands said user to present said specified sets of information;
said user:
  furnishes said bank with said $k_1$ sets of information specified by said bank;
said bank:
  calculates, from said sets of information received from said user, $k_1$ corresponding pieces of randomized user information Wi', verifies that said calculated randomized user information Wi' coincides with the corresponding pieces of said selected randomized user information Wi, respectively, confirms that said identification information IDp of said user is contained in all the pieces of said secret information in said sets of information received from said user, generates signed-randomized user information Ω by signing, with a first signature function, multiplex randomized user information obtained from a predetermined number $k_2$ of pieces of said randomized user information among said k pieces of randomized user information received from said user, except said selected $k_1$ pieces of randomized user information, sends said signed-randomized user information Ω to said user; and
said user:
  derandomizes said signed-randomized user information Ω, received from said bank, with a first blind signature postprocessing function to obtain said signed user information B;
wherein said user uses said signed user information B as said license issued by said bank.

32. The electronic cash implementing method of claim 31, wherein said step of issuing said electronic coin, including a step wherein:
said user:
  generates $k_2$ pieces of said random information Ri, generates therefrom $k_2$ pieces of said authentication information Xi by a second one-way function, generates said randomized authentication information Z by applying information m containing said $k_2$ pieces of said authentication information Xi and said license B, as a variable, to a one-way second blind signature preprocessing function, and sends said randomized authentication information Z to said bank;
said bank:
  generates said signed randomized authentication information Θ by signing said randomized authentication information Z with a second signature function, and sends said signed-randomized authentication information Θ to said user; and
said user:
  derandomizes said signed-randomized authentication information Θ with a second blind signature postprocessing function to obtain said signed authentication information as said electronic coin C.

33. The electronic cash implementing method of claim 31, further including a step wherein:
said user:
  generates k prime members Li, k pairs of secret prime numbers Pi and Qi and k prime-number products $Ni = Pi \times Qi$, calculates k pieces of said user information Vi from k pieces of said secret information Si by said first one-way function expressed by the following equation:

$$V_i = S_i^{L_i} \bmod N_i,$$

where $i = 1, \ldots, k$.

34. The electronic cash implementing method of claim 33, further including a step wherein, letting said $k_2$ items i be $1, \ldots, k_2$,
said user:
  generates $k_2$ pieces of said authentication information Xi by using said second one-way function expressed by the following equation:

$$X_i = R_i^{L_i} \bmod N_i,$$

where $i = 1, \ldots, k_2$.

35. The electronic cash implementing method of claim 34, wherein said final party is said third party and said fourth party is said bank, and further including a step wherein:
said user:
  when using said electronic coin, furnishes said third party with said electronic cash information containing said electronic coin C, said license B, $k_2$ pieces of said user information Vi and $k_2$ pieces of said authentication information Xi, $k_2$ said prime numbers Li and $k_2$ said prime-number products Ni;
said third party:
  generates said inquiry qi, sends said inquiry qi to said user, and calculates $k_2$ pieces of inquiry information Ei from an inquiry function $E_i = f(q_i)$,
said user:
  generates inquiry information Ei from said inquiry qi by said inquiry function, generates $k_2$ pieces of said response from said inquiry information Ei, said secret information Si and said secret random information Ri by the following equation $$Y_i = R_i \cdot S_i^{E_i} \bmod N_i,$$

where i=1, ..., k₂, and sends said k₂ pieces of response to said third party; and
said third party:
  verifies the validity of said response Yi by checking them to ensure that the following equation $$Y_i^{L_i} \equiv X_i \cdot V_i^{E_i} \pmod{N_i},$$

where i=1, ..., k₂ holds, by use of said inquiry information Ei formed by himself, said user information Vi and said authentication information Xi received from said user, and authenticates said electronic coin as valid.

36. The electronic cash implementing method of claim 35, further including a step wherein:
said third party:
  for the settlement of said electronic coin, furnishes said bank with information containing said electronic cash information (Vi, Xi, B, C), said prime-number products Ni, said prime numbers Li, said inquiry qi and said response Yi;
said bank:
  verifies the validity of said response Yi to said inquiry qi by checking that the following equation holds:

$$Y_i^{L_i} \equiv X_i \cdot V_i^{E_i} \pmod{N_i},$$

where i=1, ..., k₂.

37. The electronic cash implementing method of claim 36, furthr including a step wherein said bank checks whether or not a set of information of the same values as a set of said user information and said authentication information {Vi, Xi} received from said fourth party exists in said memory of said bank; if such a pair of information is found, said bank stores in said memory said information received from said fourth party; and if such a pair of information is found, said bank reads out of said memory the corresponding inquiry qi' and response Yi', calculates an inquiry information Ei'=f(qi') from said read-out inquiry qi', solves, by the Euclid's algorithm, integers α and β which satisfy the following equation:

$$\alpha \cdot L_i + \beta(E_i - E_i') = 1,$$

calculates secret information Si by the following equation:

$$V_i^{\alpha} \cdot (Y_i/Y_i')^{\beta} \bmod N_i = S_i,$$

and obtains from said calculated secret information Si the identification information IDp of said user who invalidly used said electronic coin.

38. The electronic cash implementing method of claim 34, wherein said final party is said fourth party, and further including a step wherein:
said user:
  when transferring said electronic coin to said third party, furnishes said third party with information containing said electronic cash information {Vi, Xi, B, C}, said prime-number products Ni and said prime numbers Li;
said third party:
  generates k₂ pieces of said inquiry $\epsilon_i$ and sends it to said user;
said user:
  generates k₂ pieces of response Yi by the following equation $$Y_i = R_i \cdot S_i^{\epsilon} \bmod N_i,$$

where i=1, ..., k₂,
by use of said secret random information Ri and said secret information Si, and sends said response Yi to said third party;
said third party:
  verifies the validity of said response by checking it to ensure that the following equation holds:

$$Y_i^{L_i} \equiv X_i \cdot V_i^{\epsilon_i} \pmod{N_i},$$

where i=1, ..., k₂,
and furnishes said user with a license B which said third party has;
said user:
  generates a deed of transfer T by applying a signature, with use of the prime-number Ni of said user, to said license B of said third party, and sends said deed of transfer T to said third party.

39. The electronic cash implementing method of claim 38, further including a step wherein:
said third party:
  when using said electronic coin, furnishes said fourth party with the information Ni, Li, said electronic cash information {Vi, Xi, B, C}, said deed of transfer T, said third party's inquiry $\epsilon_i$, said user's response Yi, said third party's license B and said third party's prime-number products Ni, prime numbers Li and user information Vi used for generating said third party's license B;
said fourth party:
  verifies the validity of said response Yi of said user by checking it to ensure that the following equation hold:

$$Y_i^{L_i} \equiv X_i \cdot Y_i^{\epsilon_i} \pmod{N_i},$$

where i=1, ..., k₂,
generates an inquiry qi, sends said inquiry qi to said third party, and calculates inquiry information Ei by an inquiry function Ei=f(qi);
said third party:
  calculates inquiry information Ei from said inquiry qi from said fourth party by said inquiry function Ei=f(qi), generates a response Yi by the following equations $$\Psi_i = X_i^{1/L_i} \bmod N_i, \text{ and}$$

$$Y_i = \Psi_i \cdot S_i^{E_i} \bmod N_i,$$

where i=1, ..., k₂
and sends said response Yi to said fourth party; and
  said fourth party verifies the validity of said response Yi of said third party by checking it to ensure that the following equation holds:

$$Y_i^{L_i} \equiv X_i \cdot V_i^{E_i} \pmod{N_i},$$

where i=1, ..., k₂,
by use of said authentication information Xi of said user.

40. The electronic cash implementing method of claim 39, further including a step wherein:
said fourth party:
  for settlement of said electronic coin, furnishes said bank with said electronic cash information {Vi, X, B, C}, said pieces of information Ni, Li and Yi of said user, said deed of transfer T, said information {Ni, Vi, Li, B, $\epsilon_i$, Y} of said third party and said inquiry qi of said fourth party; and said bank:
verifies the validity of said response Yi of said user and said response Yi of said third party by checking them to ensure that the following equations hold:

$$Y_i^{Li} \equiv X_i \cdot V_i^{\epsilon_i} \pmod{N_i},$$

where $i = 1, \ldots, k_2$, and $$Y_i^{Li} \equiv X_i \cdot V_i^{\epsilon_i} \pmod{N_i}.$$

41. The electronic cash implementing method of claim 40, further including a step wherein said bank checks whether or not a pair of information of the same values as a pair of said user information and said authentication information {Vi, Xi} received from said fourth party exists in said memory of said bank; if such a pair of information is not found, said bank stores in said memory said information received from said fourth party; and if such a pair of information is found, reads out of said memory an inquiry qi' and a response Yi' corresponding thereto, calculates inquiry information Ei' = f(qi') from said read-out inquiry qi', solves, by the Euclid's algorithm, integers $\alpha$ and $\beta$ which satisfy the following equation:

$$\alpha \cdot Li + \beta(Ei - Ei') = 1,$$

calculates secret information Si by the following equation:

$$V_i^\alpha \cdot (Y_i/Y_i')^\beta \bmod N_i = S_i,$$

and obtains from said calculated secret information Si the identification information IDp of said user who invalidly used said electronic coin C.

42. The electronic cash implementing method of claim 40 or 41, further including a step wherein said bank checks whether or not a pair of information of the same values as a pair {Vi, Xi} of said user information Vi of said third party and said authentication information Xi of said user received from said fourth party is stored in said memory of said bank; if such a pair of information is not found, said bank stores in said memory said information received from said fourth party; and is such a pair of information is found, said bank reads out of said memory the corresponding inquiry qi' of said fourth party and a response Yi' thereto of said third party, calculates inquiry information Ei' = f(qi') from said read-out inquiry qi', solves, by the Euclid's algorithm, integers $\alpha$ and $\beta$ which satisfy the following equation:

$$\alpha \cdot Li + \beta(Ei - Ei') = 1,$$

calculates secret information Si from the following equation:

$$V_i^\alpha \cdot (Y_i/Y_i')^\beta \bmod N_i = S_i,$$

and obtains from said calculated secret information Si the identification information of said third party who invalidly used said electronic coin C.

43. The electronic cash implementing method of claim 34, wherein said bank allows said electronic coin to be used a predetermined number K of times, said final party is said third party and said fourth party is said bank, and further including a step wherein:

said user:
at the time of a j-th use of said electronic coin, furnishes said third party with said electronic cash information {Vi, X, B, C} and information {Ni, Li}, where $1 \leq j \leq k$;

said third party:
generates $k_2$ pieces of said inquiry qi, sends said inquiry qi to said user, and calculates inquiry information Ei by an inquiry function Ei = f(qi);

said user:
calculates inquiry information Ei from said inquiry qi by said inquiry function Ei = f(qi), generates said response Yi from the following equations:

$$\Psi_i^{<j>} = f_j(X_i)^{1/Li} \bmod N_i,$$

where $i = 1, \ldots, k_2$, and $$Y_i = \Psi_i^{<j>} \cdot S_i^{Ei} \bmod N_i,$$

sends said response Yi to said third party, together with j, where $f_j(X_i)$ is a function of Xi and varies with j as a parameter; and said third party:
verifies the validity of said response Yi by checking it to ensure that the following equation holds:

$$Y_i^{Li} \equiv f_j(X_i) \cdot V_i^{Ei} \pmod{N_i},$$

where $i = 1, \ldots, k_2$.

44. The electronic cash implementing method of claim 43, further including a step wherein, when having received from said final party, for settlement of said electronic coin, information containing said electronic cash information {Vi, Xi, B, C}, the informatiion {Ni, Li, Yi, j} of said user and said third party's inquiry qi, said bank calculates inquiry information Ei by said inquiry function Ei = f(qi); sand bank checks whether or not a set of information of the same values as a set {Vi, Xi, j} of said user information Vi, said authentication information Xi and said j is stored in said memory of said bank; if such a set of information is found, said bank reads out of said memory the corresponding inquiry qi' of said third party and the response Yi thereto of said user, calculates inquiry information Ei' = f(qi') from said read-out inquiry qi', solves, by the Euclid's algorithm, integers $\alpha$ and $\beta$ which satisfy the following equation:

$$\alpha \cdot Li + \beta(Ei - Ei') = 1,$$

where $i = 1, \ldots, k_2$, calculates secret information Si from the following equation:

$$V_i^\alpha \cdot (Y_i/Y_i')^\beta \bmod N_i = S_i,$$

and obtains from said calculated secret information Si the identification information IDp of said user who invalidly used said electronic coin.

45. The electronic cash implementing method of claim 34, wherein said bank allows said electronic coin to be used a predetermined number K of times, and further including a step wherein:

said user:
at the time of j-th (where $1 \leq j \leq K$) use of said electronic coin, furnishes said third party with said electronic cash information {Vi, Xi, B, C} and information {Ni, Li}, where $1 \leq j \leq K$;

said third party:
generates and sends said inquiry $\epsilon_i$ to said user;

said user:
generates said response Yi by the following equations:

$$\Psi_i^{<j>} = f_j(Xi)^{1/Li} \bmod Ni,$$

where $i = 1, \ldots, k_2$, and $$Yi = \Psi_i^{<j>} \cdot Si^{\epsilon_i} \bmod Ni$$

and sends said response Yi to said third party, together with j, where $f_j(Xi)$ is a function of Xi which varies with j as a parameter;

said third party:
verifies the validity of said response Yi by checking it to ensure that the following equation holds:

$$Yi^{Li} \equiv f_j(Xi) \cdot Vi^{\epsilon_i} \pmod{Ni},$$

where $i = 1, \ldots, k_2$, and sends to said user the license B that said third party has;

said user generates a deed of transfer T by applying a signature, with use of a prime-number product Ni, to said license B of said third party, and sends said deed of transfer T to said third party.

46. The electronic cash implementing method of claim 45, wherein said final party is said fourth party, and further including a step wherein:

said third party:
when using said electronic coin, furnishes said fourth party with said electronic cash information {Vi, Xi, B, C}, information {Ni, Li, T, Yi, j} of said user and information {Ni, Li, B, $\epsilon_i$} of said third party;

said fourth party:
verifies the validity of said user's response Yi by checking it to ensure that the following equation hold:

$$Yi^{Li} \equiv Xi \cdot Yi^{\epsilon_i} \pmod{Ni},$$

where $i = 1, \ldots, k_2$, generates an inquiry qi, sends said inquiry qi to said third party, and calculates inquiry information Ei by an inquiry function $Ei = f(qi)$;

said third party:
calculates inquiry information Ei from said inquiry qi from said fourth party by said inquiry function $Ei = f(qi)$, generates a response Yi by the following equations:

$$\Psi_i^{<j>} = Xi^{1/Li} \bmod Ni, \text{ and}$$

$$Yi = \Psi_i^{<j>} \cdot Si^{Ei} \bmod Ni,$$

where $i = 1, \ldots, k_2$ and sends said response Yi to said fourth party; and said fourth party:
verifies the validity of said response Yi by checking it to ensure that the following equation holds:

$$Yi^{Li} \equiv Xi \cdot Vi^{Ei} \pmod{Ni},$$

where $i = 1, \ldots, k_2$.

47. The electronic cash implementing method of claim 1, wherein said step of making said bank apply said blind signature to said information containing said user information and said step of making said bank apply said blind signature to said information containing said authentication information, include a step wherein:

said user:
generates k, k being an integer equal to or greater than 2, pieces of said secret information Si each containing said identification information IDp, generates k pieces of said random number information Ri, generates k pieces of said user information Vi and k pieces of said authentication information Xi on the basis of said k pieces of secret information Si and said k pieces of random information Ri by use of said first and second one-way functions, generates k pieces of said randomized user information Wi each randomized by applying each of said k pieces of user information Vi as a variable to said one-way first blind signature preprocessing function, generates k pieces of said randomized authentication information Zi each randomized by applying each of said k pieces of authentication information Xi as a variable to said one-way second blind signature preprocessing function, and sends said k pieces of randomized user information Wi and said k pieces of randomized authentication information Zi to said bank;

said bank:
selects a predetermined first number $k_1$ of pieces of said randomized user information and k pieces of said randomized authentication information from said k pieces of randomized user information and said k pieces of randomized authentication information, respectively, where $k_1$ is smaller than k, specifies $k_1$ information groups each containing said secret information Si and said random information Ri used for generating said randomized user information Wi and said randomized authentication information Zi selected by said bank, and demands said user to present said specified $k_1$ information groups;

said user:
sends to said bank said $k_1$ information groups specified by said bank;

said bank:
calculates said $k_1$ randomized user information Wi and said $k_1$ randomized authentication information Zi on the basis of said information groups received from said user, verifies that the $k_1$ pieces of randomized user information Wi' thus calculated and the $k_1$ pieces of randomized authentication information Zi' thus calculated respectively coincide with said selected $k_1$ pieces of randomized user information Wi and said selected $k_1$ pieces of randomized authentication information Zi, confirms that said identification information IDp of said user is contained in all pieces of said secret information Si in said information groups received from said user, generates a predetermined number $k_2$ of pieces of signed-randomized user information $\Omega_i$ by signing, with a first signature function, $k_2$ pieces of randomized user information among said k pieces of randomized user information Wi received from said user, except said selected $k_1$ pieces of randomized user information, sends said $k_2$ pieces of signed-randomized user information $\Omega_i$ to said user, generates $k_2$ pieces of signed-randomized authentication information $\Theta_i$ by signing, with a second signature function, $k_2$ pieces of randomized authentication information among said k pieces of randomized authentication information Zi received from said user, except said selected $k_1$ pieces of randomized authentication information, and sends said $k_2$ pieces of signed-randomized authentication information $\Theta_i$ to said user; and said user:
derandomizes said $k_2$ pieces of signed-randomized user information $\Omega_i$ and said $k_2$ pieces of signed-randomized authentication information $\Theta_i$ with first and second blind signature postprocessing functions, respectively, to obtain $k_2$ pieces of said signed user information Bvi and $k_2$ pieces of said signed authentication information Bxi;

wherein processing related to said signed user information and said signed authentication information in the use of said electronic cash is performed for said second number $k_2$ of pieces of signed user information and said second number $k_2$ of pieces of signed authentication information.

48. The electronic cash implementing method of claim 47, wherein
said user:
generates k prime numbers Li, k pairs of secret prime numbers Pi and Qi, and k prime-number products $Pi \times Qi = Ni$, calculates said user information Vi and said authentication information Xi from said secret information Si and said random information Ri by use of said first and second one-way functions respectively expressed by the following equations:
$Vi = Si^{Li} \mod Ni$
$Xi = Ri^{Li} \mod Ni$
where $i = 1, \ldots, k$.

49. The electronic cash implementing method of claim 48, wherein said final party is said third party and said fourth party is said bank, and further including a step wherein when using said electronic cash with respect to said third party, said user sends $k_2$ sets of information {Vi, Bvi, Xi, Bxi} as electronic cash information to said third party, together with said prime-number product Ni and said prime number Li; said third party produces $k_2$ pieces of said inquiry qi and sends them to said user, and for said $k_2$ items i, calculates inquiry information Ei by use of an inquiry function $Ei = f(qi)$; said user calculates $k_2$ pieces of inquiry information Ei from said inquiry by use of said inquiry function $Ei = f(qi)$, and generates and sends to said third party $k_2$ responses expressed by the following equation:
$Yi = Ri \cdot Si^{Ei} \mod Ni$;
and said third party verifies the validity of said response Yi by checking it to ensure that the following verification equation for all of $k_2$ items i, by use of said response Yi:
$Yi^{Li} \equiv Xi \cdot Vi^{Ei} \pmod{Ni}$.

50. The electronic cash implementing method of claim 49, further including a step wherein said third party sends to said bank said electronic cash information {Bi, Bvi, Xi, Bxi}, said inquiry qi, said response Yi and said information Li and Ni for all of the $k_2$ items i for settlement of said electronic cash; said bank verifies the validity of said response Yi to said inquiry (IDv, t, $\gamma_i$) by checking whether or not the following verification equation holds for all of the $k_2$ items i:
$Yi^{Li} \equiv Xi \cdot Vi^{Ei} \pmod{Ni}$.

51. The electronic cash implementing method of claim 50, further including a step wherein said bank checks whether or not a pair of information of the same values as a pair of said user information and said authentication information {Vi, Xi} received from said third party exists in said memory of said bank; if such pair of information does not exist, said bank stores in said memory the information received from said third party; and if such pair of information exists, said bank reads out the corresponding inquiry qi' and response Yi' from said memory, calculates inquiry information $Ei' = f(qi')$ from said read-out inquiry qi', solves, by the Euclid's algorithm, integers $\alpha$ and $\beta$ which satisfy the following equation:

$\alpha \cdot Li + \beta(Ei - Ei') = 1$, calculates secret information Si by the following equation:

$Vi^{\alpha} \cdot (Yi/Yi')^{\beta} \mod Ni = Si$, and detects from said calculated secret information Si identification information IDp of said user who invalidly used said electronic cash.

52. An electronic cash implementing user system in which a bank issues electronic cash to a user and the user pays to a third party with said electronic cash, comprising:
secret information generating means for generating secret information containing identification information;
user information generating means whereby user information is produced, by use of a first one-way function, from said secret information provided from said secret information generating means;
first blind signature preprocessing means whereby information containing said user information provided from said user information generating means is subjected to one-way blind signature preprocessing to produce randomized user information;
first blind signature postprocessing means whereby signed randomized user information produced by signing said randomized user information by said bank is derandomized to obtain signed user information;
secret random information generating means for generating secret random information;
authentication information generating means whereby authentication information is produced, by use of a second one-way function, from said secret random information provided from said secret random information generating means;
second blind signature preprocessing means whereby said authentication information provided from said authentication information generating means is subjected to one-way blind signature preprocessing to obtain randomized authentication information;
second blind signature postprocessing means whereby signed authentication information produced by signing said randomized authentication information by said bank is derandomized to obtain signed authentication information; and
response generating means whereby a response is produced by use of said secret random information in response to an inquiry from said third party.

53. The user system of claim 52, wherein said second blind signature preprocessing means includes concatenating means for concatenating said authentication information and said signed user information into a concatenated message, and a one-way preprocessing function operator for randomizing said concatenated message with a random number to produce said randomized user inormation.

54. The user system of claim 53, further including a one-way signature function operator whereby said user attaches a signature to signed user information of said third party provided therefrom.

* * * * *